July 25, 1961 E. A. VERRINDER ET AL 2,993,315
APPARATUS FOR HANDLING CASES
Filed July 11, 1955 34 Sheets-Sheet 28
FIG_31
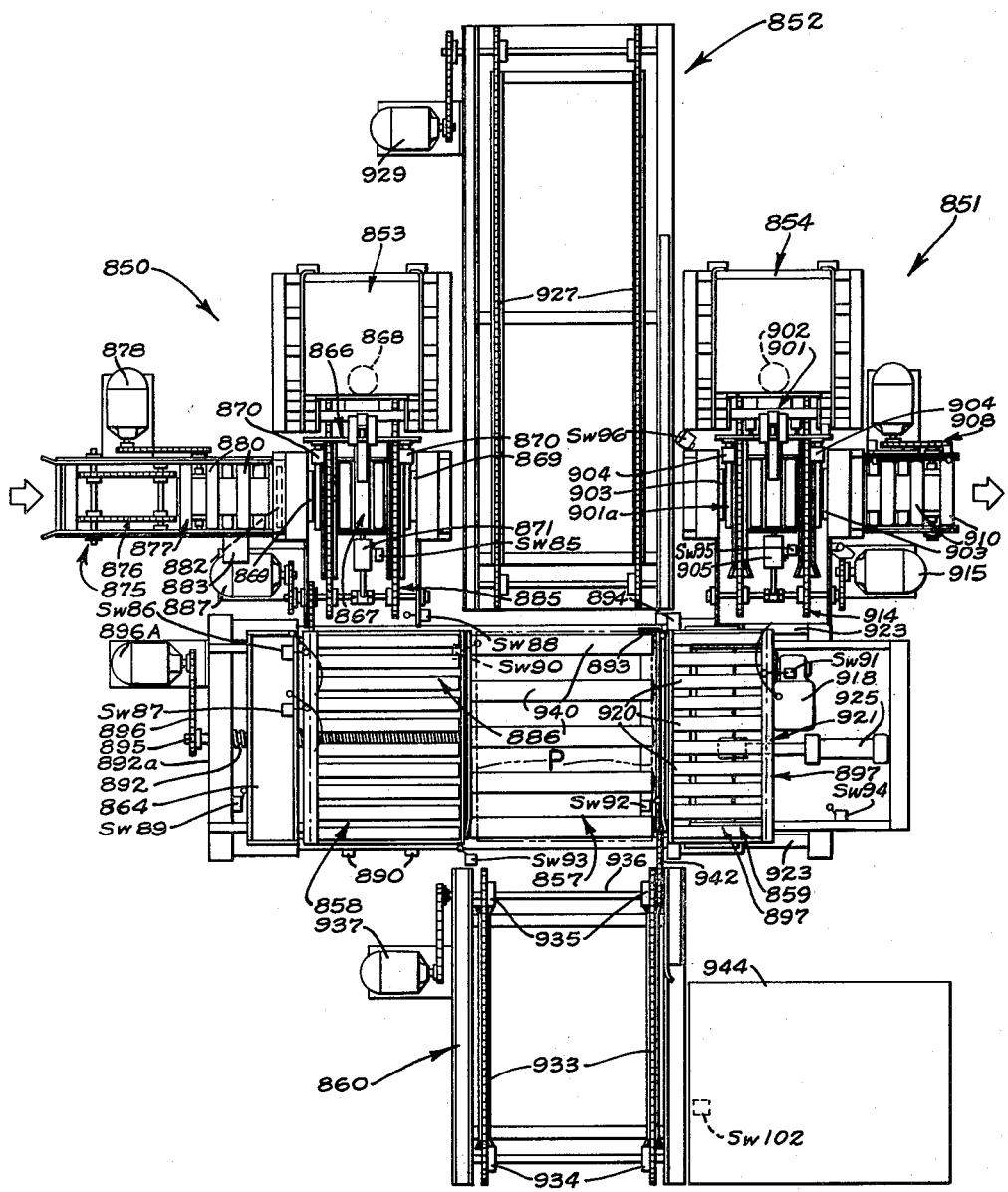
INVENTORS
ERNEST A. VERRINDER
EARLE J. McGRATH
BY Hans G. Hoffmeister
ATTORNEY

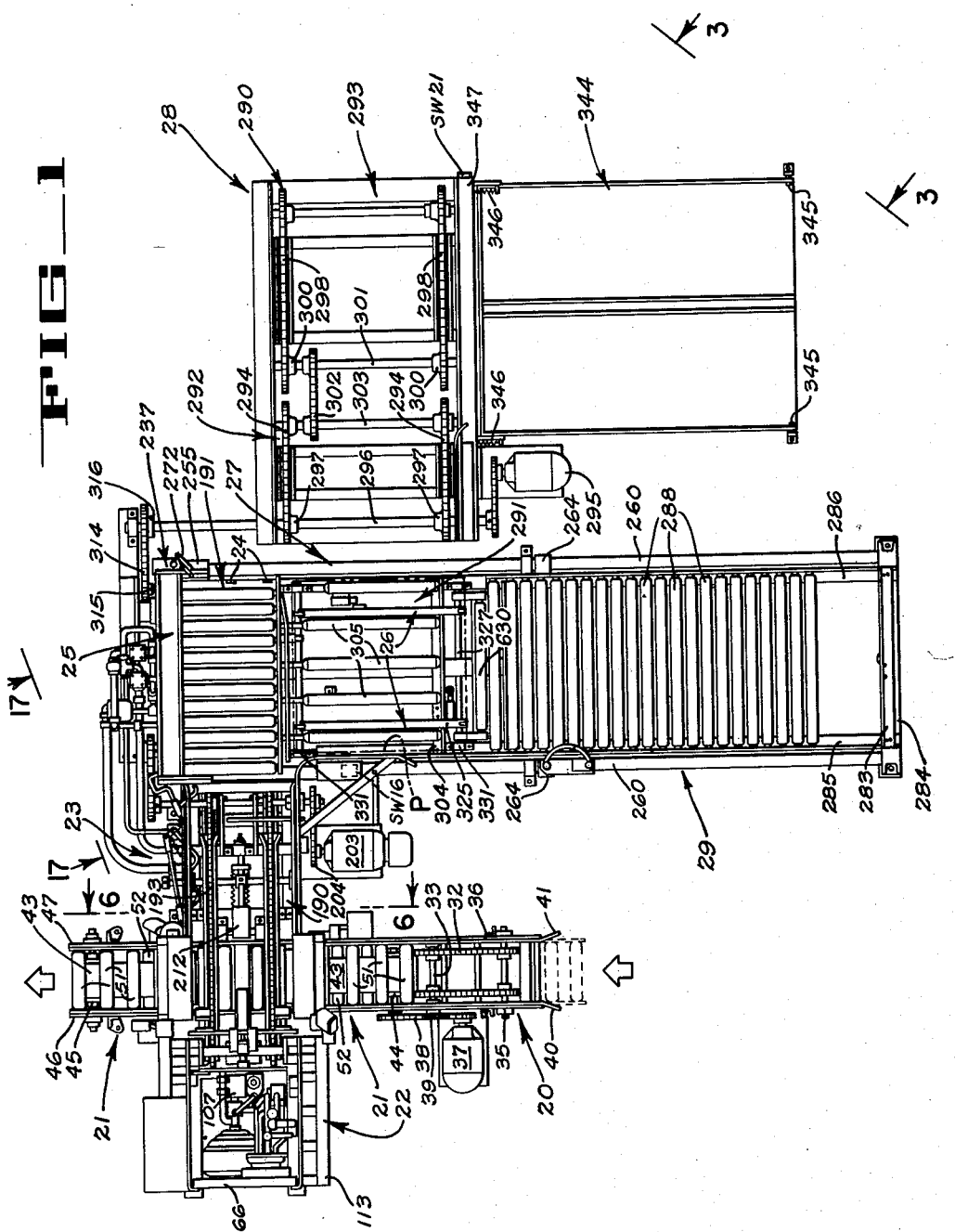

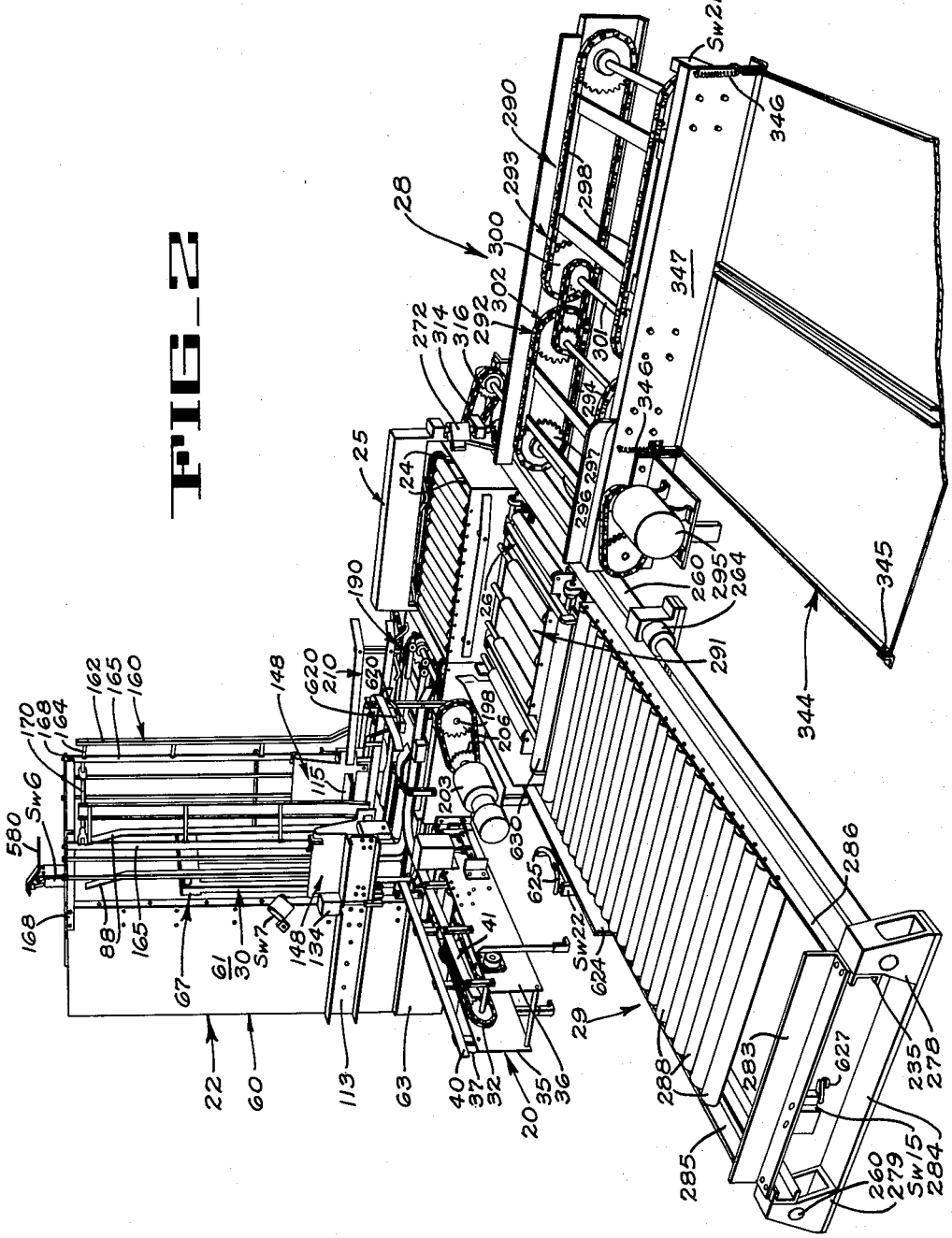
July 25, 1961 — E. A. VERRINDER ET AL — 2,993,315
APPARATUS FOR HANDLING CASES
Filed July 11, 1955 — 34 Sheets-Sheet 2
FIG_2
INVENTORS
ERNEST A. VERRINDER
EARLE J. McGRATH
BY Hans G. Hoffmeister
ATTORNEY July 25, 1961
E. A. VERRINDER ET AL
2,993,315
APPARATUS FOR HANDLING CASES
Filed July 11, 1955
34 Sheets-Sheet 3
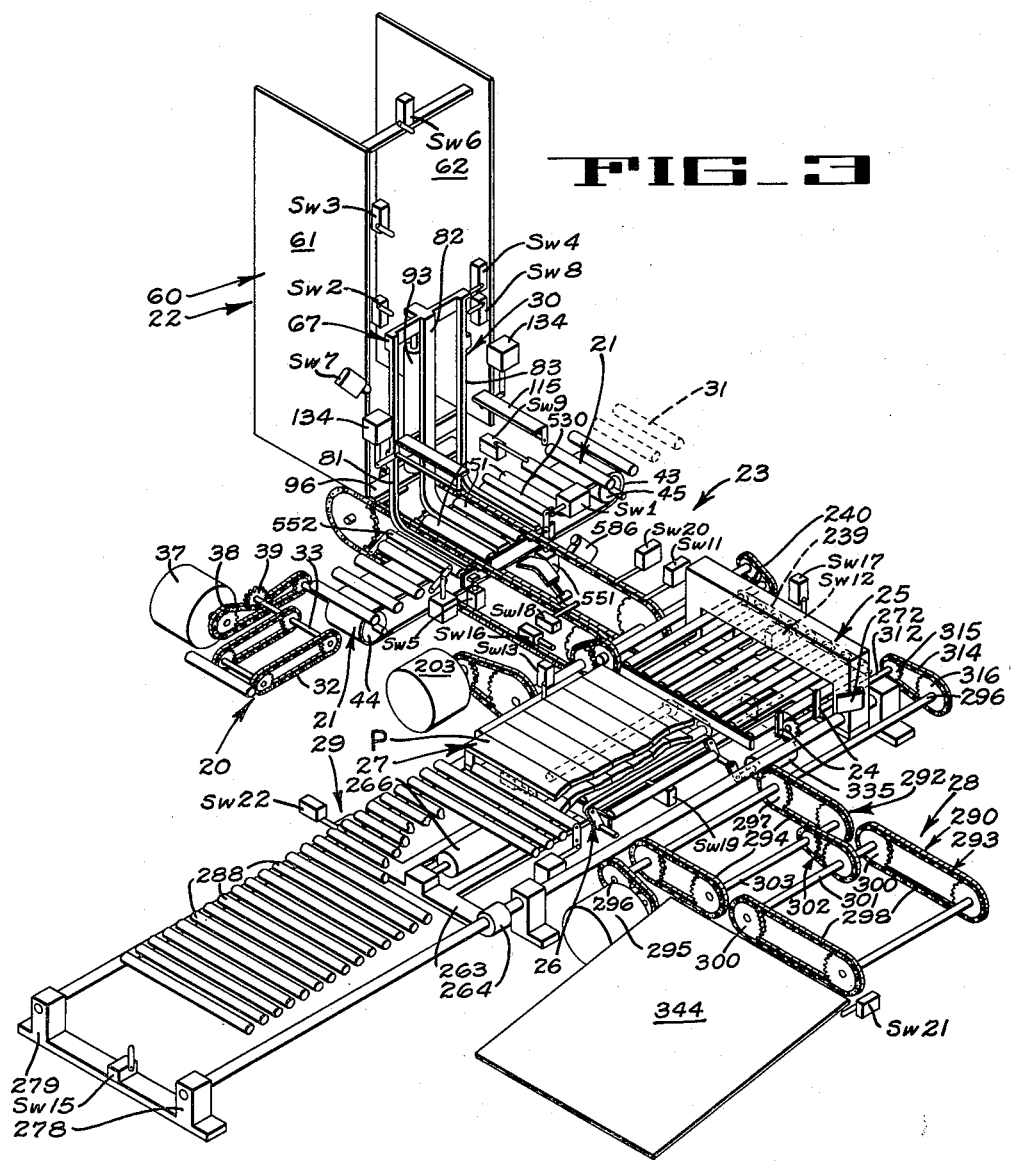
INVENTORS
ERNEST A. VERRINDER
EARLE J. McGRATH
BY Hans G. Hoffmeister.
ATTORNEY

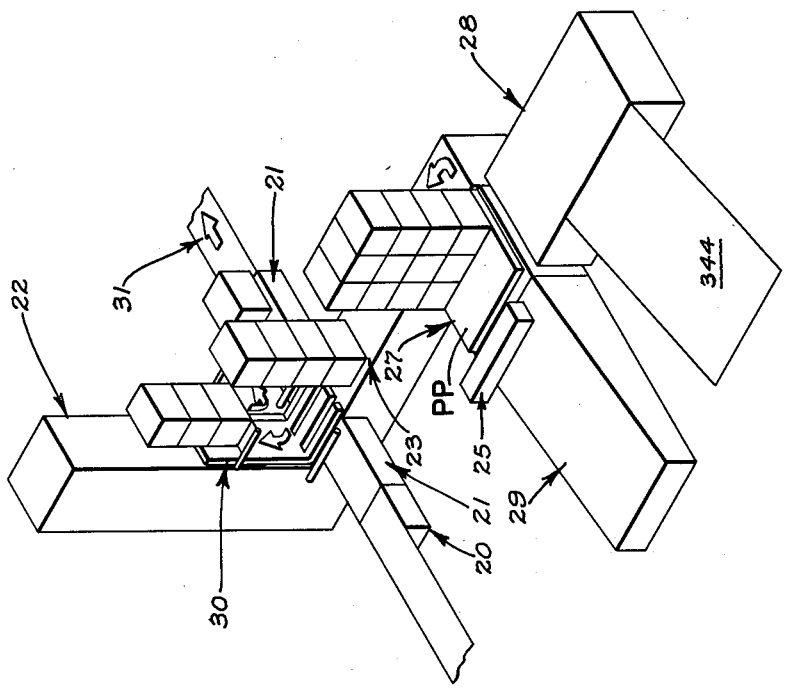
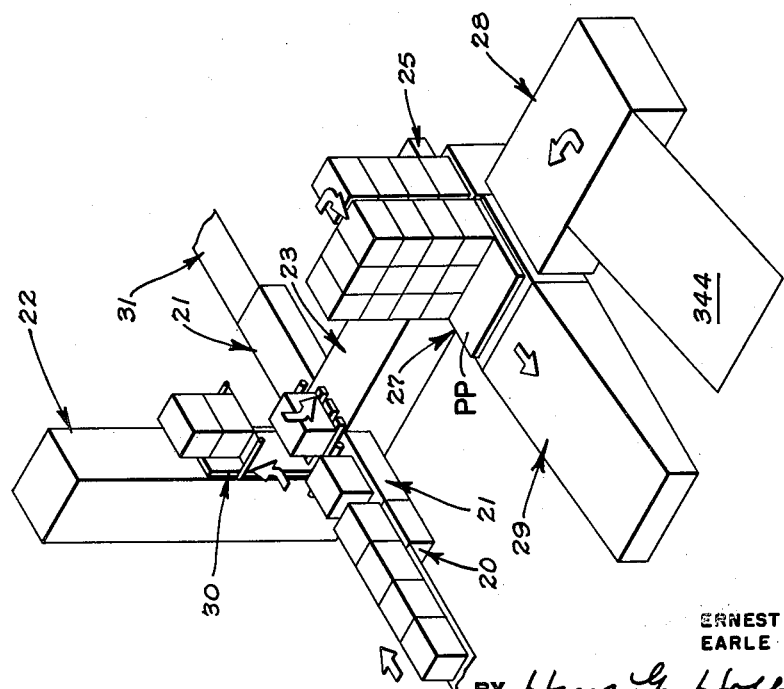

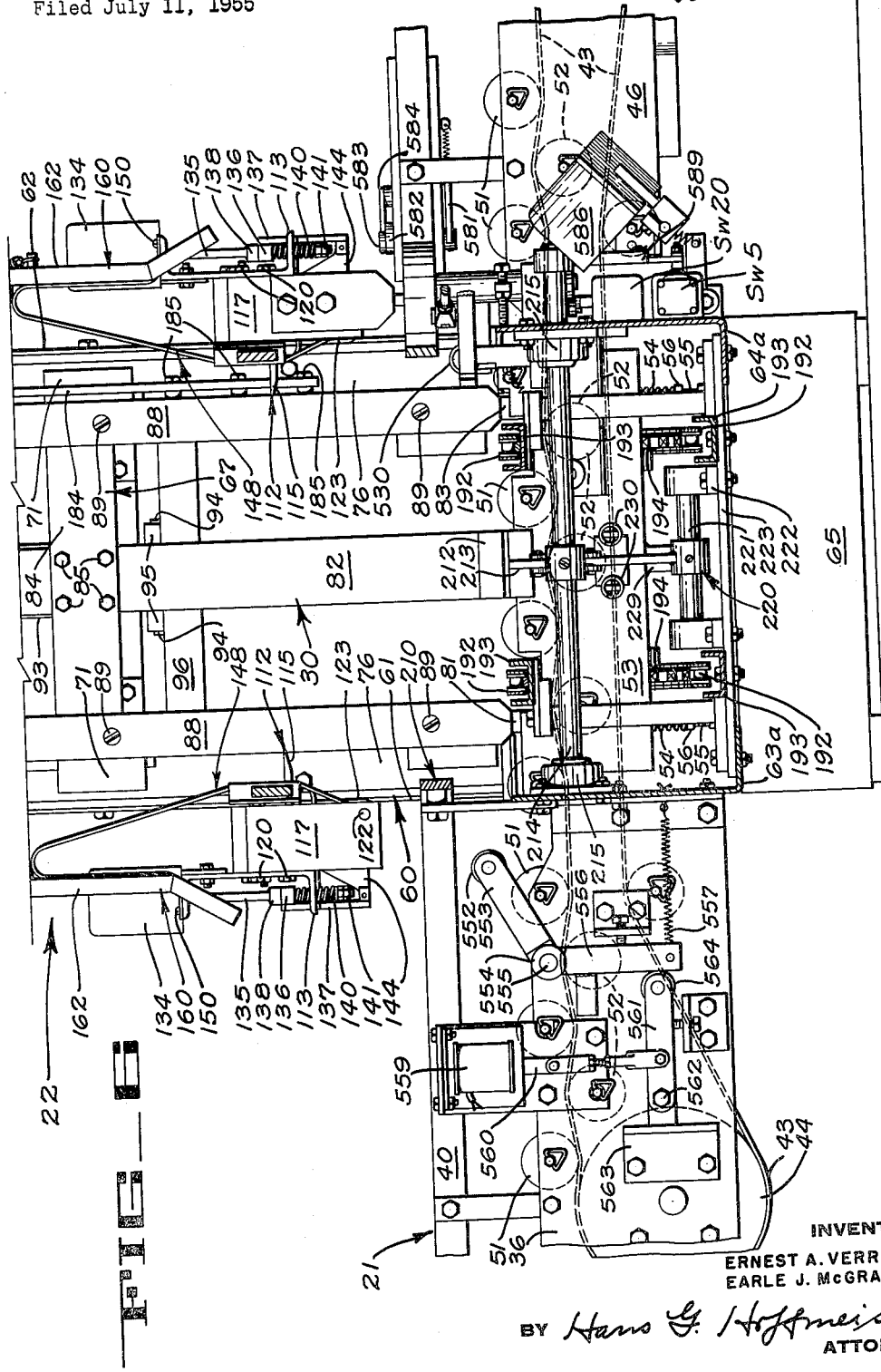

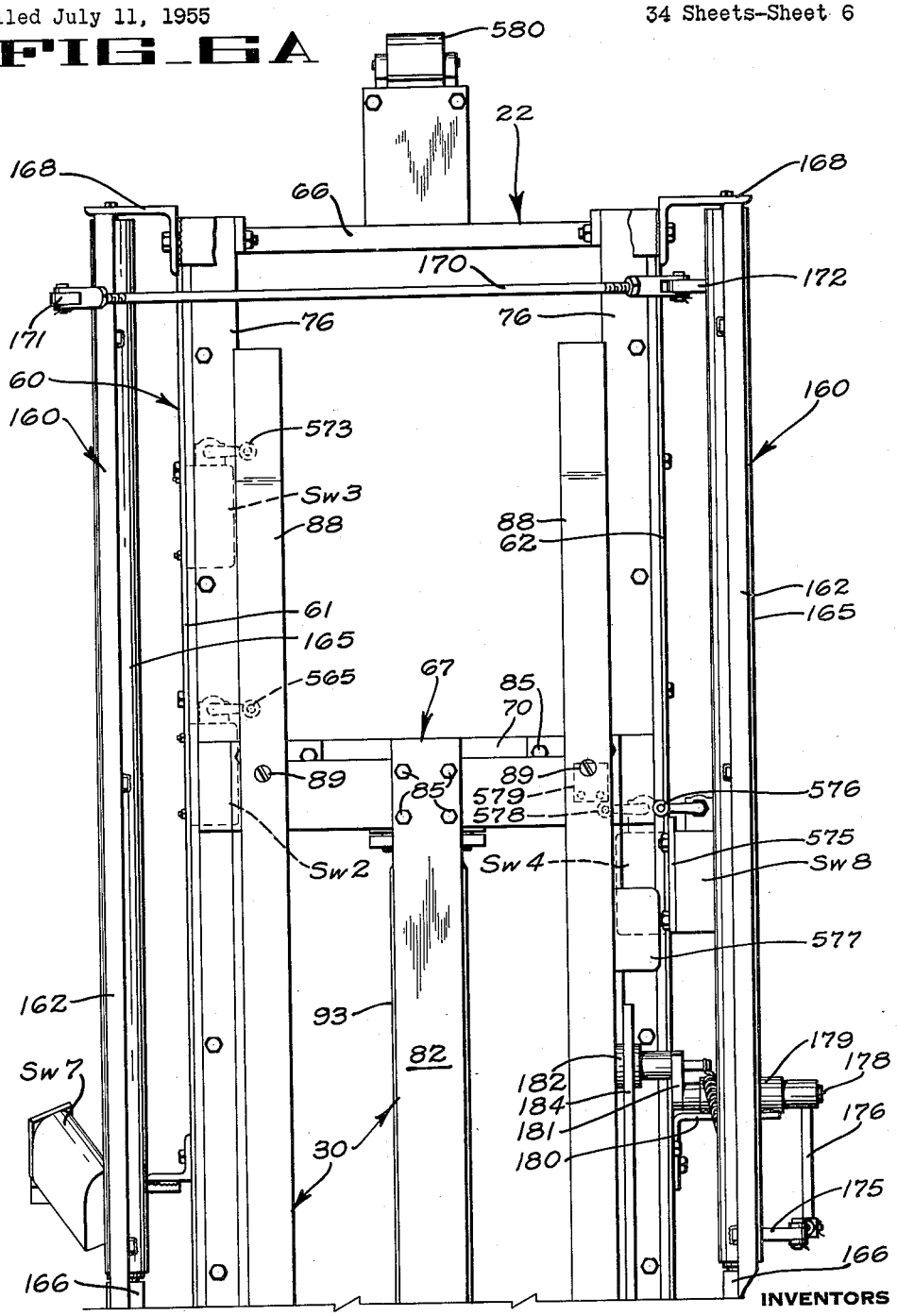

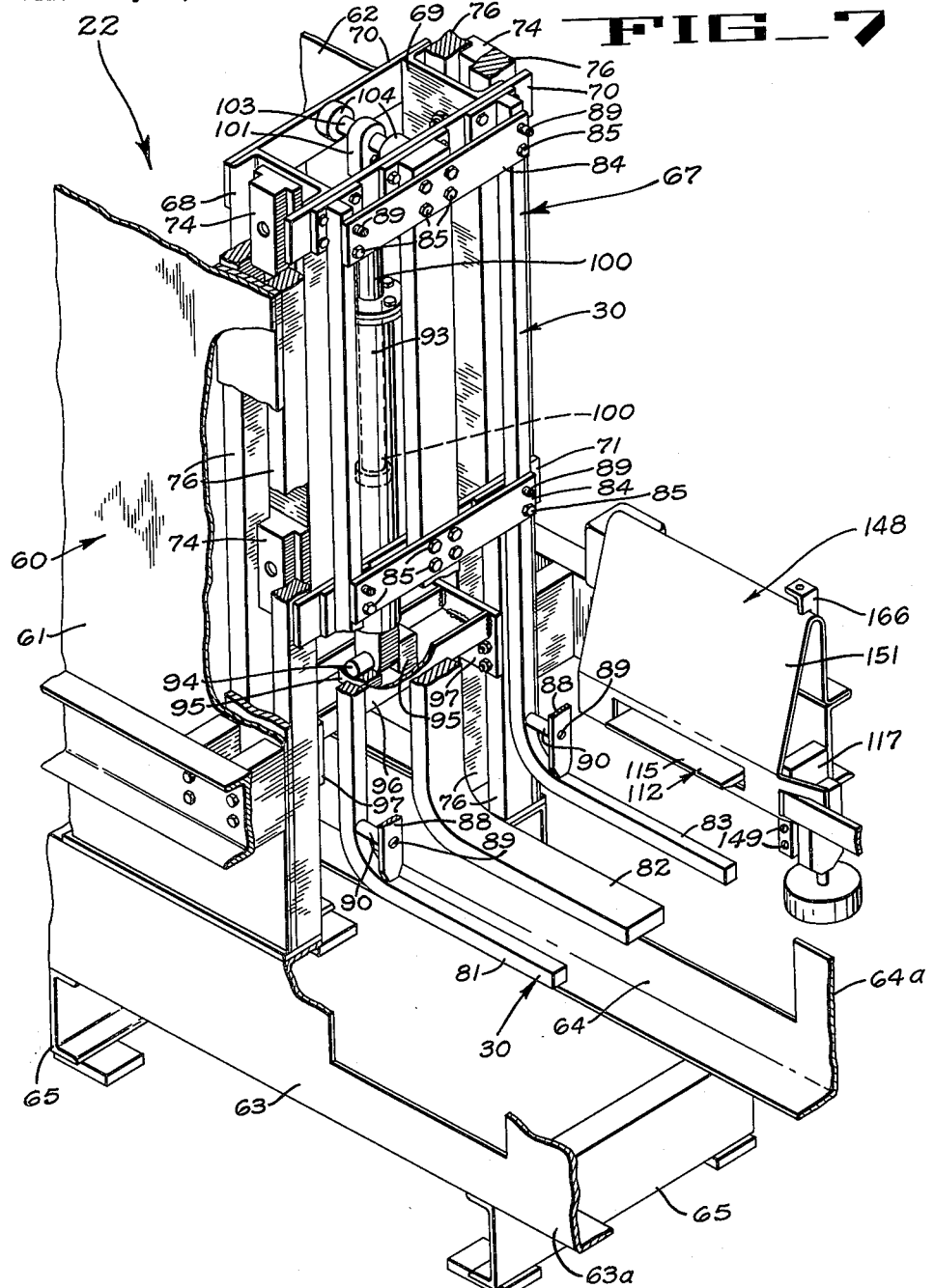

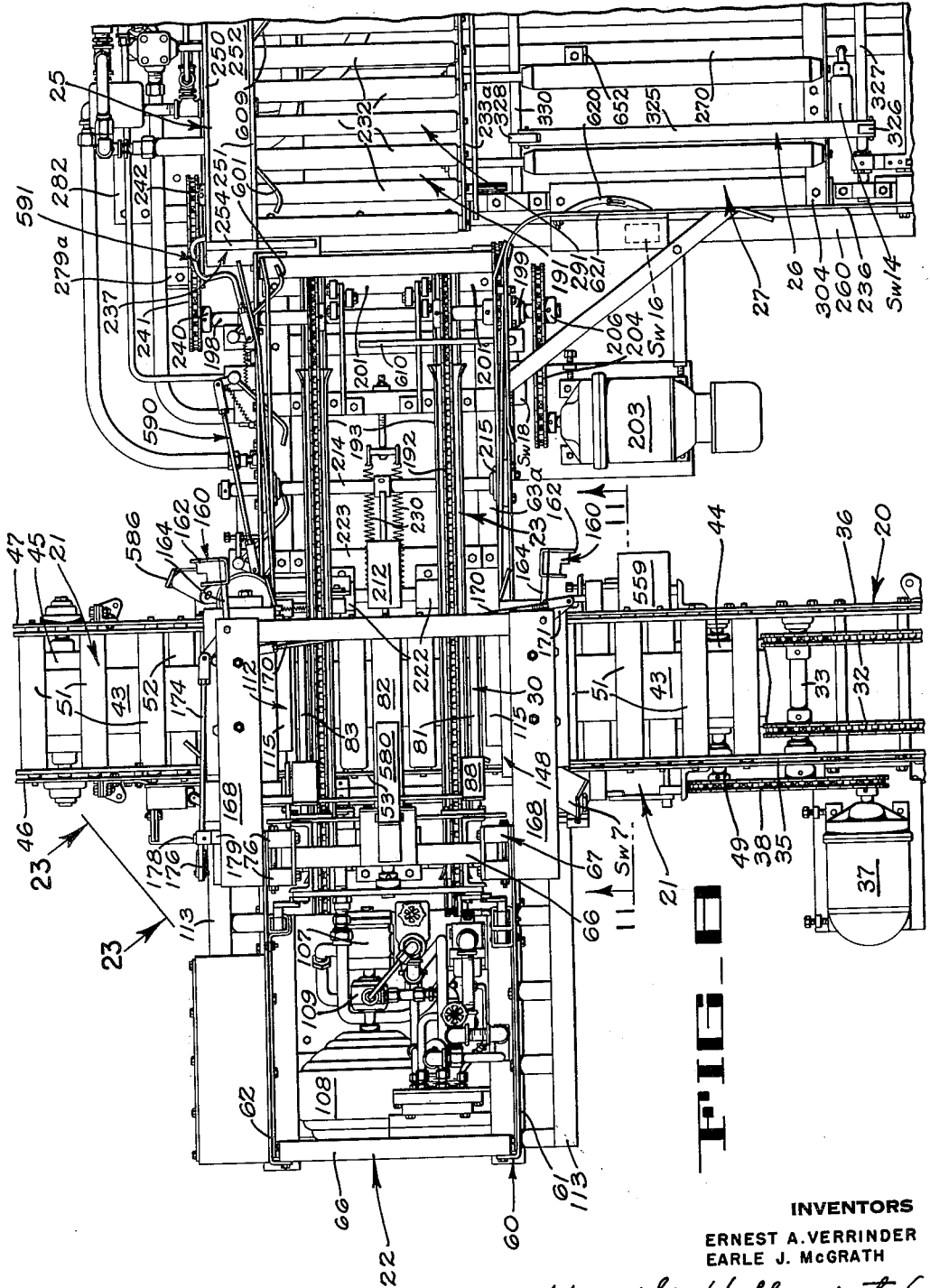

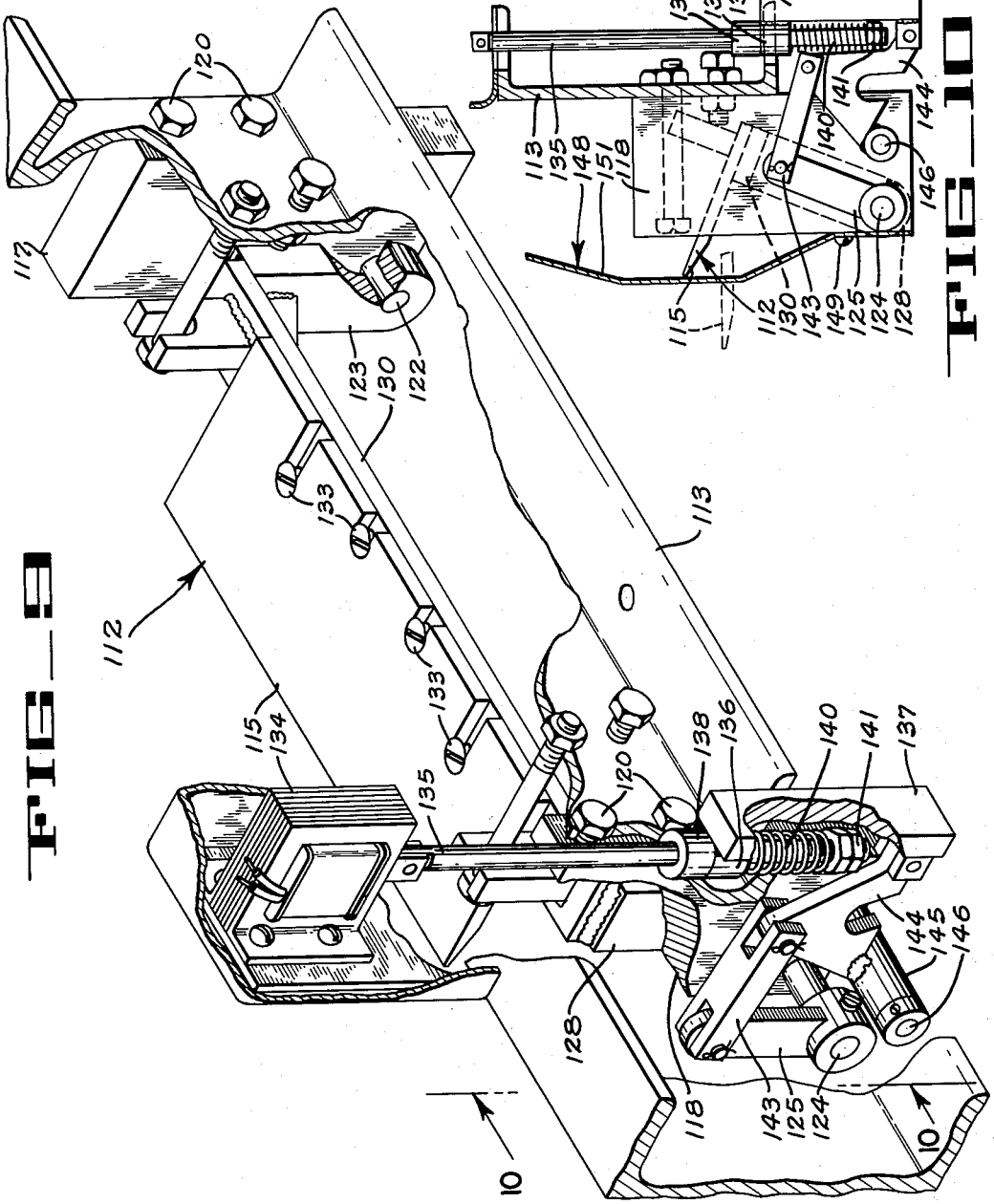

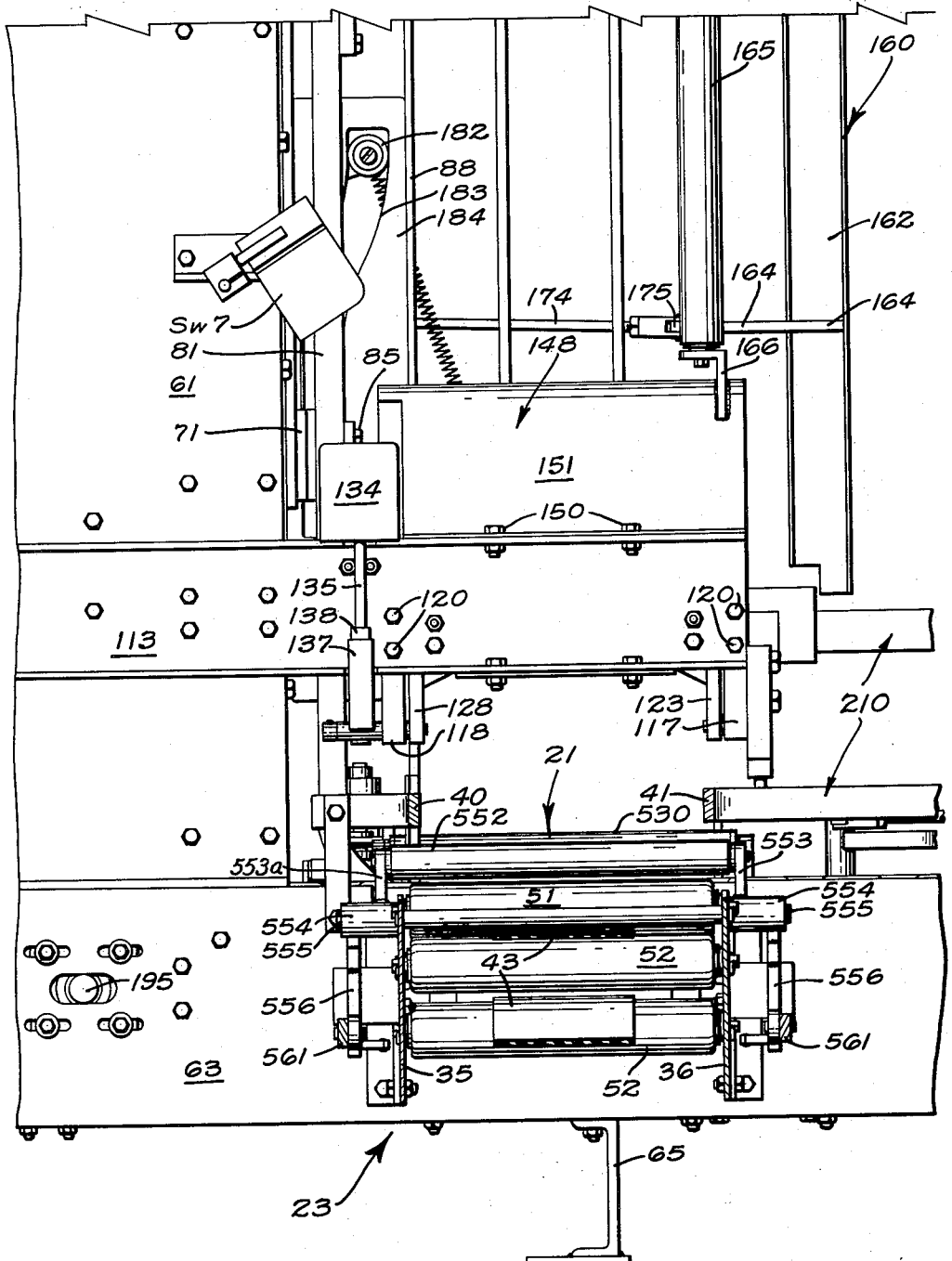
FIG_11

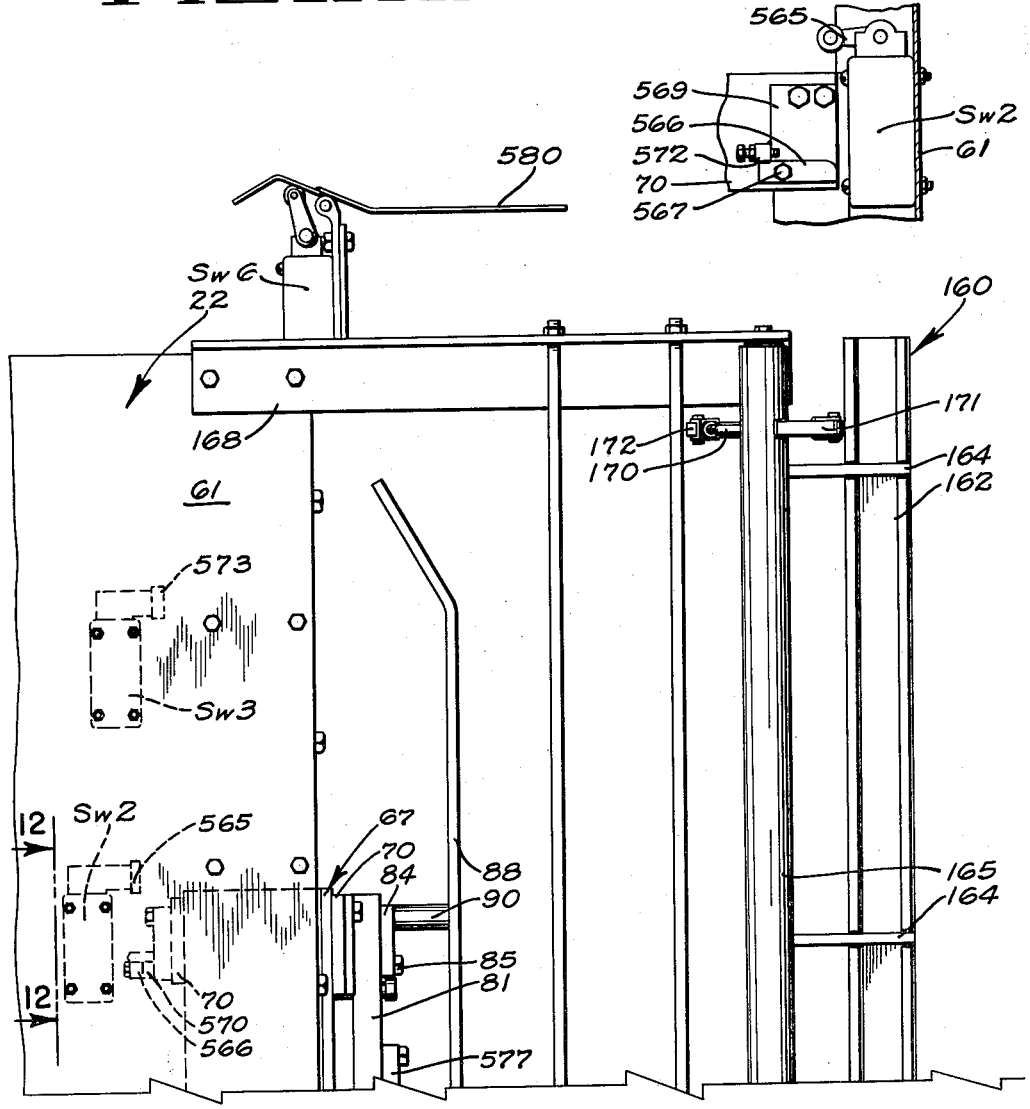

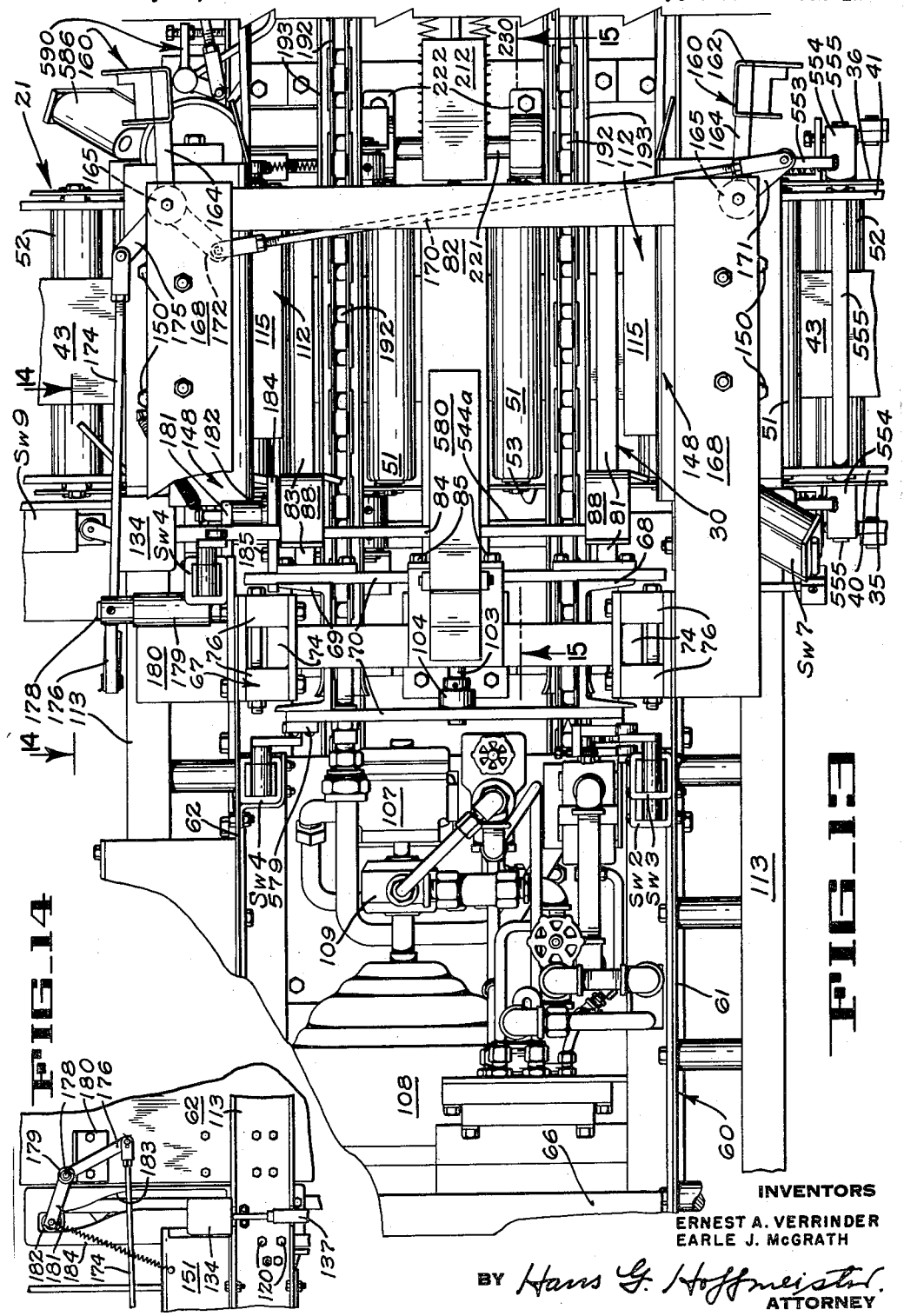

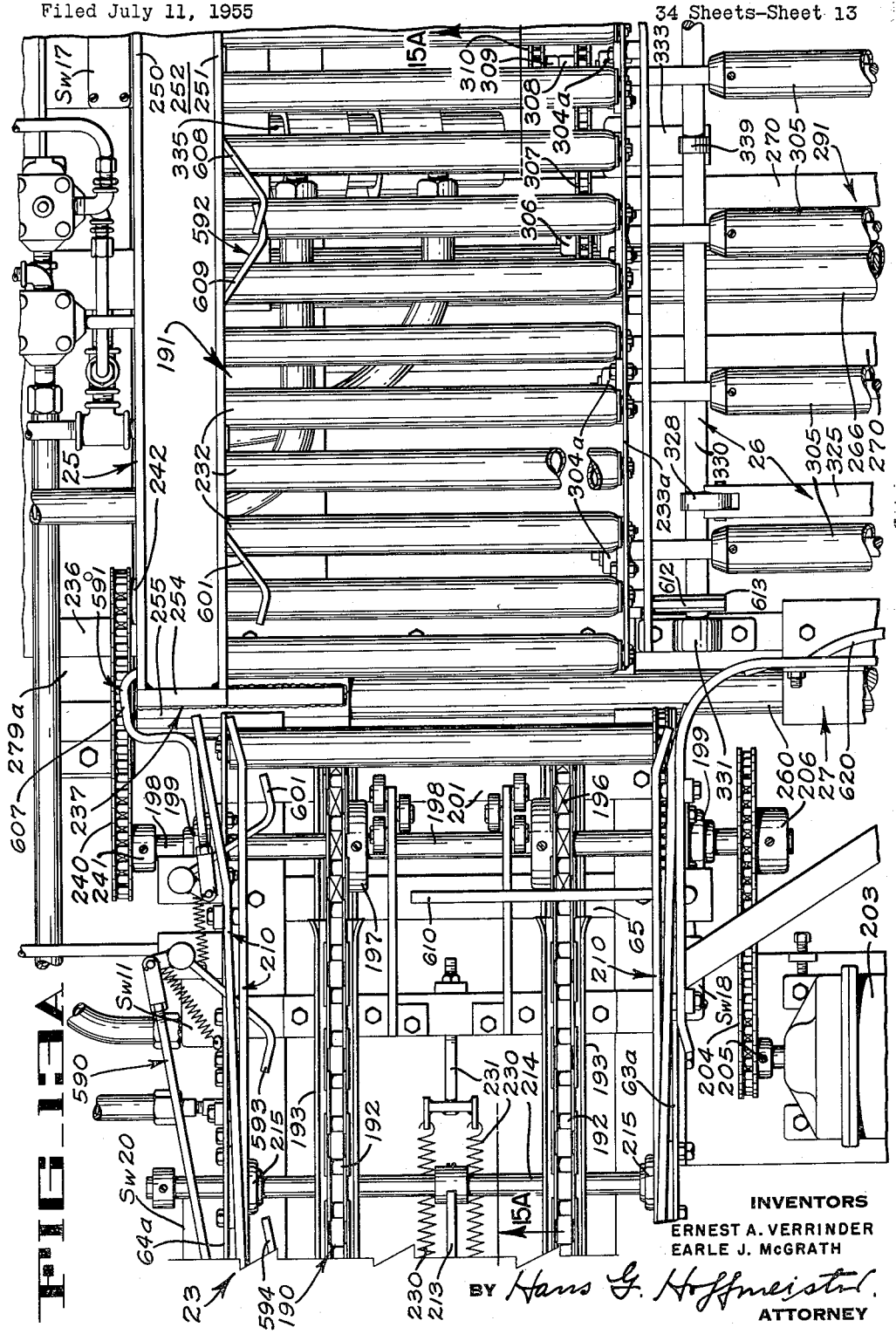

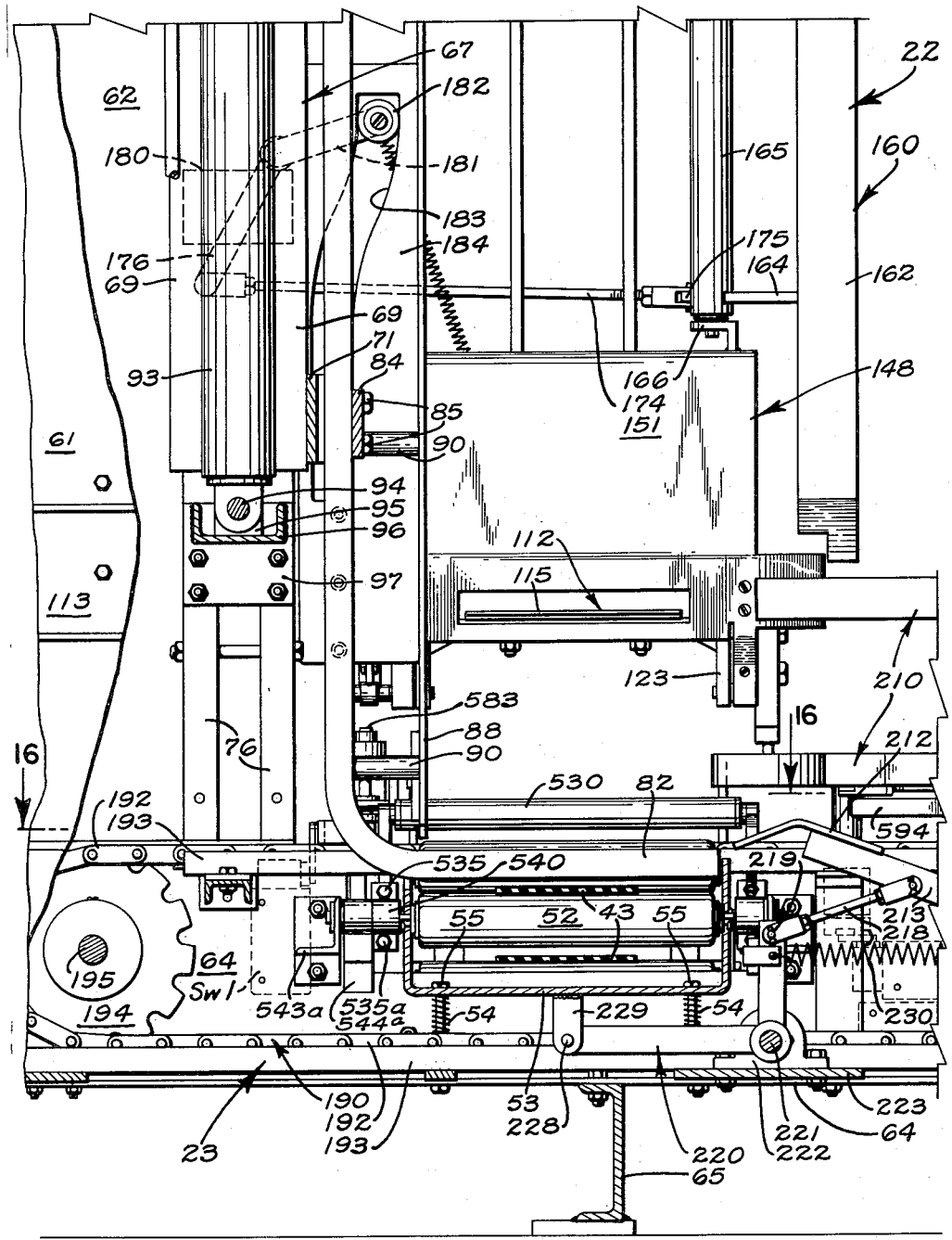
FIG_15

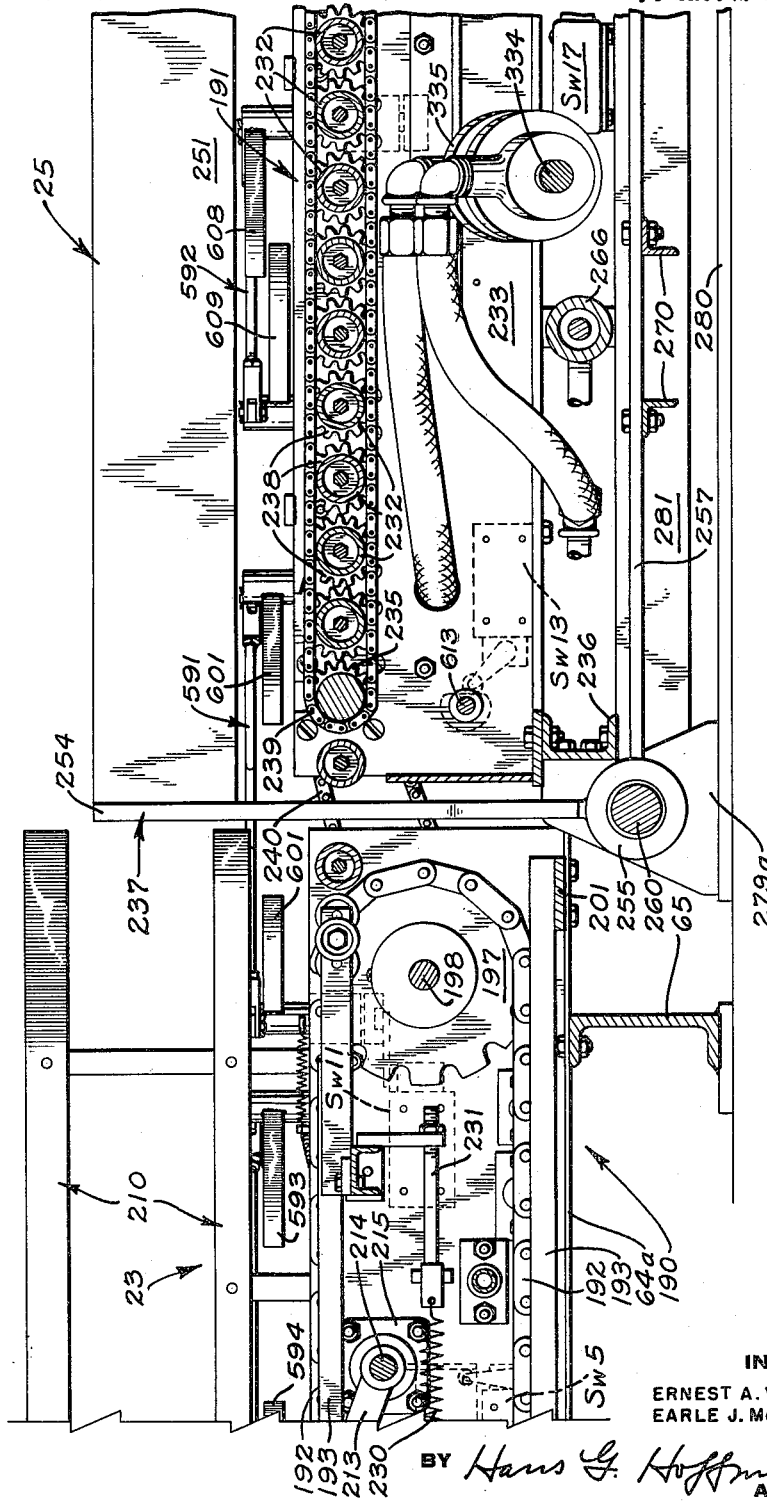

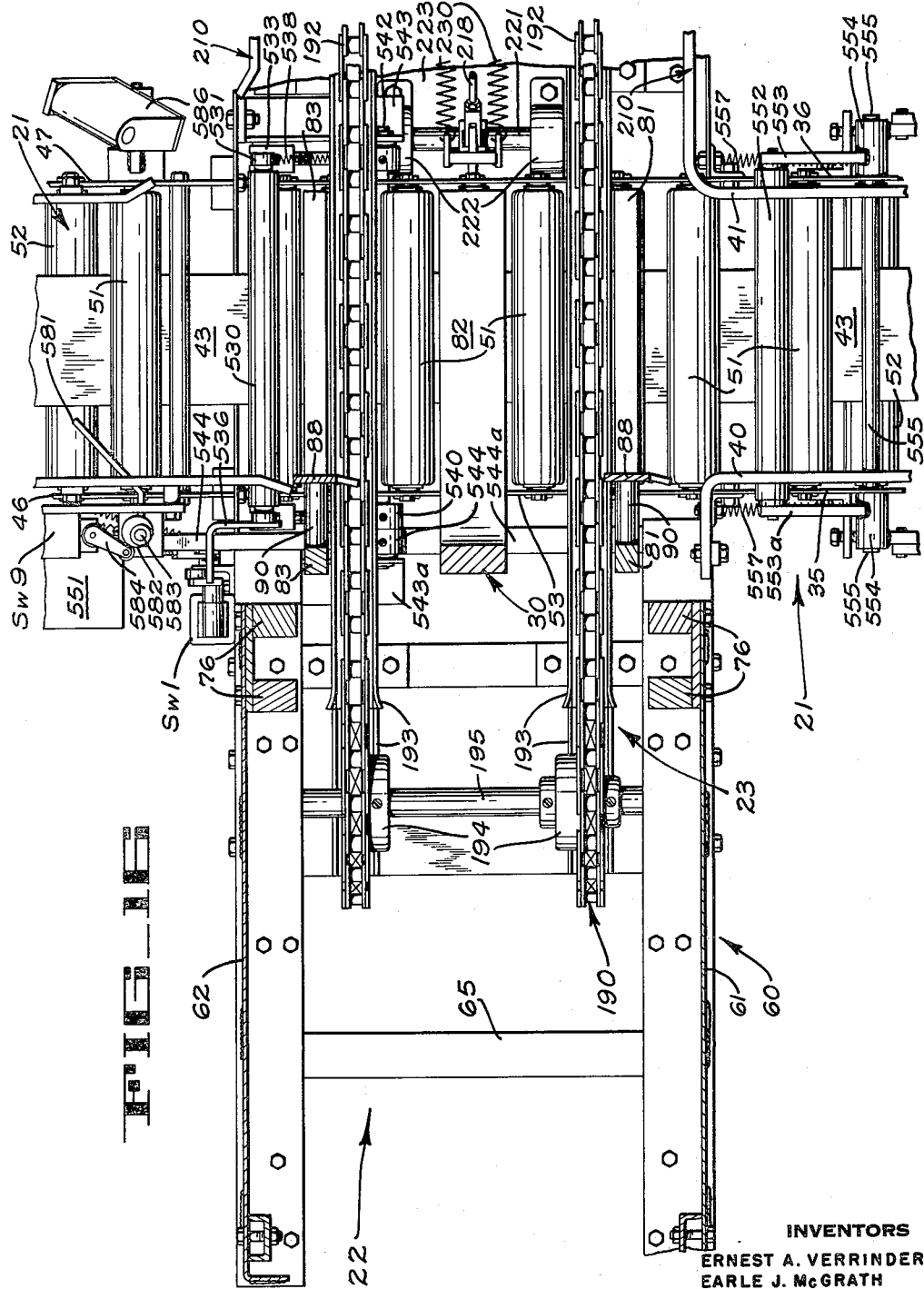

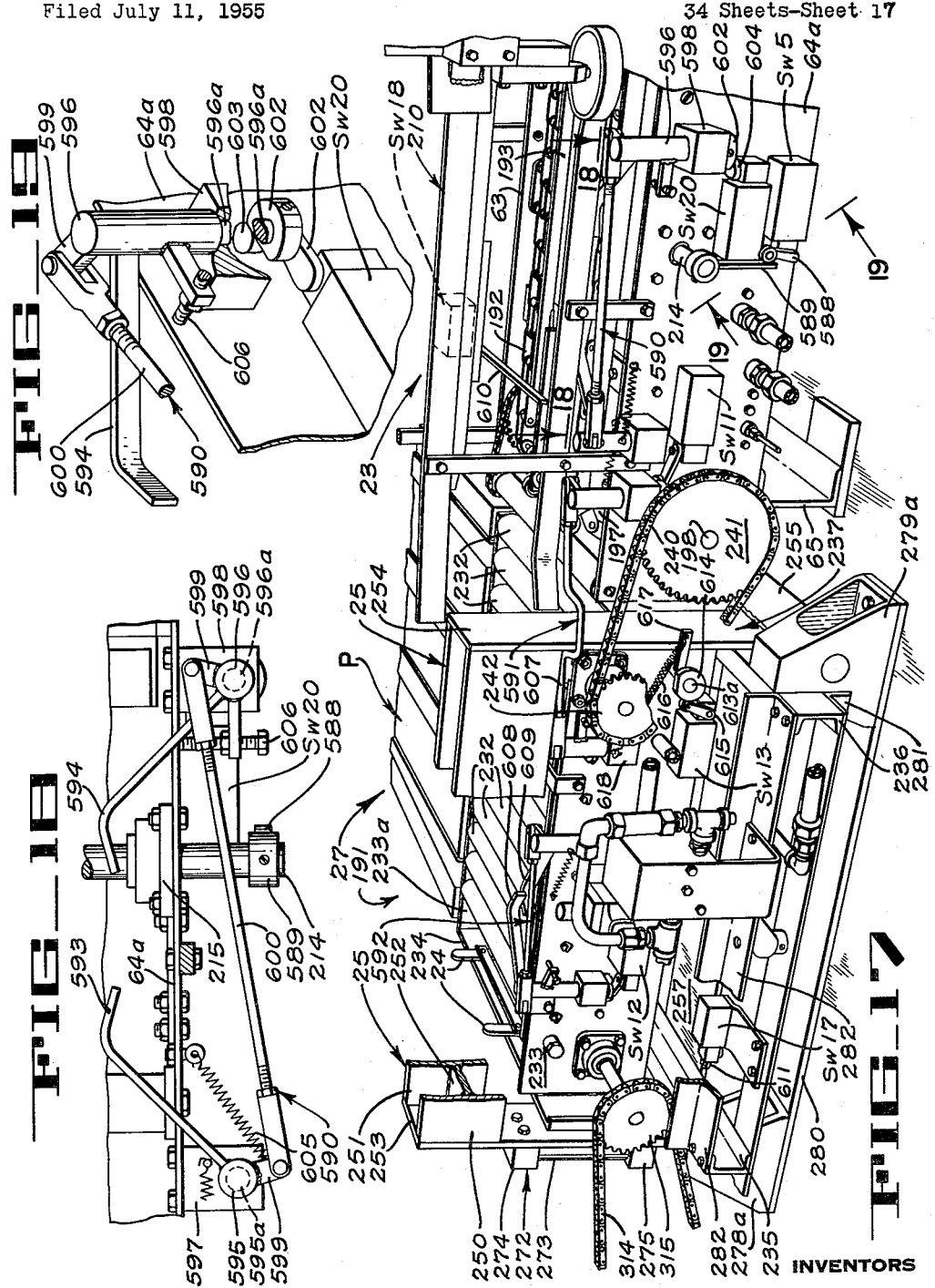

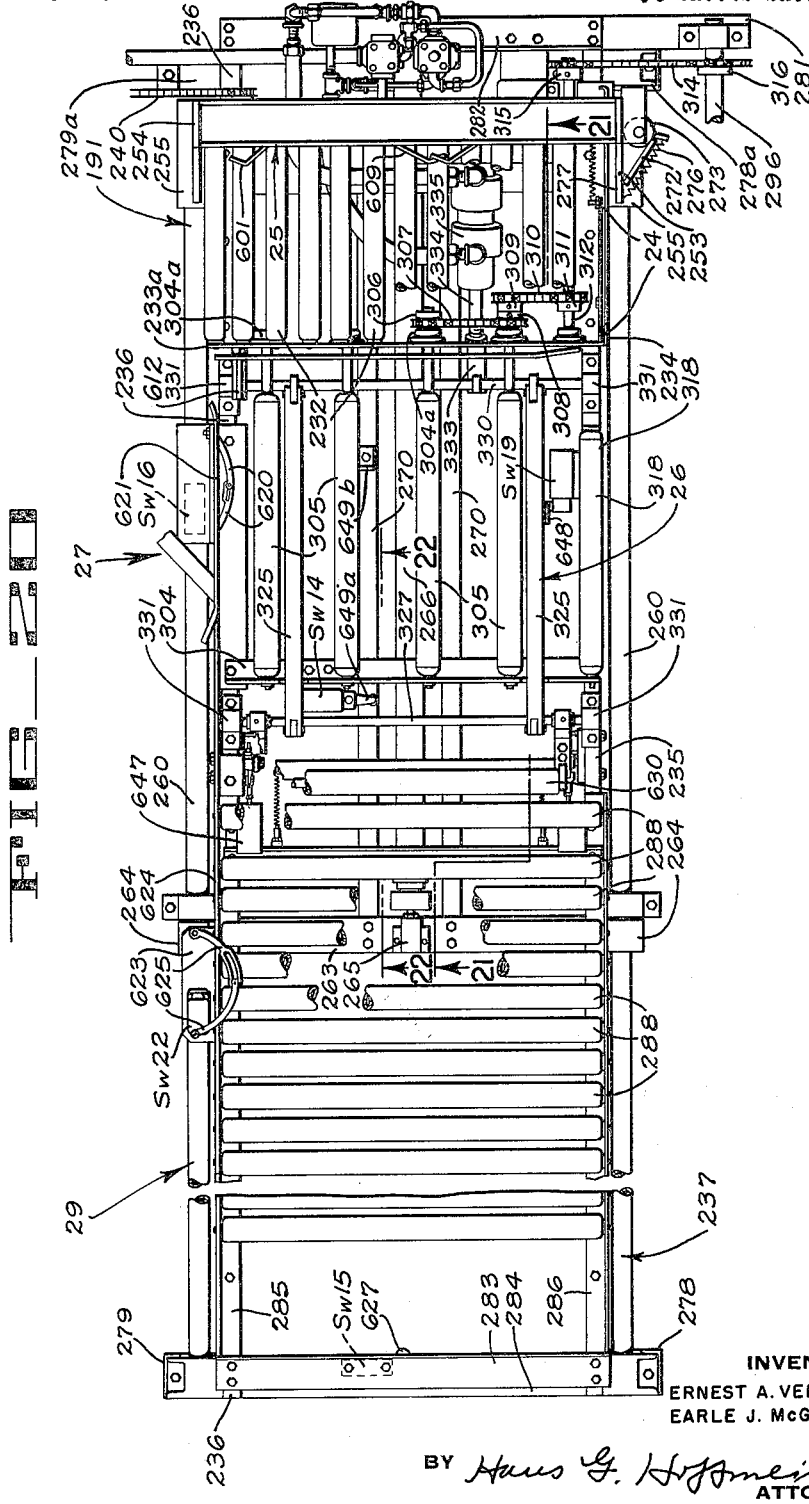

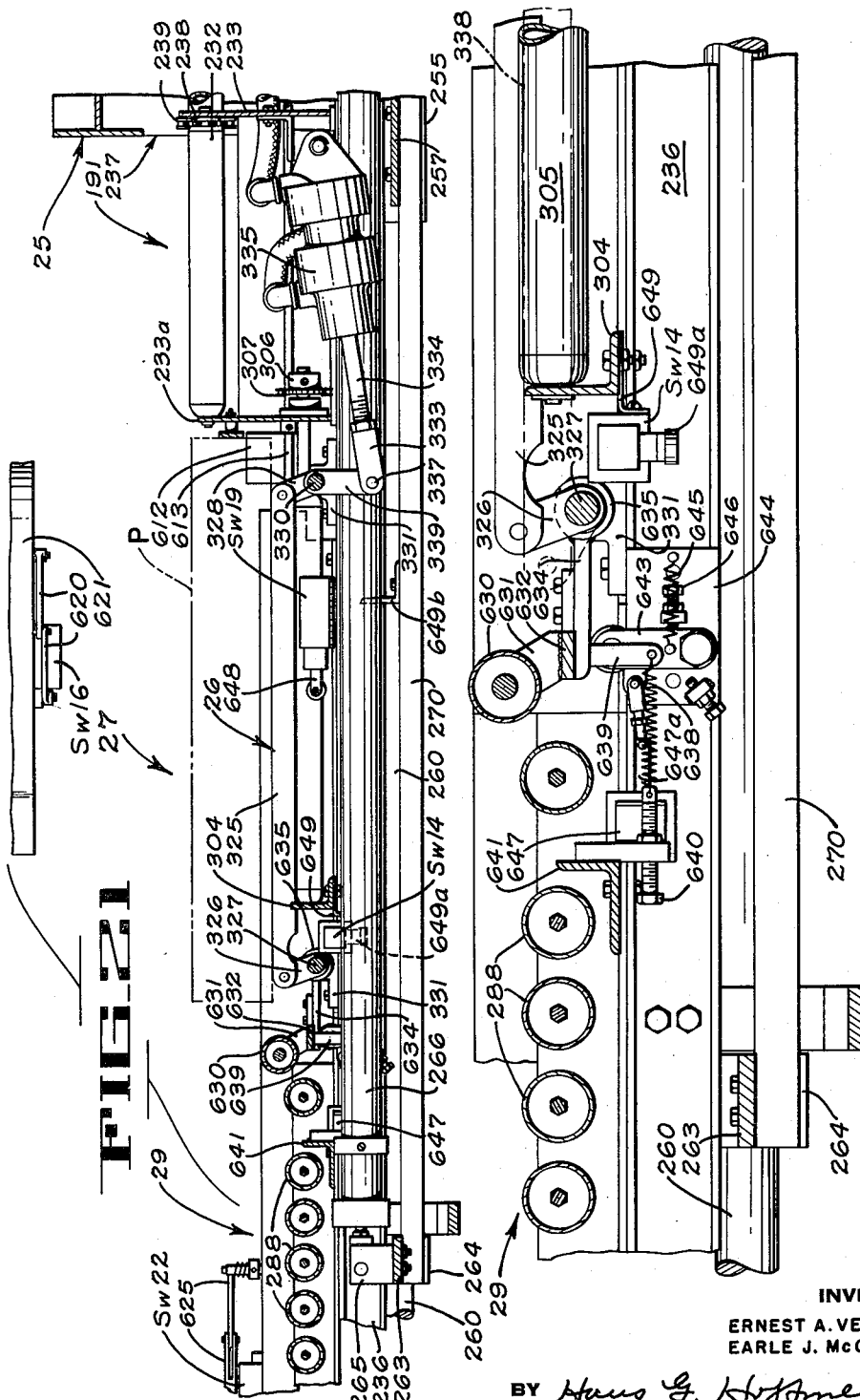

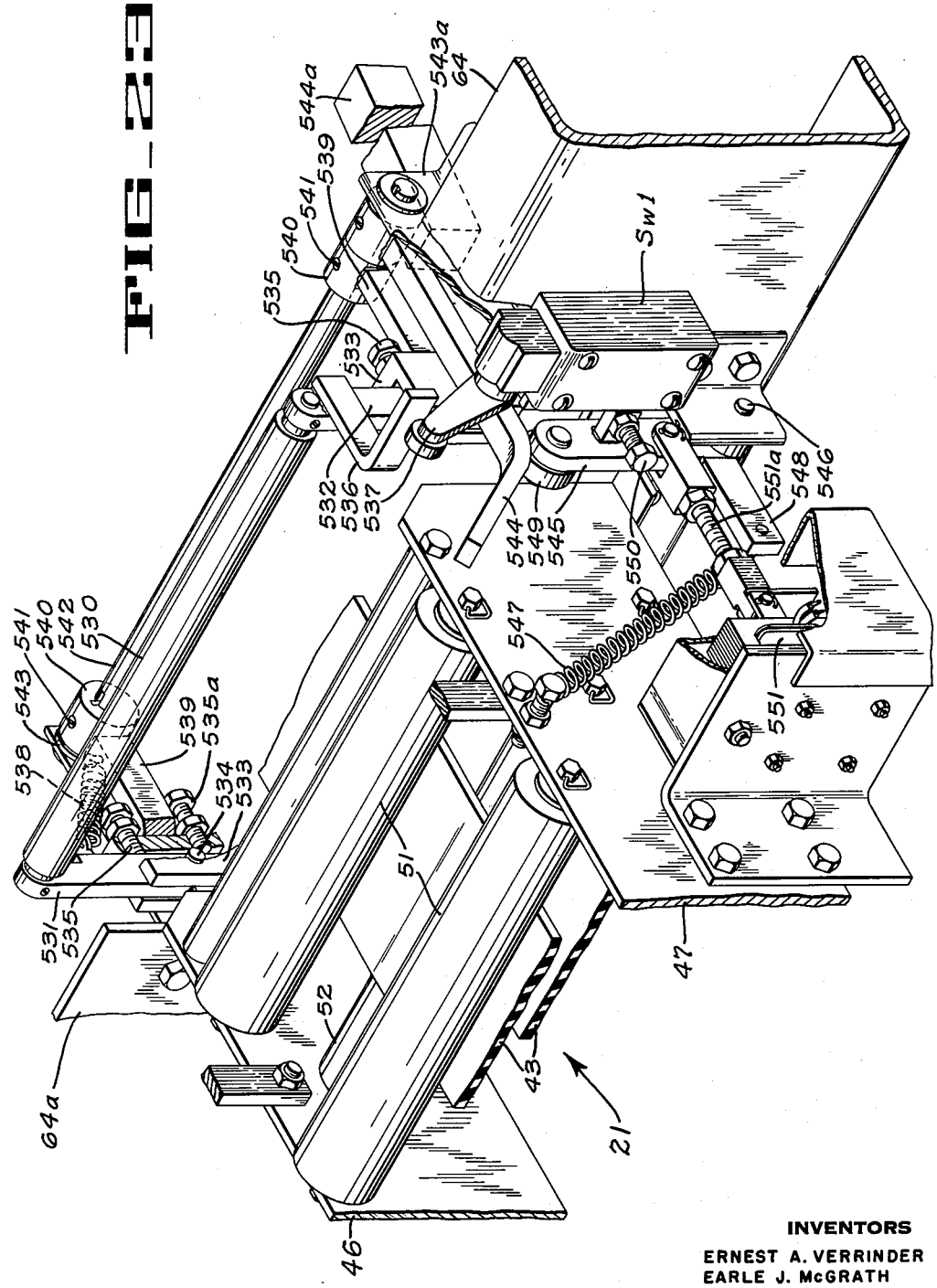

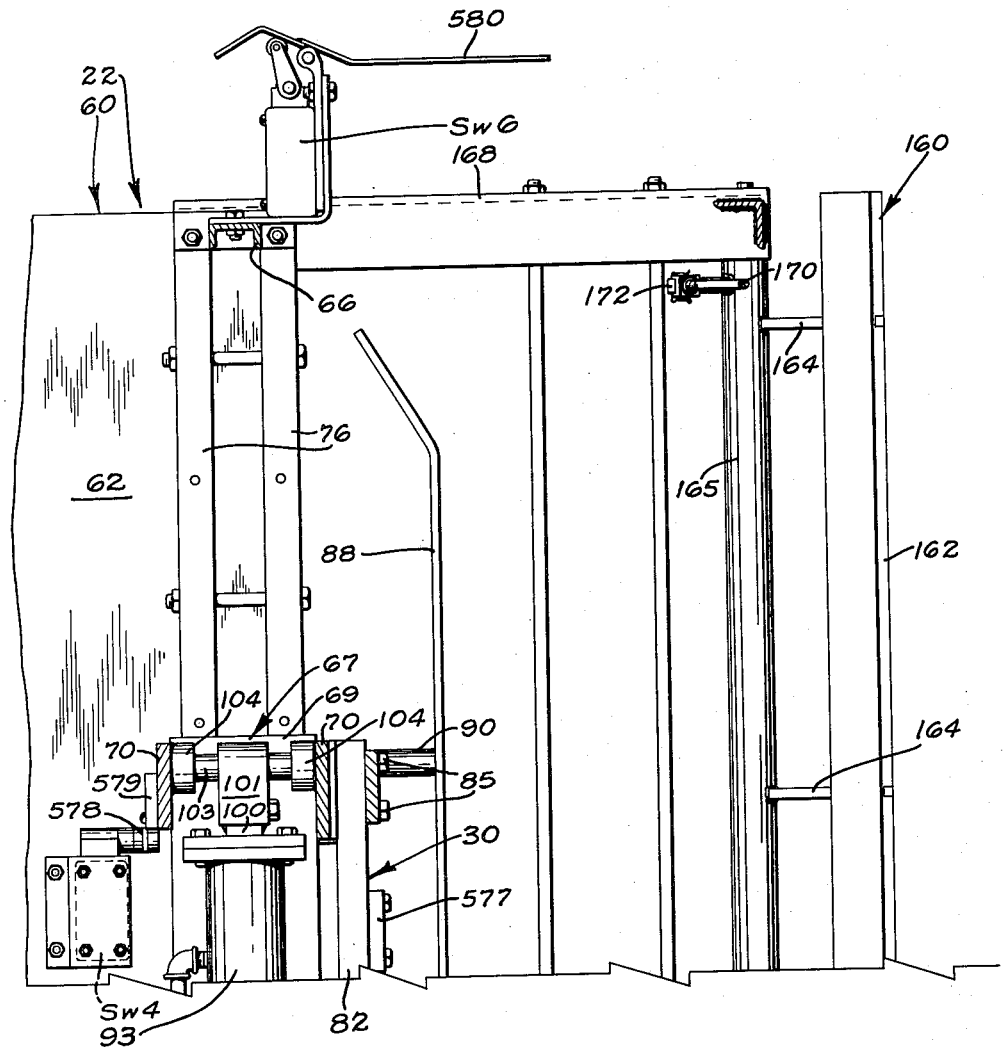

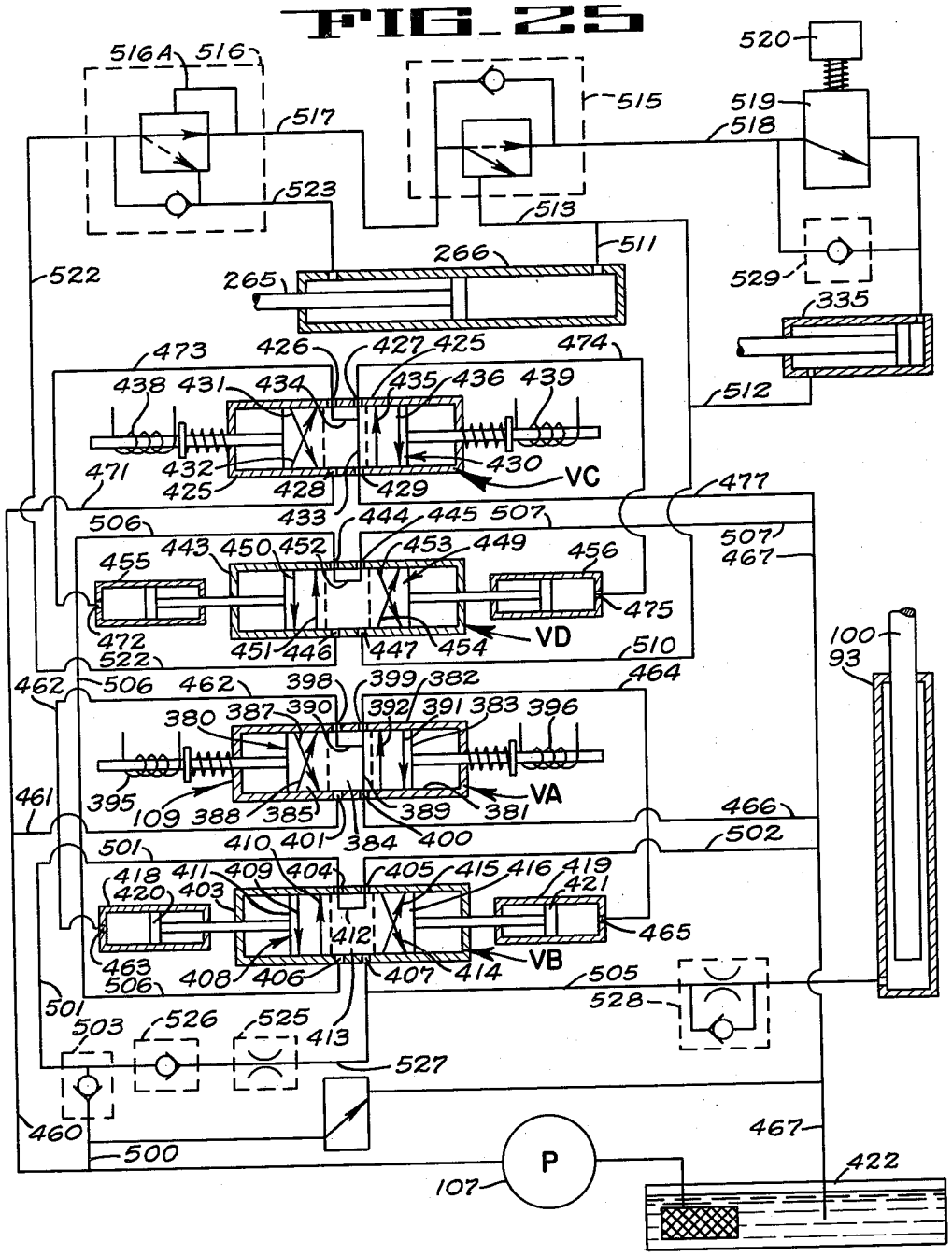

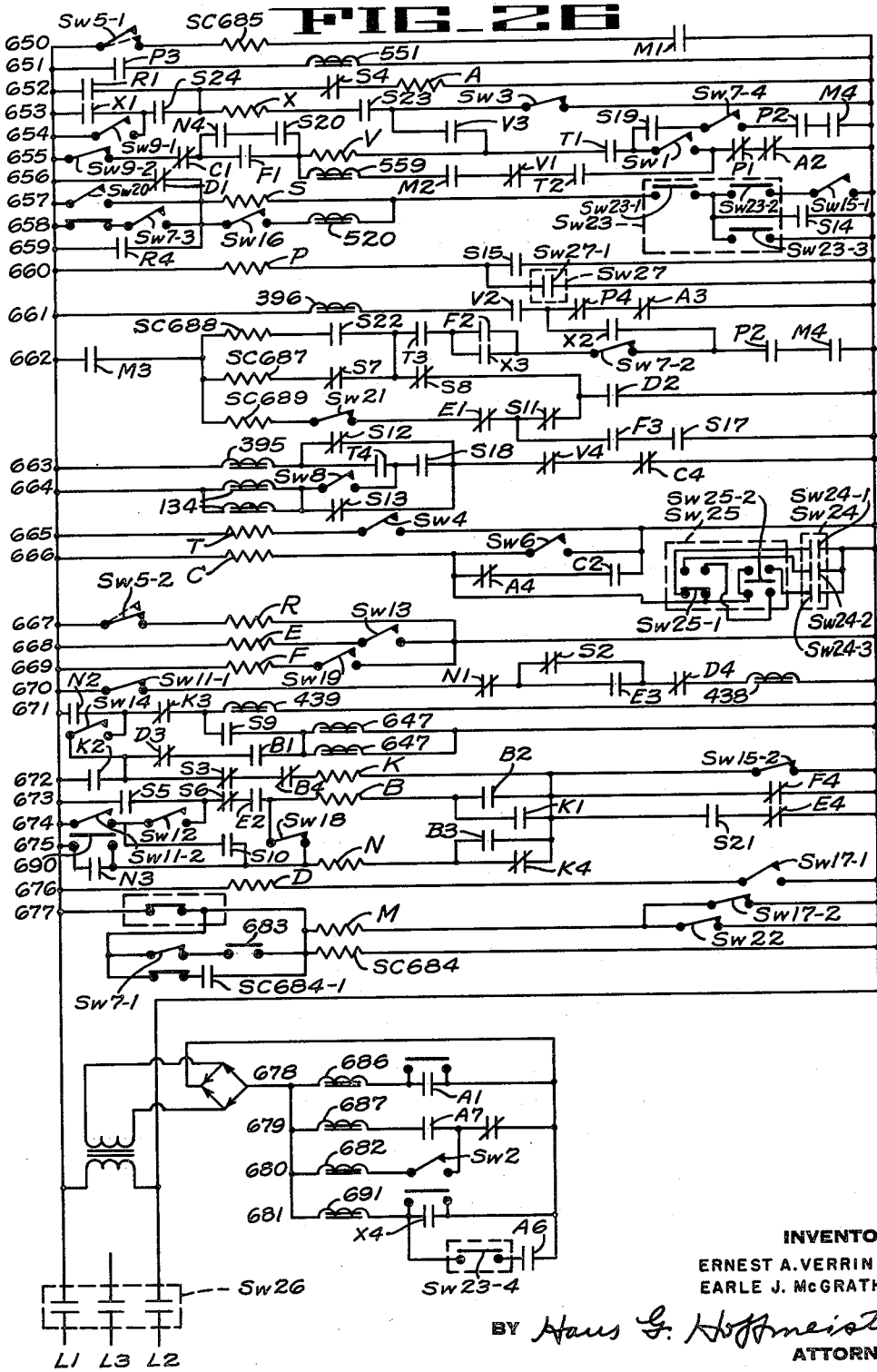

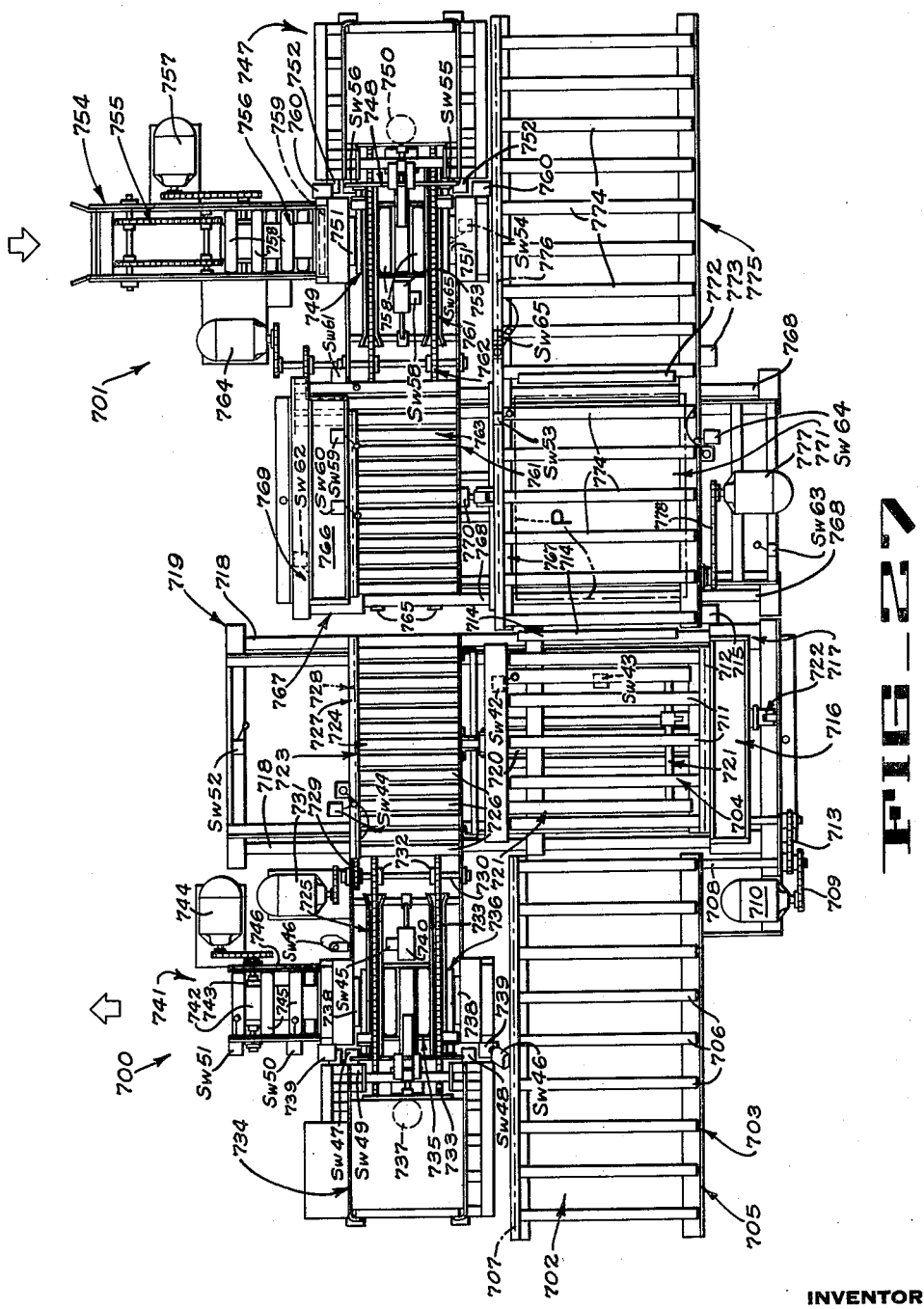

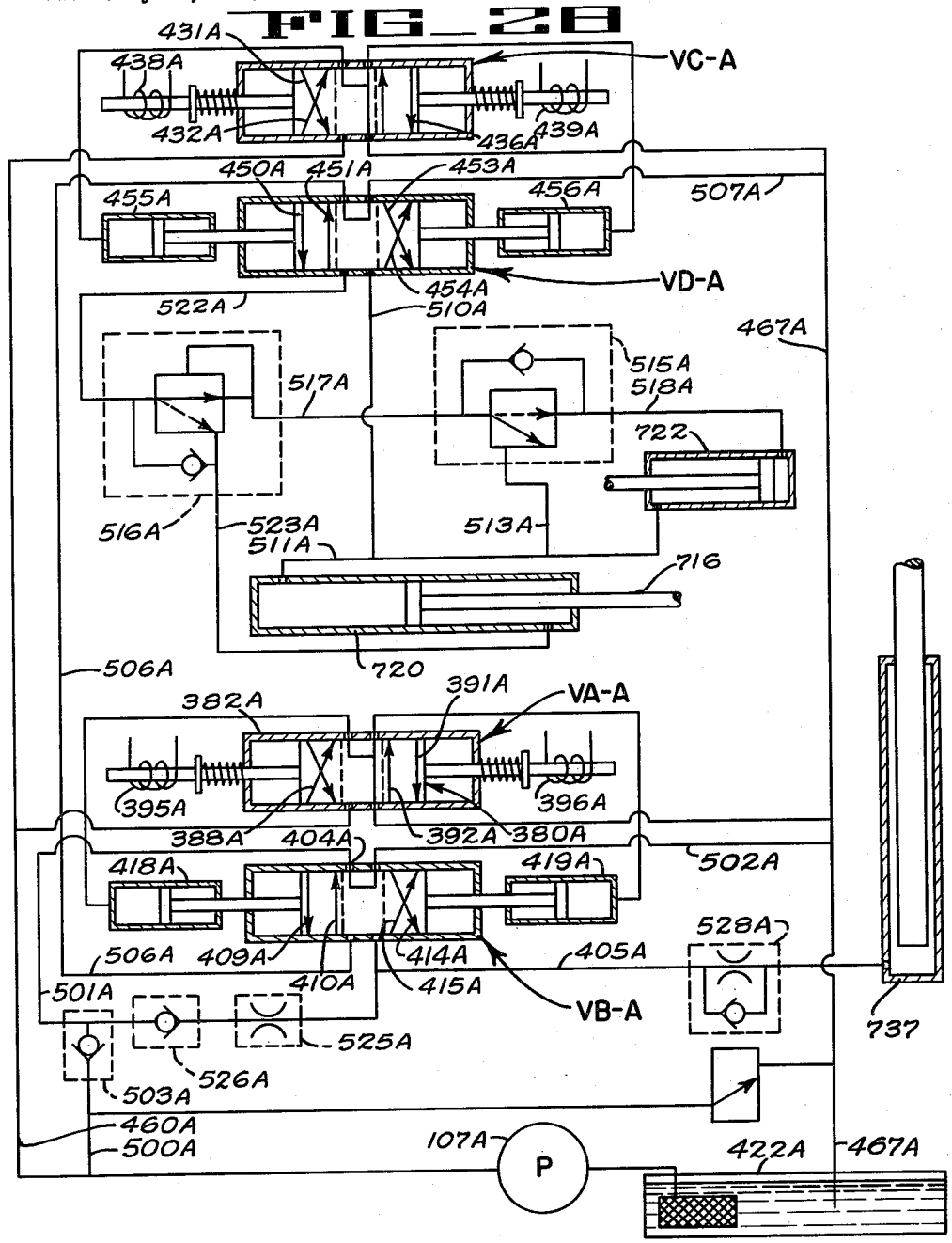

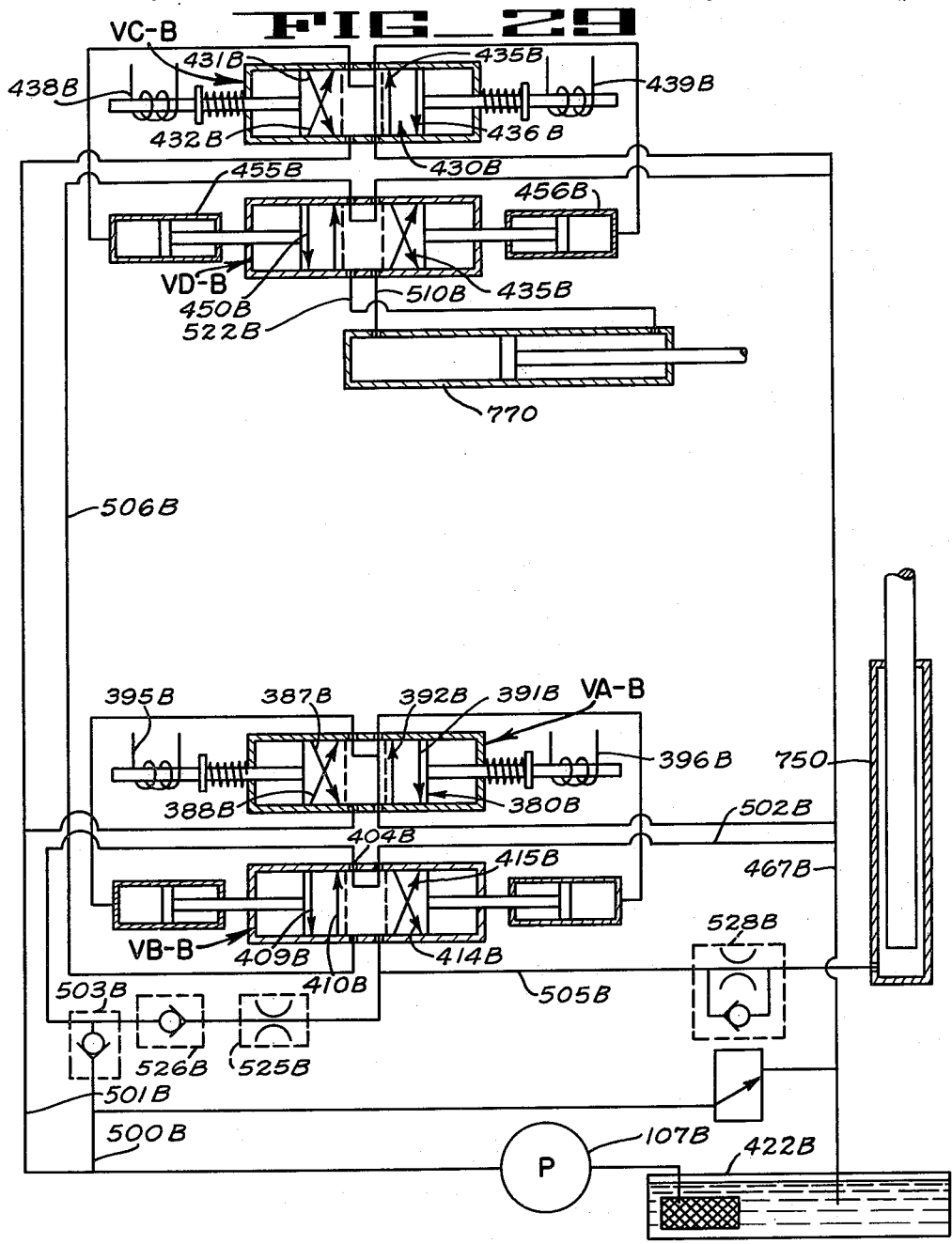

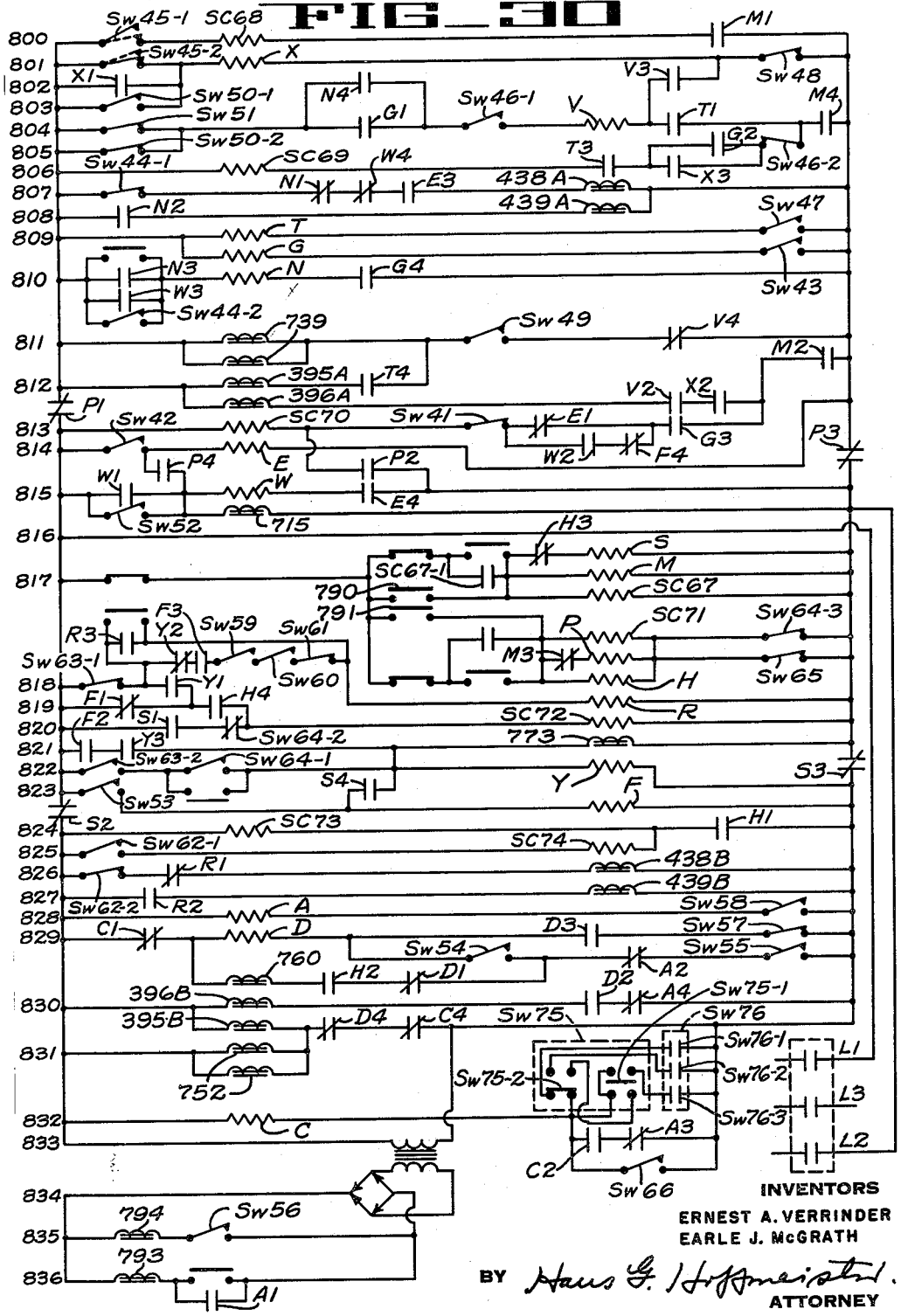

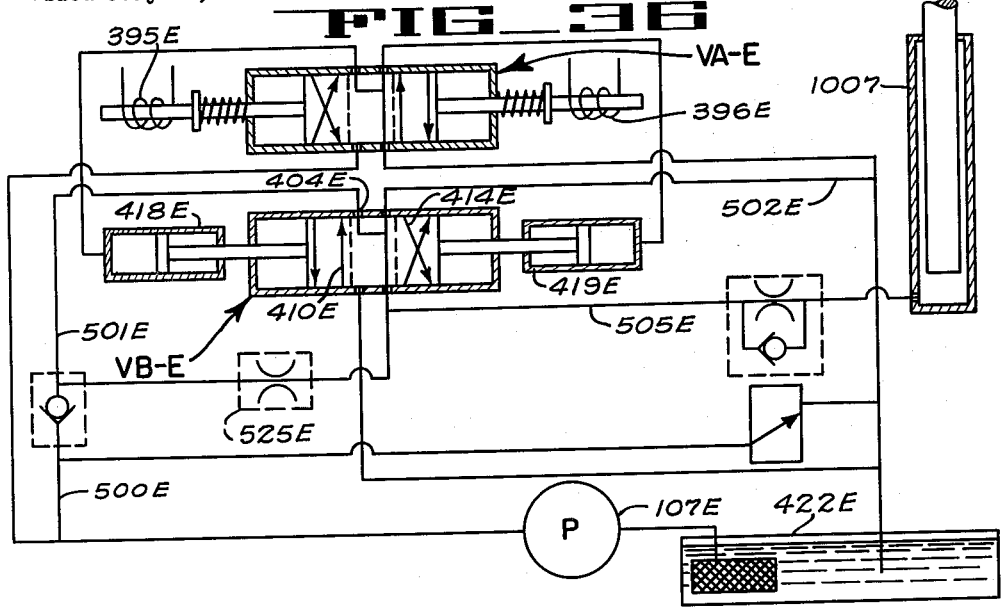
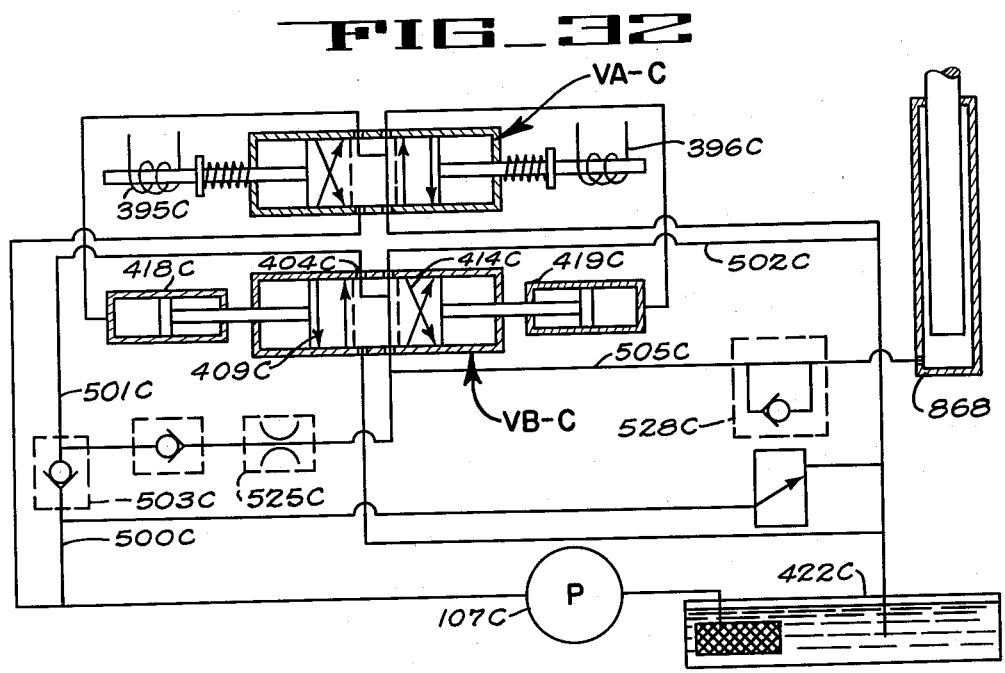

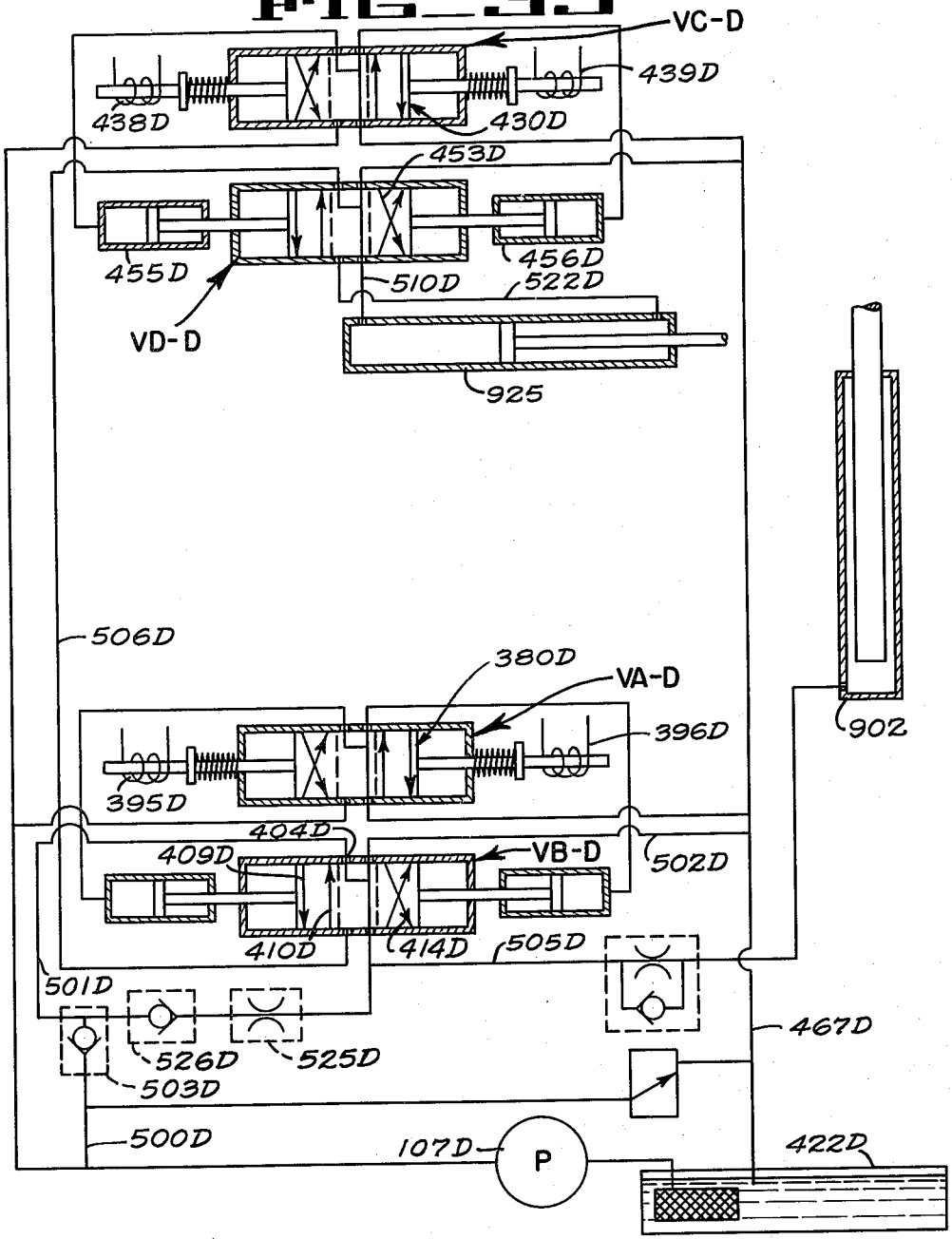

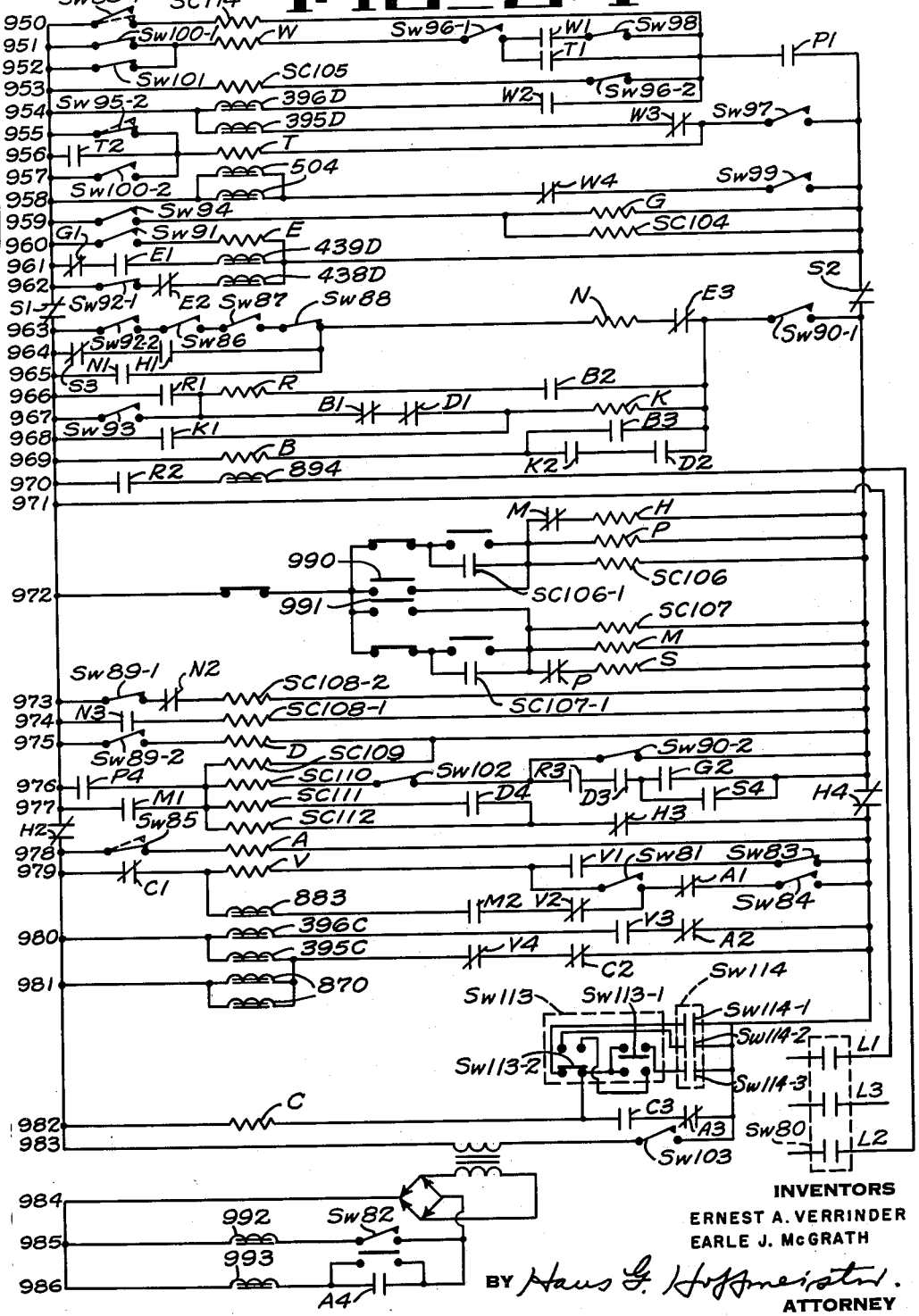

July 25, 1961   E. A. VERRINDER ET AL   2,993,315
APPARATUS FOR HANDLING CASES
Filed July 11, 1955   34 Sheets-Sheet 32
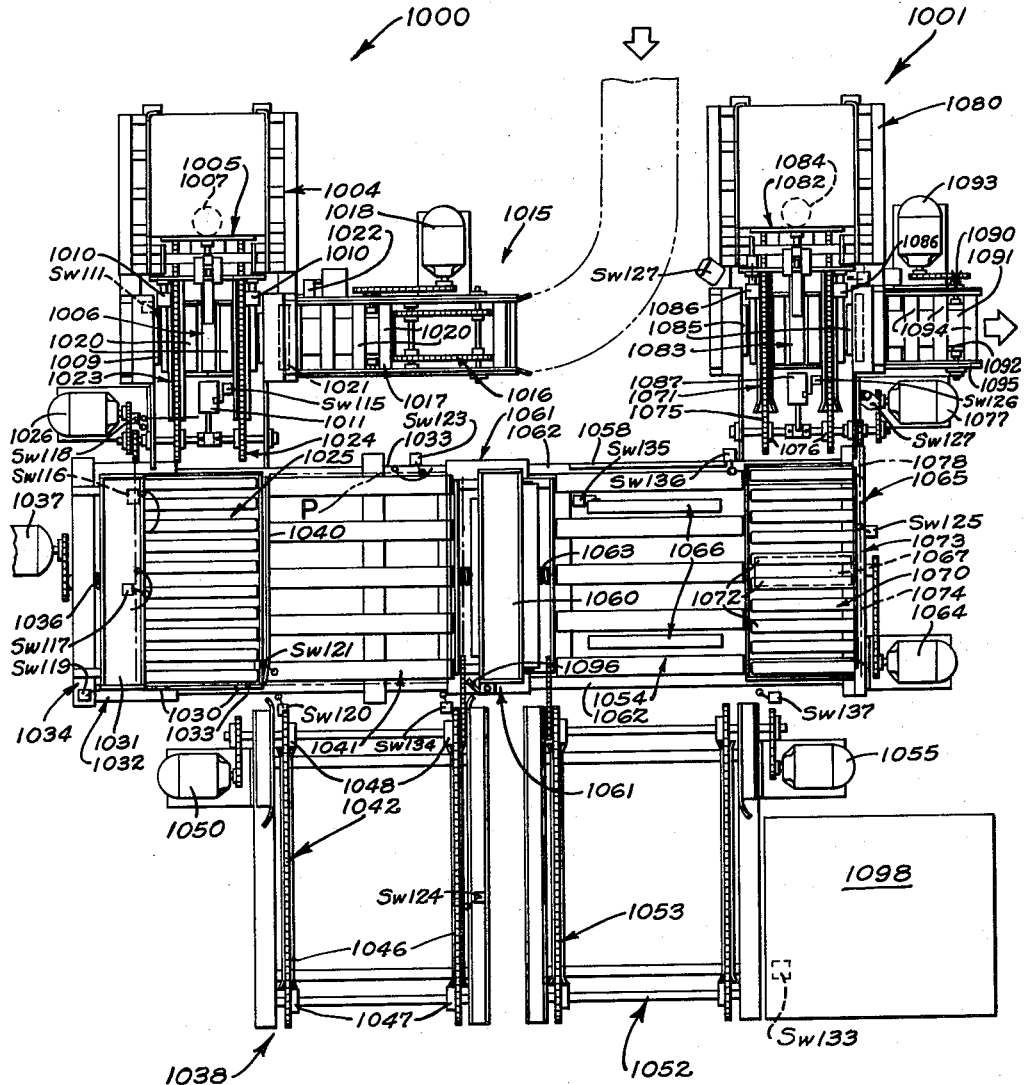
FIG_35
INVENTORS
ERNEST A. VERRINDER
EARLE J. McGRATH
BY Hans G. Hoffmeister
ATTORNEY

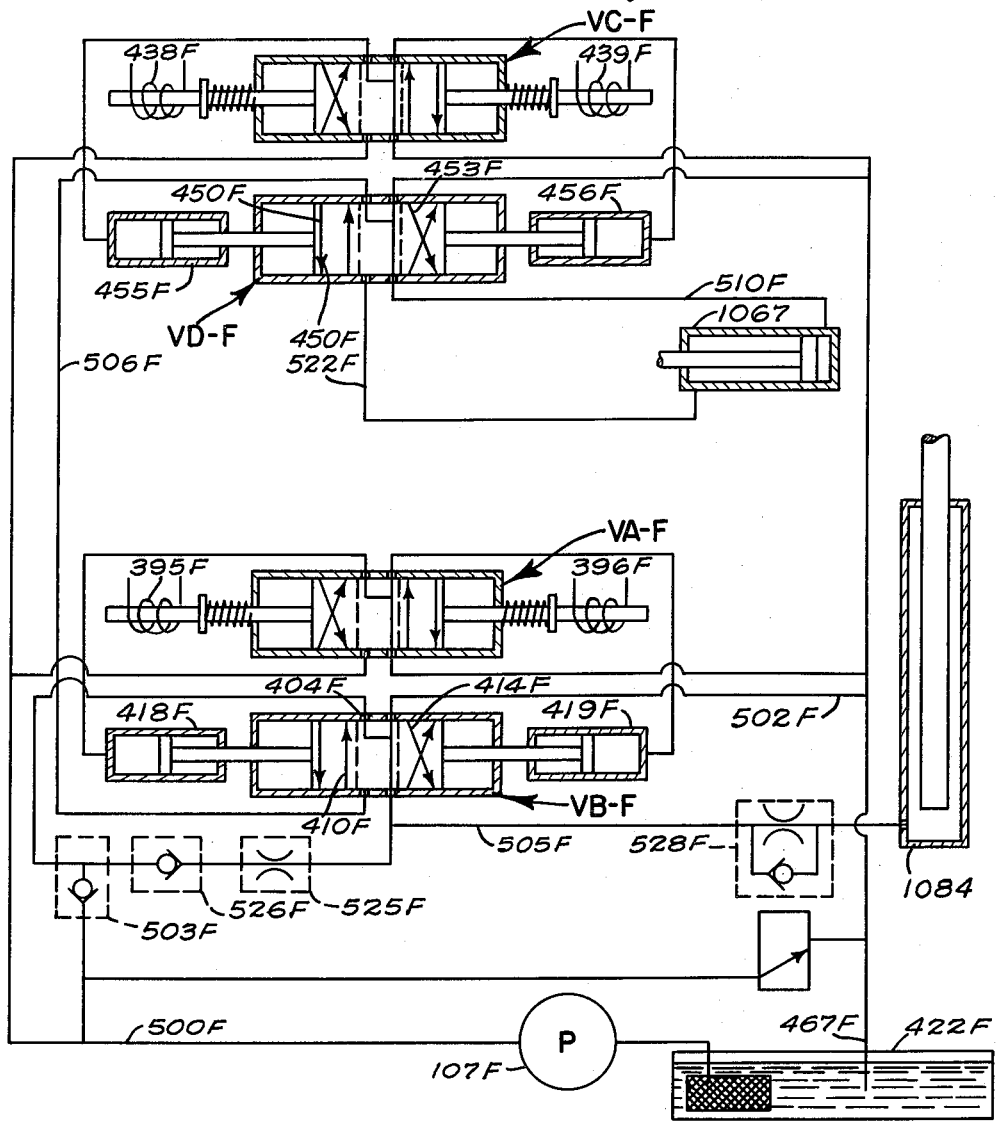

July 25, 1961     E. A. VERRINDER ET AL     2,993,315
APPARATUS FOR HANDLING CASES
Filed July 11, 1955     34 Sheets-Sheet 34

FIG. 38

INVENTORS
ERNEST A. VERRINDER
EARLE J. McGRATH
BY Hans G. Hoffmeister
ATTORNEY

United States Patent Office 2,993,315
Patented July 25, 1961

2,993,315
APPARATUS FOR HANDLING CASES
Ernest A. Verrinder, Riverside, and Earle J. McGrath, Bernardino, Calif., assignors to Food Machinery and Chemical Corporation, San Jose, Calif., a corporation of Delaware
Filed July 11, 1955, Ser. No. 521,011
15 Claims. (Cl. 53—59)

This invention pertains to apparatus for handling boxes, cases and the like and more particularly relates to an improved method of loading cases on and removing cases from a support surface, such as a pallet, and to an improved apparatus for carrying out the method.

In present day processing plants pallets are used extensively for handling both semi-finished and finished products. When the product is disposed in cases, the cases can be stacked one on top of the other and several stacks can be arranged side-by-side on the pallet. With such an arrangement, the cases can be economically and efficiently moved from place to place in the plant by means of a fork lift truck that has tines which are adapted to be inserted in or under the pallet to lift the pallet and the load of cases thereon.

In bottling plants, bottles are continuously being washed, filled and put in cases, and cases of full bottles are continuously being stacked on pallets for removal from the plant. Since cases of full bottles are quite heavy, it is difficult in a modern plant for men to continuously stack full cases on pallets fast enough to keep up with the filling and casing operations.

It is an object of the present invention to provide an efficient method of loading cases of bottles or the like on a pallet.

Another object is to provide an apparatus capable of either loading cases on an empty pallet or removing cases from a loaded pallet.

Another object is to provide means for shifting lines of stacks of cases between a pallet and a conveyor.

Another object is to provide improved conveying means for a pallet loading machine.

Another object is to provide an efficient pallet lifting mechanism.

Another object is to provide an apparatus in which the elements are automatically controlled to carry out their individual functions in a timed and coordinated sequence.

Other and further objects and advantages of the present invention will become apparent from the following description taken in connection with the accompanying drawings.

FIG. 1 is a plan of the case handling machine of the present invention.

FIG. 2 is a fragmentary perspective of the machine of FIG. 1.

FIG. 3 is a fragmentary schematic perspective of the machine of FIG. 1, taken in the direction of arrows 3—3 of FIG. 1.

FIG. 4 is a flow diagram, showing the pallet loading cycle of the machine of FIG. 1.

FIG. 5 is a flow diagram showing the pallet unloading cycle.

FIGS. 6 and 6A are lower and upper portions, respectively, of a composite vertical section through the machine of FIG. 1, taken on line 6—6 of FIG. 1.

FIG. 7 is a fragmentary perspective of the case stacking unit used in the machine of FIG. 1, the unit being shown detached from the rest of the machine.

FIG. 8 is an enlarged fragmentary plan view, particularly shown the case stacking unit of the present invention.

FIG. 9 is a fragmentary perspective of one of two solenoid-controlled case-supporting blades used in the stacking unit of FIG. 6.

FIG. 10 is a vertical section taken on line 10—10 of FIG. 9.

FIGS. 11 and 11A are the lower and upper portions, respectively, of a composite, fragmentary vertical section taken along line 11—11 of FIG. 8, particularly showing the stacking unit in elevation.

FIG. 12 is a vertical section taken on line 12—12 of FIG. 11A.

FIGS. 13 and 13A are left and right portions, respectively, of an enlarged, fragmentary, composite plan of the stacker unit and a portion of the stack conveyor used in the machine of FIG. 1.

FIG. 14 is a reduced fragmentary side elevation looking in the direction of arrows 14—14 of FIG. 13.

FIGS. 15 and 15A are left and right portions, respectively, of a composite vertical section taken along the line 15—15 of FIG. 13 and line 15A—15A of FIG. 13A.

FIG. 16 is a horizontal section taken on line 16—16 of FIG. 15.

FIG. 17 is a fragmentary perspective of a portion of the stack conveyor of the present machine taken in the direction of arrows 17—17 of FIG. 1.

FIG. 18 is an enlarged plan view of a portion of FIG. 17, particularly showing one set of switch-actuating feeler arms, taken along lines 18—18 of FIG. 17.

FIG. 19 is a perspective of a portion of the feeler arm mechanism of FIG. 18, with parts broken away, taken in the direction of arrows 19—19 of FIG. 18.

FIG. 20 is a fragmentary plan view of a portion of the machine of FIG. 1, particularly showing portions of the stack conveyor, the pallet feed conveyor and the pallet discharge conveyor.

FIG. 21 is a vertical section taken on line 21—21 of FIG. 20.

FIG. 22 is a vertical section taken on line 22—22 of FIG. 20.

FIG. 23 is a fragmentary perspective taken looking in the direction of arrows 23—23 of FIG. 8, particularly showing a portion of the control mechanism.

FIG. 24 is a vertical section taken on line 15—15 of FIG. 13.

FIG. 25 is a schematic diagram of the hydraulic control mechanism and the hydraulic circuit used in the machine of FIG. 1.

FIG. 26 is a schematic wiring diagram of the electrical control system used in the case-handling machine of FIG. 1.

FIG. 27 is a plan of a modified arrangement of the case-handling machine of the present invention.

FIGS. 28 and 29 are schematic diagrams of the hydraulic control circuits used in the arrangement of FIG. 27.

FIG. 30 is a schematic wiring diagram of the electrical control system used in the arrangement of FIG. 27.

FIG. 31 is a plan view of a second modified arrangement of the case-handling machine of the present invention.

FIGS. 32 and 33 are schematic diagrams of the hydraulic control circuits used in the arrangement of FIG. 31.

FIG. 34 is a schematic wiring diagram of the electrical control system used in the arrangement of FIG. 31.

FIG. 35 is a plan of a third modified arrangement of the case-handling machine of the present invention.

FIGS. 36 and 37 are schematic diagrams of the hydraulic control circuits used in the arrangement of FIG. 35.

FIG. 38 is a schematic wiring diagram of the electrical control system used in the arrangement of FIG. 35.

In FIGS. 1 and 2 a system for handling cases is illustrated which may be used either as a pallet loading system, a pallet unloading system, or as a combination loading-unloading system. No re-arrangement of parts is necessary when it is desired to shift the machine from one cycle to the other. However, some of the elements that are used during the pallet loading cycle are not used during the pallet unloading cycle and vice versa. Also, some of the elements operate in a different manner during one cycle than they do during the other cycle. Accordingly, in order to fully explain the entire apparatus and its function, it will be necessary to describe each cycle separately.

*Pallet loading cycle.*—When used as a pallet loader, the machine of FIG. 1 comprises a feed conveyor 20 arranged to carry cases one at a time to an accelerator conveyor 21 which, in turn, delivers the cases in single file to a centered position in a case stacking unit 22. The stacking unit is adapted to receive each case and raise it upwardly in the unit, adding it to cases thereabove to form a stack having a desired number of cases. When a stack is formed, it is lowered onto a stack conveyor 23 (FIGS. 1 and 3) which projects at right angles away from the accelerator conveyor and is arranged to carry the stack away from the stacking unit to a position against a pair of pivotally mounted stationary stops 24 located at the end of the stack conveyor. The first stack of cases is detained at the stops 24 until a predetermined number of additional stacks is formed in the stacker unit 22 and carried by the stack conveyor 23 to a position adjacent to and in alignment with the first stack, thereby forming a line of stacks. When a line of stacks is formed, a hydraulically operated ram 25 shifts the line, as a unit, in a direction transverse to the stack conveyor 23 and onto an empty pallet P, which has previously been positioned on a parallelogram lift mechanism 26 at a pallet loading station 27 by a pallet conveyor 28. The pusher 25 is arranged to push the first line of stacks of cases onto the pallet and then return to its original position on the side of the stack conveyor 23 remote from the empty pallet. When the second line of stacks has been formed on the stack conveyor 23, the ram 25 shifts the new line as a unit transversely of the stack conveyor, onto the pallet, and into contact with the first line which is then pushed across the pallet in front of the new line. When the pallet is loaded with a predetermined number of lines of stacks, the operating stroke of the ram is lengthened and it engages the loaded pallet and shifts it bodily onto a gravity discharge roller conveyor 29.

*Pallet unloading cycle.*—When the machine of FIG. 1 is used as a pallet unloader, the cases move in a direction substantially opposite to the direction in which they move when the machine is used as a pallet loader. Accordingly, as seen in the flow diagram (FIG. 5) of the unloading cycle, a pallet PP, loaded with lines of stacks of cases, is deposited on the pallet conveyor 28 which carries the pallet to the unloading station 27 and positions it on the parallelogram lift mechanism 26 (FIG. 1). During the unloading cycle the ram 25 (FIG. 5) is normally positioned on the side of the pallet nearest the gravity discharge conveyor 29. This position will hereinafter be referred to as the unload position of the ram. The ram 25 shifts the line of stacks, one at a time, onto the stack conveyor 23 where each stack is separated from the line and moved into the unstacker unit 22. It will be noted that the stack conveyor 23 has a conveying surface adapted to move the cases in an opposite direction, during the unloading cycle, from the direction it moves the cases during the loading cycle. A fork 30 lifts the entire stack up into the unit 22 and then lowers the cases one at a time onto the accelerator conveyor 21 which delivers the cases in single file to a gravity discharge roller conveyor 31.

The feed conveyor 20 (FIGS. 1 and 3) comprises an endless chain section 32 which has a drive shaft 33 journalled in spaced side plates 35 and 36 of a conveyor support structure and driven by a motor 37 through a drive chain 38 that engages a sprocket 39 on the drive shaft 33. A pair of stationary side rails 40 and 41 (FIG. 2) guide each case as it moves along the feed conveyor 20 and onto the accelerator conveyor 21 which comprises a belt 43 (FIGS. 6 and 8) in frictional engagement with a drive roller 44, which is rotatably journalled in the side plates 35 and 36, and an idler roller 45, which is journalled on the opposite side of the stacker unit 22 in spaced side plates 46 and 47. The drive roller 44 is driven by the motor 37 through the chain 38 which engages a sprocket 49 keyed to an end portion of the roller.

As best seen in FIG. 6, the upper surface of the belt 43 of the accelerator conveyor 21 is in frictional driving contact with a plurality of rollers 51 that form a conveyor surface. Guide rollers 52 maintain the belt in taut condition and in engagement with the conveyor rollers 51. Three of the conveyor rollers 51 are journalled in a U-shaped cradle 53 (FIGS. 6 and 15) which is resiliently mounted on a plurality of springs 54. Each of the springs 54 is disposed around the upper portion of a fixed stud bolt 55, between a nut 56 and the lower surface of the cradle. The resiliently mounted cradle 53 (FIG. 6) extends across the front end of the stacker unit 22, and the rollers 51 of the cradle provide a support surface from which each individual case is lifted upwardly into the stacker unit and onto which each stack of cases is deposited after it is formed in the stacker unit.

The stacker unit 22 comprises a rigid housing 60 (FIGS. 7 and 8) which includes a pair of spaced upright side plates 61 and 62, which are secured to and extend upwardly from heavy base channels 63 and 64, respectively. Transverse channels 65 are positioned under the channels 63 and 64 to hold the housing a predetermined distance above the surface on which the unit 22 is supported. The side plates 61 and 62 are secured together by a plurality of cross braces 66 (FIG. 8) to form a rigid structure which is open at the front and rear sides. A carriage 67 (FIG. 7) is mounted for vertical reciprocation adjacent the open front side of the housing. The carriage 67 comprises a rigid frame made up of two spaced, vertical channels 68 and 69 connected by upper connector plates 70 and lower connector plates 71. The carriage is guided in its vertical movement by means of guide bearings 74 which are secured to the web of each channel and project outwardly to a position between two rigid spaced gib bars 76 which define a guide way for the bearings. Each of the channels 68 and 69 has two such guide bearings 74, one near its upper end and one near its lower end. The fork assembly 30 is mounted on the carriage 67 for vertical reciprocation therewith. The fork assembly comprises three spaced lifter arms 81, 82 and 83 secured together by upper and lower cross bars 84. The bolts 85 which secure the lifter arms 81, 82 and 83 to the cross bars 84 also secure the entire fork assembly to the connector plates 70 and 71 of the carriage. A vertical bumper or guide bar 88 (FIG. 7) is secured by bolts 89 to each of the side lifter arms 81 and 83. These bars, which extend to the top of the carriage 67, and are held in spaced relation to the lifter arms by means of spacer tubes 90, serve to align the rear faces of cases in the stacker unit.

The fork carriage 67 is raised by means of a hydraulic power cylinder 93 which has a lower end pivotally mounted on a bar 94 that extends between ears 95 projecting upwardly from the web of a transverse channel 96. The channel 96 has a mounting plate 97 welded to each end and each plate 97 is bolted to the vertical gib bars 76. The power cylinder 93 (FIG. 7) has a piston rod 100 journalled for sliding movement through the upper end of the cylinder. A connector eye 101, which is secured to the piston rod exteriorly of the cylinder 93, is pivotally disposed on a rod 103 which is anchored at each end in a boss 104 formed on each upper connector plate 70. When fluid is directed into the power cylinder 93, the piston rod 100 is forced outwardly of the cylinder to elevate the fork carriage 67. When the fluid is drained from the cylinder and returned to a reservoir, the fork carriage is permitted to descend by gravity.

Referring to FIG. 8, it will be seen that a pump 107 is mounted inside the unit 22 for supplying fluid to the power cylinder 93. The pump is driven by a motor 108 and is connected in a hydraulic circuit which is controlled by solenoid operated valves 109. The operation and control of the hydraulic circuit will be described in detail hereinafter.

When a case to be stacked is positioned on the fork 30 and the fork carriage is elevated, the case is carried upwardly between two spaced case-supporting blade assemblies 112 (FIGS. 6 and 9), each assembly being mounted on a channel 113 that is secured to one side of the housing 60 and projects outwardly from the forward end of the housing over the accelerator conveyor 21. The two support assemblies 112 are identical but are oppositely disposed so that support blades 115 (FIG. 6) of both assemblies project inwardly into the path of upward movement of the case being raised on the fork 30. A description of one support assembly will serve to disclose the structure of both assemblies. Each assembly 112 (FIG. 9) comprises a pair of horizontally spaced, vertical blocks 117 and 118 which are secured by capscrews 120 to the web of the channel 113. Near its lower end, the block 117 carries a pin 122 on which a bracket arm 123 is pivotally mounted. The block 118 journals an actuating shaft 124 which is aligned with the pin 122 and projects a short distance to each side of the block 118. A lever 125 is keyed to the shaft 124 on one side of the bearing block, while a second bracket arm 128 is secured to the shaft on the other side of the block. The bracket arms 123 and 128 are connected by a flat bar 130 which is secured, as by welding, to the outer end faces of the bars. One of the flat case-supporting blades 115 is secured on the upper surface of the bar 130 of each bracket by capscrews 133. When the actuating shaft 124 is rotated in a counterclockwise direction (FIG. 10) the blade 115 is swung from the full-line position, out of the path of movement of a case being elevated, to the dotted line position in which it extends part way into the path of the case.

The actuating shaft 124 is swung in a counterclockwise direction by a solenoid 134 (FIG. 9). A rod 135, which is secured at one end to the movable core of the solenoid 134, is slidably journalled in a collar 136 secured to one face of a plate 137. A coil spring 140 is disposed between a locknut 141 on the threaded end of the rod 135 and the collar 136, while a collar 138 is secured to the shaft above the fixed collar 136 to limit the downward movement of the rod 135. The plate 137 is connected to the lever 125 through a link 143 and a triangular shafted lever 144 that has a hub 145 pivotally mounted on a pin 146 projecting outwardly from the block 118. When the solenoid 134 is energized, the rod 135 (FIG. 10) is pulled upwardly, compressing the spring 140 and raising the plate 137. The triangular lever 144 is pivoted in a counterclockwise direction about the pin 146, causing the actuating shaft 124 to be swung in a counterclockwise direction to carry the case-supporting blade 115 into the path of movement of the cases.

As best seen in FIGS. 6 and 7, each case-supporting assembly 112 is partially enclosed by a sheet metal guide plate 148 which is secured on its inner side by capscrews 149 to the bearing block 117 and is secured on its outer side to the top surface of the channel 113 by capscrews 150. Each guide plate 148 has a slanted, upper, inner surface 151 adapted to guide to a centered position cases that are being lowered in the stacker unit.

As best seen in FIG. 2, a pair of vertically disposed, elongated gates 160 are positioned across the front of the stacker unit. Each gate 160 comprises a flat, elongated, vertical plate 162 (FIGS. 11–11A) secured by rigid straps 164 to a rotatable rod 165. When the rods 165 are rotated through a part of a revolution, the gates 160 are swung from a closed position against the front face of a stack of cases in the stacker to the open position of FIGS. 11–11A, substantially parallel to the centerline of the stack conveyor, to permit the stack conveyor to remove the stack of cases from the stacker unit during the case stacking operation or, in the unstacking operation, to permit the stack conveyor to bring a stack of cases into the unit 22. The gates 160 are maintained in their closed position during all vertical movement of cases in the stacker in order to prevent the cases from shifting out of alignment during such movement.

Each rotatable rod 165 (FIGS. 11 and 11A) is journalled at its lower end in an angle support member 166 (FIG. 11) which is welded to the outer surface of one of the guide plates 148. At its upper end, the rod is journalled in an angle bar 168 (FIG. 11A) that is secured to and projects forwardly from the housing 60. The two rotatable rods 165 are interconnected for joint rotary movement over a limited range by means of a bar 170 (FIG. 13) that is pivotally connected at one end to a radial arm 171 integrally formed on one rod 165 and, at the other end, to a radial arm 172 integrally formed on the other rod 165. The interconnection is so arranged that clockwise rotation of one rod causes counterclockwise rotation of the other rod. Joint movement of the rods is effected by an adjustable push rod 174 (FIG. 13) that is pivotally connected at one end to a radial arm 175 welded to one of the rods 165 and is pivotally connected at the other end to a lever 176 that is keyed to a shaft 178 journalled in a bearing 179 of a support bracket 180 (FIG. 14) which is secured to the side plate 62 of the housing of the stacker unit. A cam follower lever 181, which is also keyed to the shaft 178, carries a roller follower 182. The follower 182 rides in a camming groove 183 in a plate 184 that is secured by capscrews 185 to the lifter arm 83 of the fork 30. Accordingly, when the fork is elevated, the cam roller follower will be actuated by the upwardly moving cam plate 184 to rotate the shaft 178 clockwise (FIG. 14) swinging the lever 176 clockwise and moving the push rod 174 toward the left. This movement of the push rod 174 causes clockwise rotation of the rod 165 (FIG. 13) to which the push rod 174 is connected, and counterclockwise rotation of the other rod 165, whereby the gates 160 are swung to closed position. Similarly, when the fork is lowered, the gates 160 are moved to open position.

The stack conveyor 23 (FIG. 1) comprises an endless chain section 190 and a live roll section 191. The endless chain section 190 comprises a pair of chains 192 (FIG. 16) disposed in guide channels 193 and trained around spaced idler sprockets 194 which are keyed to a shaft 195 rotatably journalled in bearing assemblies secured to the side plates 61 and 62 of the housing 60. The chains 192 are also trained around drive sprockets 196 and 197 (FIG. 13A) that are keyed to a shaft 198 rotatably journalled in bearing assemblies 199 on the spaced side walls 63a and 64a which are extensions of the channels 63 and 64 (FIG. 7) which support the housing 60 of the stacker unit. The walls 63a and 64a are held in spaced relation by cross braces 201 (FIG. 13a). The shaft 198 is driven by a motor 203 through a chain 204 that is trained around a sprocket 205 on the motor shaft and a sprocket 206 on the shaft 198.

In FIG. 15 it will be noted that the upper surface of the chains 192 is slightly below the level of the top surface of the rollers 51 of the center section of the accelerator conveyor. Also, in FIG. 16 it will be seen that the chains 192 are substantially parallel to the rollers 51 and are disposed between adjacent rollers. With this arrangement, when the fork 30 lowers a stack of cases, the stack is deposited on the rollers 51 first. However, since the rollers at the center section of the accelerator conveyor are journalled in the spring-supported cradle 53, the rollers move downwardly and deposit the stack of cases on the chains 192 of the stack conveyor. The springs, which support the yieldable center section of the accelerator conveyor, are designed so that they will not compress under the weight of a single case of full bottles when it is advanced into the stacker unit by the accelerator, but will compress under the weight of a stack of cases of full bottles. Rails 210 (FIGS. 15 and 15A) are provided on each side of the endless chain section 190 to guide the cases as they are advanced on the stack conveyor.

A paddle 212 (FIG. 15) is disposed centrally of the chains 192 in the path of movement of a stack of cases being moved along by the stack conveyor. The paddle has a support bar 213 keyed to a transverse shaft 214 (FIG. 15A) that is journalled for rotation in bearings 215 (FIG. 13A) mounted on the opposite walls 63a and 64a on the stack conveyor frame. The support bar 213 is pivotably connected at an intermediate portion to a rod 218 (FIG. 15) that is connected by a pivot pin 219 to a bellcrank 220. The bellcrank is pivotably supported by a rod 221 which is journalled in bearings 222 (FIGS. 6 and 15) disposed on a frame member 223 extending transversely of the stack conveyor. The bellcrank 220 is pivotally connected at 228 (FIG. 15) to an ear 229 depending from the underside of the spring-supported cradle 53. When the paddle 212 is depressed by a stack of cases passing over the paddle, the bellcrank is rotated counterclockwise about rod 221 causing the cradle 53 to be drawn downwardly. Therefore, when a stack of cases is carried into the unit 22 during the unloading operation, the paddle 212 and the cradle 53 will be moved downwardly, causing the rollers 51 of the accelerator conveyor to be positioned below the top surface of the endless chains and permitting the stack on the endless chains to enter the unit 22. Also, when the paddle 212 is depressed, its transverse pivot shaft 214 (FIG. 15A) will be rotated counterclockwise to perform a control operation which will be fully explained hereinafter. Two springs 230 (FIGS. 15 and 13A), which are connected at one end to the bellcrank 220 and at the other end to a stationary, adjustable bar 231 (FIG. 15A), urge the bellcrank in a clockwise direction to move the paddle 212 and the cradle 53 to their upper positions.

The live roll section 191 of the stack conveyor comprises a plurality of spaced, parallel rollers 232 (FIG. 17) journalled for rotation in spaced upstanding side walls 233 and 233a. The walls 233 and 233a are connected at one end by a rigid plate 234 and are secured in upright position on the top surfaces of two spaced channels 235 and 236 which are part of the support structure 237 of the ram 25. The support structure 237 will be described in detail presently. Each roller 232 has a sprocket 238 (FIG. 15A) keyed to one end for engagement by a chain 239. The rollers 232 are all rotated simultaneously by the chain 239 which, in turn, is driven by the motor 203 through a chain 240 (FIG. 13A) that is trained around a sprocket 241 on the drive shaft 198 of the endless chain conveyor section and around a sprocket 242 keyed to one of the parallel rollers 232. Thus, the motor 203, which drives the endless chain section 190 of the stack conveyor also drives the live roll section 191 and, accordingly, both sections are in operation at the same time. The stop bars 24 (FIG. 17) are pivotally mounted on the rigid end plate 234 of the frame of the live roll section to stop the movement of the stacks of cases as they are moved along the stack conveyor in a direction away from the stacker unit.

As previously mentioned, a ram or pusher 25 (FIG. 2) is mounted for reciprocating movement over the live roll section 191 of the stack conveyor and over the pallet P positioned at station 27. The ram 25 (FIG. 17) is a box-like member made up of upstanding flat plates 250 and 251 rigidly connected by a horizontal spacer plate 252 and end plates 253 and 254. The end plates project downwardly and terminate at their lower ends in bearing sleeves 255 (FIGS. 15A and 20). The sleeves 255 are connected together by a rigid strap 257 which is directly below the ram 25. Each sleeve 255 is slidably journalled on a rod 260 that extends longitudinally along the sides of the gravity discharge conveyor 29, the station 27 and below the live roll section 191 of the stack conveyor. A crosshead 263 (FIG. 20) extends transversely of the rods 260 and has bearing sleeves 264 slidably supported on the rods 260. Near the center of the crosshead 263 the movable end 265 of a piston of a hydraulic power cylinder 266 is connected so that when pressurized fluid is delivered to the cylinder 266, the crosshead 263 will be moved toward the left (FIG. 20) along the stationary rods 260. The crosshead is connected to the ram 25 by means of two angle-type tie-bars 270 which are secured, at one end, to the crosshead and, at the other end to the rigid strap 257 (FIG. 15A) that connects the sleeves 255 of the ram. The hydraulic power cylinder 266 is double-acting and, accordingly, the direction of longitudinal movement of the ram 25 will depend upon which end of the cylinder the fluid is directed into.

A latch 272 (FIG. 20) is secured to the side face of a rod 273 that is pivotally mounted between flanges 274 and 275 (FIG. 17) that project outwardly from the flat end plate 253 of the ram 25. A spring 276 (FIG. 20), which is connected between the rod 273 and a forward extension 277 of the plate 253, urges the latch 272 inwardly. The latch is positioned at the level of a pallet positioned at unloading station 27. As the ram 25 moves to the right (FIG. 20) to push cases off the pallet, the latch rides along the side of the pallet. After the pallet is unloaded and the ram moves past the right end of the pallet, the latch is spring-urged inwardly so that, when the ram returns toward the left, the latch will engage the pallet and move it onto the discharge conveyor 29.

The previously mentioned frame support structure 237 (FIG. 20) is an elongated, generally rectangular member which supports the live roller section 191 of the stack conveyor, a portion of the pallet conveyor 28, and the discharge conveyor 29 and includes the four corner bearing blocks 278, 278a, 279 and 279a. The blocks 278 and 278a are connected by the longitudinally extending channel 235, and the blocks 279 and 279a are connected by the channel 236. At the stack conveyor end of the frame (FIG. 17), the blocks 278a and 279a are connected by a transverse plate 280, and the channels 235 and 236 are connected by angle bars 281 and 282. At the discharge conveyor end of the frame, the bearing blocks 278 and 279 are connected by transverse plates 283 and 284 (FIG. 20). A pair of longitudinal side rails in the form of angle bars 285 and 286 are secured to the top surface of the channels 235 and 236, respectively, at the discharge end of the frame. Holes in the upstanding flanges of the angle bars journal a plurality of spaced parallel rollers 288 for free rotation. The rollers are positioned to form a conveying surface which slopes downwardly toward the discharge end so that pallets deposited on the rollers will be automatically discharged.

The pallet conveyor 28 (FIG. 1) comprises an endless chain section 290 and a roller secion 291. The endless chain section 290 comprises two chain sections 292 and 293. The chains 294 of section 292 are driven from a motor 295 through a drive shaft 296 and drive sprockets 297. The chains 298 of section 293 are driven half as fast as the chains 294, through drive sprockets 300 and a drive shaft 301 that is driven through a chain and sprocket drive 302 from a shaft 303 of chain section 292.

The roller section 291 of the pallet conveyor 28 comprises a plurality of parallel rollers 305 rotatably journalled in a transverse stationary support bar 304 (FIG. 20) and in bearings 304a in the wall 233a of the frame of the stack conveyor. One of the rollers 305 has a sprocket 306 keyed thereon to receive a drive chain 307. A second one of the rollers 305 has two sprockets 308 and 309 keyed thereon, the sprocket 308 being adapted to be engaged by the chain 307 and the sprocket 309 being arranged to receive a chain 310 that is also engaged around a sprocket 311 on a driven shaft 312. The shaft 312 is driven by a chain 314 that engages a second sprocket 315 on the shaft 312 and a sprocket 316 on the drive shaft 296 of the endless chain section of the pallet conveyor 28. Thus, the roller section of the pallet conveyor has two rollers that are positively driven by the endless chain section of the pallet conveyor and two rollers that are freely rotatable. In addition a short, freely rotatable roller 318 is rotatably mounted at the entrance to the roller section 300 of the pallet conveyor 28.

The parallelogram pallet lift mechanism 26 comprises a pair of spaced bars 325 (FIGS. 20 and 21) each of which is pivotally connected to an arm 326 extending radially from a shaft 327 and to an arm 328 extending radially from a shaft 330. The shafts 327 and 330 extend transversely of the frame and are journalled in bearings 331 secured to the channels 235 and 236. The shaft 330 is rotated by means of a yoke 333 (FIG. 21) that is connected to the piston rod 334 of a double-acting hydraulic power cylinder 335. A pin 337 extends through the yoke 333 and through a hole in a lever 339 that is keyed to the shaft 330. When fluid is directed to one end of the power cylinder 335 to draw the piston rod 334 into the cylinder, the shaft 330 is rotated in a counterclockwise direction and the pallet support bars 325 are moved to their lowered position, indicated by dot-dash lines 338 in FIG. 22, below the conveying surface provided by the rollers 305. When pressurized fluid is directed to the opposite end of the power cylinder, the piston rod 334 (FIG. 21) is forced outwardly of the cylinder to rotate the shaft 330 in a clockwise direction and raise the pallet support bars 325. As the bars 325 move upwardly they contact a pallet on the rollers 305, lift it off the rollers and swing it in an arced path to a position closely adjacent the live roll section 191 of the stack conveyor. In its elevated position the top surface of the pallet is substantially at the level of the conveying surface provided by the rollers of section 191 of the stack conveyor. As a result, lines of stacks of cases can be easily shifted between the conveying surface and the pallet on the bars 325 of the lift mechanism.

A ramp 344 (FIG. 1) is positioned adjacent the pallet conveyor 28 so that a fork lift truck can be run up the ramp to facilitate the depositing of a loaded pallet on the pallet conveyor. The ramp is pivotally mounted on pins 345 at the end of the ramp remote from the pallet conveyor. A pair of springs 346 are connected between the upper edge of a channel 347 in the support frame of the pallet conveyor 28 and the ramp for normally lifting the end of the ramp to a slightly elevated position.

*Hydraulic controls.*—In the hydraulic circuit of FIG. 25, the symbols VA, VB, VC and VD represent four control valves. Valves VC and VD are in the hydraulic circuit controlling the flow of fluid under pressure to the ram cylinder 266 and to the cylinder 335 of the parallelogram lift mechanism 26, while the valves VA and VB are in the hydraulic circuit controlling the flow of fluid to the fork carriage cylinder 93. The valve VA has a valve core 380 slidable to the right and to the left in the bore 381 of a valve housing 382. In order to more clearly disclose the valve and its function, the valve core is illustrated as consisting of three sections 383, 384 and 385 separated by dotted lines. Section 385 has crosspassages indicated by lines 387 and 388, section 384 has a through passage 389 and an angled passage 390, and section 383 has parallel through passages 391 and 392. The valve core 380 is shifted back and fourth in the bore 381 by means of solenoids 395 and 396, the solenoid 395 having a plunger connected to one end of the valve core 380 and the solenoid 396 having a plunger connected to the other end of the valve core.

The valve housing 382 has four ports 398, 399, 400 and 401. The valve core 380 normally assumes a spring-centered position with the passage of the central section 384 establishing communication between certain of the ports in the valve housing. When the solenoid 395 is energized, the valve core is pulled toward the left to align the parallel passages 391 and 392 of section 383 with certain of the ports in the housing. Similarly, when the solenoid 396 is energized, the valve core is pulled toward the right to align the cross-passages 387 and 388 with the ports of the valve housing.

Valve VB is similar in construction to valve VA and comprises a valve housing 403 with four ports 404, 405, 406 and 407. A valve core 408 is disposed for sliding movement in the bore of the housing 403 to align either the parallel passages 409 and 410 of a core section 411, the U-shaped passage 412 of a section 413, or the cross-passages 414 and 415 of a section 416 with certain of the ports of the valve housing. Movement of the valve core 408 in the housing is controlled by hydraulic cylinders 418 and 419, each of which has a piston 420 and 421, respectively, attached by a piston rod to an end of the valve core. When fluid is directed into the cylinder 418, on the side of the piston 420 remote from the valve core, the piston is moved toward the right to align the parallel passages 409 and 410 with the ports of the housing. When fluid is directed into the cylinder 419, on the side of the piston 421 remote from the valve core, the piston is moved toward the left to align the cross passages 414 and 415 with the ports in the valve housing. In the normal spring-centered position, the U-shaped passage 412 is in communication with ports 404 and 405.

As will be explained presently, the position of the valve core 380 of valve VA determines whether fluid will be delivered to the cylinder 418 or to the cylinder 419. Also, the position of the valve core 408 of the valve VB determines whether fluid in the hydraulic circuit will be directed to the cylinder 93 that controls the fork lift carriage 67, to the ram control valve VD, or to a reservoir 422. Thus, the solenoid controlled valve VA acts as a pilot valve for the control valve VB.

The valve VC is identical to valve VA, having a housing 425 with ports 426, 427, 428 and 429, and a core 430 with cross passages 431 and 432, a through passage 433 and a short passage 434, and parallel passages 435 and 436. Solenoids 438 and 439 control the movement of the core 430. The valve VD is identical to valve VB, having a housing 443 with ports 444, 445, 446 and 447, and a core 449 with parallel through passages 450 and 451, a U-shaped passage 452, and cross-passages 453 and 454. Hydraulic cylinders 455 and 456 control the movement of the valve core 449.

In the hydraulic circuit, the pump 107 directs fluid through a pilot line 460—461 to port 401 of valve VA. The port 398 is connected by a line 462 to a port 463 in the cylinder 418, the port 399 is connected by a line 464 to a port 465 in the cylinder 419, and the port 400 is connected by a line 466—467 to the reservoir 422. The pump 107 also directs fluid to the pilot valve VC by means of a line 460—471 which communicates with port 428. The port 426 is connected to a port 472 in cylinder 455 by a line 473, the port 427 is connected by a line 474 to a port 475 in the cylinder 456, and the port 429 is connected by a line 477—467 to the reservoir 422.

The pump 107 delivers fluid to the valve VB through a line 500—501 which communicates with the port 404 in the valve housing. A spring-loaded check valve 503, connected in the line 500—501, is arranged to provide fluid at 60 p.s.i. at all times for pilot pressure. The port 405 of valve VB communicates through line 502—467 with reservoir 422, the port 407 communicates through line 505 with power cylinder 93, and the port 406 communicates through a line 506 with port 444 of valve VD. The port 445 of valve VD communicates through a line 507—467 with the reservoir 422. The port 447 communicates through a line 510—511 with one end of the ram cylinder 266 and through line 510—512 with one end of the power cylinder 335 which controls the parallelogram lift mechanism 26, and through line 510—513 with a sequence valve 515. The valve 515 is in communication with a second sequence valve 516 through a line 517, and the valve 515 communicates through a line 518 with a shut-off valve 519 that is controlled by a solenoid 520. The port 446 of valve VD communicates through line 522 with the sequence valve 516 which, in turn, communicates through a line 523 with one end of the ram power cylinder 266. A partially open needle valve 525 and a check valve 526 are disposed in a drain line 527 connecting the supply line 500 leading from pump 107 with line 505. Also, a deceleration valve 528, which has an integral check valve, is arranged in the line 505 to the fork cylinder 93.

When the solenoid 438 is energized, the valve core 430 is pulled toward the left to align passage 435 with ports 426 and 428 and to align passage 436 with ports 427 and 429. In this position of the valve core, pilot fluid in line 460 is directed through passage 435 and line 473 to the hydraulic cylinder 455 while the cylinder 456 is drained to the reservoir 422 through line 474, passage 436 and line 477—467. The piston in hydraulic cylinder 455 is moved toward the right, shifting the valve core 449 to align the passage 450 with ports 444 and 446 and the passage 451 with ports 445 and 447. With this alignment of the passages, fluid in line 506 will be directed by means of passage 450, line 522, valve 516, line 517, valve 515, line 518 and valve 519 to one end of the power cylinder 335 to raise the lift mechanism 26. When the lift mechanism 26 is fully raised, pressure builds up in internal pilot line 516A of the valve 516 and causes the valve to port fluid through line 523 to one end of the ram power cylinder 266 causing the ram 25 to move in the direction in which it moves to push stacks of cases from the pallet. Also, with this alignment of the passages 450 and 451, the line 511—510 leading to the other end of the ram power cylinder 266 is drained to the reservoir 422 through the passage 451 and line 507—467. Thus, it is to be noted that when solenoid 438 is energized, the ram 25 moves in a pallet unloading direction if there is fluid under pressure in line 506. Accordingly, hereinafter the solenoid 438 will be called the pallet unloading solenoid.

When solenoid 439 is energized, the core 430 is pulled toward the right, aligning passage 431 with ports 426 and 429 and aligning passage 432 with ports 428 and 427. With this setting, pilot fluid in supply line 471 passes through passage 432 and line 474 to the cylinder 456 while the cylinder 455 is drained to the reservoir 422 through line 473, passage 431 and line 477—467. When pilot fluid enters cylinder 456, the core 449 of valve VD is shifted toward the left, aligning passage 453 with ports 444 and 447, and aligning passage 454 with ports 446 and 445. With this valve core setting, fluid under pressure in supply line 506 is directed through passage 453 and line 510—511 to one end of the ram power cylinder 266 causing the ram 25 to move in the direction in which it moves when loading stacks of cases on the pallet. When the ram reaches the end of the stroke, pressure builds up in the line 513 and causes the valve 515 to permit fluid to pass therethrough, whereby the power cylinder 335 is drained through check-valve 529, valve 515, valve 516 and valve VD to reservoir 422. Also, with this valve setting, the other end of the power cylinder 266 is drained to the reservoir 422 through line 523, valve 516, line 522, passage 454, and line 507—467. Thus, it will be noted that when solenoid 439 is energized, the ram 25 is moved in its pallet loading direction if there is fluid under pressure in supply line 506. Accordingly, hereinafter the solenoid 439 will be called the pallet loading solenoid.

The presence of fluid under pressure in supply line 506 depends upon the setting of the control valve VB which is controlled by the solenoid-operated pilot valve VA. When the valve VA is in a centered position, as shown in FIG. 25, the fluid in line 501 is directed to the reservoir 422. A second setting of the valve VA causes fluid to be directed to the fork power cylinder 93 to lift the fork 30 while the supply line 506 is drained. A third setting of the valve VA causes the fork power cylinder 93 to be drained while fluid under pressure is directed through supply line 506.

When the solenoid 395 is energized, the valve core 380 of valve VA is shifted toward the left bringing the passage 392 into alignment with the ports 398 and 401 and bringing the passage 391 into alignment with the ports 399 and 400. With this setting of the valve core, pilot fluid in the supply line 460—461 is directed through passage 392 and line 462 to the hydraulic cylinder 418, while the hydraulic cylinder 419 is drained to reservoir 422 through line 464, the passage 391 and line 466—467. Accordingly, the piston 420 of cylinder 418 is shifted toward the right to move the valve core 408 of valve VB toward the right to align the through passage 409 with ports 404 and 406 and to align the passage 410 with the ports 405 and 407. With this setting, fluid from pump 107 in supply line 500—501 is directed through passage 409 and line 506 to port 444 of valve VD where it is either directed by U-shaped passage 452, and line 507—467 to the reservoir 422 or is directed to either end of the ram power cylinder 266 depending upon whether solenoid 438 or 439 is energized. Also, with this first setting of the valve core 408, the fork power cylinder 93 is drained to the reservoir 422 through line 505, passage 410 and line 502—467, permitting the fork 30 to move downwardly during the formation of a stack to lift an additional case into position under the new stack. It will, therefore, be noted that when the solenoid 395 is energized, the fork 30 is moved downwardly. Accordingly, hereinafter the solenoid 395 will be referred to as the fork lowering solenoid.

When the solenoid 396 is energized, the valve core 380 of valve VA is pulled toward the right to align the cross-passage 388 with ports 401 and 399 and to align the passage 387 with the ports 398 and 400. With this setting of the valve core, pilot fluid in line 461 will be directed through the passage 388 and line 464 to the hydraulic cylinder 419, while the cylinder 418 is drained to the reservoir 422 through line 462, passage 387 and line 466—467. Thus, the piston 421 of cylinder 419 is moved toward the left to shift valve core 408 of valve VB toward the left bringing cross-passage 414 into alignment with ports 404 and 407 and bringing cross-passage 415 into alignment with ports 406 and 405. With this setting of the valve core 408, fluid under pressure in the supply line 500—501 is directed through passage 414 and line 505 to the fork lift cylinder 93 to cause the fork 30 to be elevated. Also, with this setting of the valve core 408, fluid in line 506 will be drained to the reservoir 422 through passage 415 and line 502—467. It will, therefore, be noted that when solenoid 396 is energized, the fork 30 will be elevated. Accordingly, hereinafter the solenoid 396 will be referred to as the fork elevating solenoid.

*Electrical controls.*—Since the present pallet loading and unloading machine is fully automatic, several electric switches are positioned throughout the machine to initiate and coordinate the various operations. These control switches are actuated by the pallet, the cases on the pallet, or by various movable members of the machine. During the pallet loading cycle, full cases are delivered one by one into the stacker unit 22 by the accelerator conveyor 21. When the case reaches a centered position in the unit 22, it contacts a transverse bar 530 (FIGS. 3 and 23) that is disposed across the path of movement of the case. The bar 530 (FIG. 23) is pivotally mounted on the upper ends of two upstanding arms 531 and 532, each of which is pivotally mounted between the arms of a yoke 533 on a pin 534 (only one pin being shown).

The arms 531 and 532 can pivot through a limited range defined by the position of adjustable capscrews 535 and 535a in the yoke. The range of pivotal movement is such that when a case contacts the bar 530, the bar is pivoted forwardly, causing an abutment member 536, carried by the arms 532, to contact an actuator 537 of a switch Sw1. As soon as the case is removed from against the stop bar 530, a spring 538, connected between the arm 531 and one of two spaced yoke-supporting arms 539, returns the bar 530 to normal upright position, with the arms 531 and 532 abutting the stopscrew 535.

Each yoke 533 is mounted on the outer end of one of the arms 539. Each arm 539 has a hub 540 secured by a setscrew 541 to a shaft 542. The shaft 542 is rotatably journalled in rigid support members 543 and 543a. A control arm 544 is secured to the shaft 542 and projects radially outwardly therefrom. A counterweight 544a is secured to the bottom of the arm 544 on the opposite side of the shaft. The weight of the stop bar 530, and the control arm 544 tends to rotate the shaft 542 to move the stop bar 530 downwardly out of case-arresting position. However, the bar is held in its upper position by a lever 545 that is pivotally mounted on a pin 546 which is suitably secured on the frame channel member 64. A spring 547, connected between the side plate 47 and an arm 548 secured to the lever 545, urges the lever 545 in a clockwise direction (FIG. 23) to an upright position wherein a roller 549 on the end of the lever 545 is disposed under the control arm 544, and a stop screw 550 on the lever abuts a suitable stop plate (not shown). The lever 545 is arranged to be withdrawn from position under the control arm 544 by means of a solenoid 551 that has a plunger pivotally connected through a link 551a to the lever 545. With the above arrangement, the stop bar 530 is normally held in upright case-arresting position by the lever 545. When a case contacts the bar, the bar can pivot a limited distance sufficient to actuate switch Sw1, and when the solenoid 551 withdraws the lever 545 the stop bar will automatically swing downwardly.

When the switch Sw1 is actuated, an electric circuit is controlled whereby a stop bar 552 (FIGS. 3 and 6), which is mounted transversely of the accelerator conveyor adjacent the entrance of the stacker unit, is raised to a position in the path of trailing cases on the accelerator conveyor. The stop bar 552 (FIGS. 6 and 16) is rotatably mounted on two arms 553 and 553a which extend radially from tubular hubs 554 that are rotatably mounted on a shaft 555 journalled in the side plates 35 and 36 of the accelerator conveyor 21. Each hub 554 (FIG. 6) has a depending arm 556 whcih anchors one end of a tension spring 557 that is also connected to the base channel 63. The spring tends to pivot the arms 556 in a counterclockwise direction. A solenoid 559 is mounted on the side plate 36. The plunger 560 of the solenoid is pivotally connected to a lever 561 which is mounted on a pivot pin 562 of a fixed bracket 563. The lever 561 carries a roller 564 that bears against the adjacent arm 556 and prevents the weight of the stop bar 552 from pivoting the bar downwardly out of case-arresting position. When the solenoid 559 is energized, the plunger 560 is drawn into the solenoid housing and the lever 561 is pivoted upwardly, releasing the adjacent arm 556 and permitting the stop bar 552 to drop out of case-arresting position. When the solenoid 559 is de-energized, the plunger 560 is moved out of the housing by a spring (not shown) causing the lever 561 to swing the arm 556 in a counterclockwise direction to raise the stop bar 552 to case-arresting position.

In the stacker unit there are four electric control switches Sw2, Sw3, Sw4 and Sw8 (FIG. 3). Switch Sw2 (FIGS. 11A and 12), which actuates a case counting device, is mounted on the inner face of the housing side plate 61 and has an actuator 565 that projects into the path of movement of a pivotal latch 566. The latch is pivotally mounted by means of a pin 567 on a bracket 569 that is secured to one of the upper connector plates 70 of the fork carriage 67. A tubular spacer 570 holds the latch 566 a fixed distance from the bracket 569. When the fork carriage is elevated the latch 566 engages and trips the switch actuator 565. An arm 572, projecting outwardly from the bracket 569, prevents pivotal movement of the latch and, accordingly, the latch acts as a rigid member to operate the switch Sw2. When the fork carriage is lowered, the latch pivots about pin 567 when it contacts switch Sw2 and, as a result, the case counter switch Sw2 is not actuated on the descending stroke of the fork carriage.

The switch Sw3 is mounted on the inner face of the side plate 61 slightly above switch Sw2. Switch Sw3 has an actuator 573 disposed in the path of movement of the bracket 569 and is actuated thereby when the fork carriage is elevated. Since actuation of switch Sw3 stops the elevation of the fork carriage, the bracket 569 will never go past the switch actuator 573.

The switch Sw8 (FIG. 6A) is mounted by means of a mounting plate 575 on the side plate 62 of the stacker housing. Switch Sw8 has an actuator 576 arranged to be contacted by a cam 577 that is mounted on the lifter arm 83. Accordingly, the switch Sw8 is actuated during both the elevating and the lowering movement of the fork carriage 67.

The switch Sw4 (FIGS. 6A and 24) is mounted on the inner face of the side plate 62 and has an actuator 578 arranged to be contacted by a cam 579 mounted on one of the upper connector plates 70 of the fork carriage 67. The switch Sw4 and the cam 579 are so positioned that the switch is actuated when the fork carriage reaches its lowest position.

A safety switch Sw6 (FIG. 24) is mounted at the top of the stacker housing and has an elongated actuator 580 that is disposed directly above the stack of cases being formed in the stacker. If for any reason the formation of the stack is not stopped when the desired number of cases is in the stack, the switch Sw6 will be actuated when the cases are stacked high enough to actuate this switch. Under ordinary operating conditions switch Sw6 will not be actuated.

A switch Sw9 (FIG. 16) is mounted alongside the portion of the accelerator conveyor 21 that carries empty cases out of the unit 22 during the unstacking operation. The switch Sw9 has a pivotally mounted actuator 581 that projects over the surface of the accelerator conveyor in position to be contacted by an empty case that is being carried out of the unstacker unit. The actuator 581 is connected to a cam 582 that is eccentrically mounted on a pivot pin 583. When the actuator 581 is contacted and pivoted by the empty case leaving the unstacker, the cam 582 is rotated, forcing a switch lever 584 in a clockwise direction to trip the switch Sw9.

A photo relay Sw7 (FIG. 8) is mounted on the inlet side of the stacker facing downwardly and inwardly over the central portion of the accelerator conveyor. This switch receives a beam of light projected diagonally upwardly from a projector 586. The beam extends across the path of movement of cases being raised and lowered in the stacker unit. As long as there is a case in the stacker unit, the beam is broken. When the unit is empty, the beam is re-established and projected into the photo relay switch Sw7 to control a circuit in which the switch is connected.

Referring to FIG. 8, it will be noted that when a stack of cases moves onto or off the center portion of the accelerator conveyor the paddle 212 is moved downwardly causing the shaft 214 to be rotated. A double throw switch Sw5 (FIG. 17) is mounted on the outer face of the channel extension 64a and has an actuator 588 arranged to be held in a predetermined position by an arm 589 that is keyed to the shaft 214. When the paddle 212 is in its spring-urged upper position, the actuator 588 is held in the position shown in FIG. 17 wherein one set of contacts is open and the other set is closed. When the paddle is depressed by a stack of cases passing over the paddle, the shaft 214 is swung a fixed distance in a clockwise direction (FIG. 17), permitting the actuator 588 to move to a second position reversing the positions of the two sets of contacts.

Stacks of cases being advanced on the stack conveyor 23 (FIG. 13A) pass by and actuate three consecutive switch actuating linkages 590, 591 and 592. These three linkages are almost identical in construction and operation and it is believed that a detailed description of linkage 590 will adequately disclose all three. Linkage 590 (FIGS. 17 and 18) comprises a pair of oppositely facing feeler arms 593 and 594 which have integrally formed pivot shafts 595 and 596, respectively, (FIG. 19). The shafts 595 and 596 have reduced diameter portions 595a and 596a rotatably journalled in bearing blocks 597 and 598, respectively. The bearing blocks 597 and 598 are secured in spaced relation on the outer face of the base channel extension 64a. Each feeler arm extends radially from one side of its pivot shaft while a short arm 599 extends from an opposite side of the shaft. The two short arms 599 are interconnected by a rod 600 that is pivotally connected to both arms. The reduced shaft portion 596a has a cam disc 602 keyed to its lower end for cooperation with a roller 603 on an actuating arm 604 of a switch Sw20. When either of the feeler arms 593 or 594 is contacted and pivoted by a stack of cases, the other feeler arm is also pivoted. Therefore, the switch Sw20 will be actuated each time a stack passes the linkage 590. A spring 605, connected between the arm 599 and the channel extension 64a, urges the linkage 590 to its inner position wherein an adjustable stop screw 606 abuts the channel extension.

Similarly, the linkage 591 (FIG. 17), which has pivotally mounted feeler arms 601 (FIG. 13A) interconnected by a bent rod 607, is arranged to actuate a switch Sw11 (FIG. 17) each time a stack of cases passes along the stack conveyor. Also, the linkage 592, having feeler arms 608 and 609, is arranged to actuate a switch Sw12 whenever a stack of cases on the stack conveyor comes in contact with the feeler arms.

A normally closed switch Sw18 shown in dotted lines (FIG. 17) is mounted on one of the case guide straps 210 near the end of the endless chain section of the stack conveyor. This switch Sw18 has an actuator arm 610 which is mounted for pivotal, swinging movement in either direction and extends into the path of movement of cases being advanced on the stack conveyor. When a stack of cases is advanced toward the roller section 191 of the stack conveyor, the stack will contact the arm 610 and swing it out of the path of the stack, thereby temporarily opening switch Sw18. When the entire stack clears the arm 610, the stack will be substantially all the way on the roller section 191 in front of the ram 25. Accordingly, the release of the switch arm 610 is an indication that the stack of cases is ready to be pushed onto the pallet at station 27.

A switch Sw17 is mounted on the transverse bottom angle bar 281 of the ram carriage frame (FIG. 17) and has an actuator arm 611 disposed in the path of movement of the rigid strap 257 which connects the sleeves 255 of the ram. When the ram reaches the pallet loading position shown in FIG. 17, the strap 257 contacts and actuates the switch Sw17.

When a pallet loaded with stacks of cases is moved onto the live roll section 291 (FIG. 20) of the pallet conveyor, the pallet contacts an upstanding paddle 612 (FIGS. 20 and 21) that is welded to a shaft 613. The shaft 613 is journalled for rotation in the two spaced walls 233 and 233a of the stack conveyor and has an end portion 613a (FIG. 17) projecting through the wall 233 to receive a cam 614. The cam 614 is arranged to pivot an actuator arm 615 of a switch Sw13. A spring 616, connected between a radial arm 617 secured to the shaft 613 and a bearing block 618, normally urges the shaft 613 in a counterclockwise direction (FIG. 17). With this arrangement, when a pallet hits the paddle 612, the paddle is pivoted downwardly to rotate the shaft 613 in a clockwise direction to actuate switch Sw13 as seen in FIG. 17. When the pallet is removed from against the paddle 612, the spring 616 will rotate the shaft 613 in a counterclockwise direction to return the paddle 612 to upright position and release switch Sw13.

If there are cases on the pallet P when it is in position against the paddle 612, one of the cases will engage and actuate a pair of switch arms 620 (FIGS. 20 and 21) which are mounted almost directly above the paddle 612 on a bracket 621. The arms 620 are arranged to actuate a switch Sw16 which is also mounted on the bracket 621.

A normally closed switch Sw22 (FIG. 20) is mounted on a bracket 623 which is secured to a guide bar 624 at the discharge conveyor end of the frame 237. The switch Sw22 has pivotally mounted actuator arms 625 which extend into the path of and are arranged to be pivoted by a pallet as it is discharged on the discharge conveyor 29.

Adjacent the end of the discharge conveyor 29, a switch Sw15 is mounted on the transverse end plate 283 of the support frame 237. An actuator 627 is disposed in the path of the crosshead 263 and is arranged to be contacted thereby when the ram is in position to start a pallet unloading operation.

While a pallet is being loaded at station 27, the movement of a stack of cases onto the pallet tends to move the pallet onto the discharge conveyor 29. Such movement of the pallet is prevented by a stop bar 630 (FIGS. 20 and 22). The stop bar 630 extends across the frame support structure 237 substantially parallel to the rollers 288 of the discharge conveyor and is rotatably mounted in short arms 631 (one only being shown) which project upwardly from a transverse plate 632. The plate 632 is secured, adjacent its ends, to levers 634 that have hub portions 635 rotatably mounted on the transverse shaft 327. A pair of springs 638, each of which is connected between a downwardly projecting arm 639 of one of the levers 634 and a bolt 640 mounted on a transverse angle bar 641, tend to pivot the stop bar 630 and the plate 632 clockwise around shaft 327 to a raised position to block the movement of the pallet onto the discharge conveyor 29. A latch 643, which is pivotally mounted on a fixed bracket 644, is held in position under the transverse plate 632 by a spring 645 that urges the latch in a clockwise direction to a position against a stationary, adjustable stop 646. The latch 643 is swung in a counterclockwise direction, to release the plate 632, by a solenoid 647 that is mounted on the angle bar 641. With this arrangement, when the solenoid 647 is energized, the latch 643 is pivoted to release the plate 632, permitting the stop bar to drop to its lowered position. When the solenoid 647 is de-energized, the latch is returned to upright position under the plate 632 by the springs 638 and 645 and the spring-loaded plunger 647a of the solenoid.

One of the bars 325 of the parallelogram pallet lift mechanism 26 (FIG. 21) is arranged to contact a laterally projecting actuator arm 648 of a switch Sw19 to close the switch when the lift mechanism is moved to its lowered position. Similarly, the ramp 344 (Fig. 1) is arranged, upon being moved downwardly under the weight of the fork lift truck, to actuate a switch Sw21 which is mounted on the frame of the pallet conveyor.

A normally open switch Sw14 (FIGS. 20 and 21) is mounted on a bracket 649 that is supported from the transverse angle 304. The switch Sw14 has an actuator arm 649a disposed in the path of movement of an upstanding lug 649b secured to one of the longitudinal tie-rods 270 of the ram carriage. When the ram completes the loading of a pallet, the ram carriage is in a position wherein the lug 649b contacts the arm 649a and closes the switch Sw14 to effect the lowering of the pallet stop bar 630.

OPERATION

Since the hydraulic and electrical controls have now been fully explained, the several cycles of operation of the machine will be described with particular reference to the hydraulic and electric control diagrams, FIGS. 25 and 26, respectively.

*Pallet loading cycle.*—In the control diagram of FIG. 26, the vertical lines L1 and L2 represent leads connected to a source of 60 cycle, 3 phase, 220 volt, alternating current. The various auxiliary circuits, which control the operation of elements of the machine and the electrical relays of the circuit, are indicated as generally horizontal lines on the diagram and are numbered adjacent the marginal edge of the diagram as auxiliary control circuits 650 and 681, inclusive. Circuits 678 through 681 are supplied with direct current by the usual rectifier and transformer.

In the control diagram (FIG. 26), the switches are shown in their normal position, as they were wired by the switch manufacturer. It will be understood, however, that the linkage of the paddle 212 (FIG. 3) is initially adjusted so that, when the paddle is in its normal upper position, switch Sw5 is actuated to close the normally open contacts Sw5–1 in circuit 650 and open the normally closed contacts Sw5–2 in circuit 667. These initially adjusted positions are shown in dotted lines while the normal positions are shown in full lines. To start the pallet loading cycle, the selector switch Sw23 in circuit 657 is actuated to open contacts Sw23–1, Sw23–2 and Sw23–3 and close contact Sw23–4 in circuit 681. An empty pallet is then positioned at the pallet loading station to close the switch Sw13 in circuit 668, the parallelogram lift mechanism 26 is moved to its lowered position closing switch Sw19 in circuit 669, the fork carriage 67 is moved to its lowermost position closing switch Sw4 in circuit 665, and the ram 25 is moved to its loading position contacting switch Sw17, closing contact Sw17–1 in circuit 676 and opening contact Sw17–2 in circuit 677. A case counter switch Sw24 is connected in circuit 666 together with a selector switch Sw25. The counting switch Sw24 has three contacts Sw24–1, Sw24–2 and Sw24–3 which are arranged to be closed consecutively as the switch is actuated step-by-step each time the solenoid 682 in circuit 680 is energized. Contact Sw24–1 will be closed when four cases have been piled one on top of the other to form a stack. Similarly, contact Sw24–2 will be closed when five cases are in the stack and contact Sw24–3 will be closed when six cases are in the stack. Selector switch Sw25 has two contacts Sw25–1 and Sw25–2 which are selectively movable to connect one of the contacts Sw24–1, Sw24–2 or Sw24–3 in the circuit 666. In FIG. 26, contact Sw25–1 has been closed to connect contact Sw24–1 in circuit 666, whereby when four cases are in the stack the circuit will be closed.

When the master switch Sw26 is closed and lines L1 and L2 are energized, relay E in circuit 668, relay F in circuit 669, relay T in circuit 665, and relay D in circuit 676 are energized. When photo-relay unit Sw7 in circuit 677 is first energized, normally closed contact Sw7–1 opens. As soon as the photo relay has had time to warm up and is functioning correctly, contact Sw7–1 closes. The start button 683 may then be closed whereby relay M is energized and pump motor starting coil SC–684 is energized to start the pump motor. When relay M is energized contact M1 in circuit 650 is closed causing the motor starting coil SC–685 of the feed conveyor motor 37 to be energized to start the motor for moving the first full case into the stacker. Energizing relay M also closes contact M2 in circuit 655 whereby solenoid 559, which controls the case stop bar 552, is energized to depress the bar 552. When the first case passes over the stop bar 552 and enters the stacker, it contacts the stop bar 530 which actuates and closes switch Sw1 in circuit 655 whereby circuit 655 is closed, since contacts F1 and T1 were previously closed by the energization of relays F and T, respectively. When circuit 655 is closed, relay V is energized and locked in through contact V3. Contact V1 in circuit 655 is opened, de-energizing solenoid 559 and causing the stop bar 552 to be raised in front of the boxes on the accelerator conveyor 21, contact V2 in circuit 661 is closed, energizing the fork elevating solenoid 396, and contact V4 in circuit 663 is opened, de-energizing the fork lowering solenoid 395. The opening of contact V4 also de-energizes the solenoids 134 of the case-supporting blades 115 in circuit 664 which control the case-supporting blades 115.

When the fork 30 moves upwardly to carry the first case up into the stacker, switch Sw1 in circuit 655 and switch Sw4 in circuit 665 are opened. In its upward movement, the fork carriage contacts and momentarily closes switch Sw2 in D.C. circuit 680 to energize solenoid 682 and close a contact of counting switch Sw24 in circuit 666. In the first upward movement of the fork, the first case is carried upwardly past the de-energized case-supporting blades 115 until the fork carriage reaches the top of its stroke where it contacts and opens switch Sw3 in circuit 653. When switch Sw3 is opened, the holding circuit through contact V3 is opened and relay V is de-energized, causing contact V2 in circuit 661 to be opened whereby the fork elevating solenoid 396 is de-energized. The de-energization of relay V also returns contact V4 in circuit 663 to closed condition, thereby to energize the fork lowering solenoid 395 and permit the fork to move downwardly by gravity, permitting switch Sw3 to close. The closing of contact V4 in circuit 664 causes solenoids 134 to be energized and the blades 115 to be projected inwardly into the path of the case being lowered by the fork. The case is deposited on the blades and the fork continues its downward movement.

When the fork carriage reaches its lowermost position, it closes the switch Sw4 in circuit 665 once again whereby relay T is energized to close contact T2 in circuit 655. When circuit 655 is closed, the solenoid 556 is energized and the stop bar 552 pulled down to permit the second case to be moved into the stacker by the accelerator conveyor 21. The second case contacts stop bar 530 which again closes switch Sw1 to energize relay V and start another case elevating cycle. The cycle is repeated until the desired number of cases has been counted by actuation of the step switch Sw2, as described hereinbefore.

When the fourth case has been counted and circuit 666 has been completely closed by the contact Sw24–1, relay C is energized and locked in through contacts C2 and A4 whereby contact C1 in circuit 655 is opened to open the holding circuit through V3 and de-energize relay V. Contact V2 in circuit 661 is thus opened and the fork elevating solenoid 396 is de-energized. Contact C4 in circuits 663 and 664 is opened to open both of these circuits and keep the fork lowering solenoid 395 de-energized and the blade solenoids 134 de-energized. With both the fork elevating solenoid and the fork lowering solenoid de-energized, the valves VA and VB assume the centered positions shown in FIG. 25 and the pressurized fluid in line 500—501 is directed through the U-shaped passage 412 to the reservoir 422. The fork power cylinder 93 is drained to reservoir 422 through the needle valve 525 in line 527, and through line 501, passage 412 and line 502—467 thereby permitting a slow descent of the fork and the stack of cases loaded thereon.

When the fork deposits the stack of cases on the accelerator conveyor 21, the spring mounted center section of the conveyor moves downwardly to set the stack on the chains of the stack conveyor section 190. In its downward movement the center section of the accelerator conveyor contacts switch Sw5 opening conatct Sw5–1 in circuit 650 to de-energize the starter coil SC–685 of accelerator conveyor motor 37, and closing contact Sw5–2 in circuit 667 to energize relay R. When relay R is energized, contact R1 in circuit 652 is closed to energize relay A which closes contact A1 in D.C. circuit 678 to energize solenoid 686 which is arranged to reset the case counter step switch Sw24. With relay A energized, contact A3 in circuit 661 is opened to prevent the fork elevating solenoid 396 from being energized and contact A2 in circuit 655 is opened to prevent the energization of relay V. At this time, stack conveyor section 190 is in operation since the starter coil SC–687 in circuit 662, which causes movement of the conveyor surface away from the stacker unit, was energized by the previous energization of relays M and D, whereby contacts M3 and D2 in circuit 662 were closed. Therefore, when the stack of cases is deposited on the stack conveyor chain section 190, it is immediately carried away from the stacker unit. As the stack leaves the unit, the spring mounted center section of the accelerator conveyor is moved upwardly away from Sw5, permitting the contact Sw5–1 in circuit 650 to close and energize starting coil SC–685 of the feed and accelerator conveyor motor 37, and permitting the contacts Sw5–2 in circuit 667 to open to de-energize relay R. When relay R is de-energized, contact R1 in circuit 652 is opened to de-energize relay A, whereby contact A3 in circuit 661 is closed to ready the fork elevating solenoid 396 and contact A2 is closed to ready the circuit 655 in which switch Sw1 and relay V are connected. Thus, the formation of a second stack is ready to begin as soon as the first stack leaves the stacker unit.

The first stack is conveyed along the stack conveyor section 190 past switches Sw20, Sw18, Sw11, and Sw12 to come to rest against stops 24. When the second stack is formed, it is likewise conveyed along the stack conveyor and comes to rest in position to hold switch Sw12 in circuit 674 closed. When the third stack, moving along the stack conveyor, clears switch Sw18 in circuit 673, and actuates switch Sw11 to close contact Sw11–2 in circuit 674, relay N is energized through circuit 674 which includes closed contact Sw11–2, closed switch Sw12, closed contacts S6 and E2, closed switch Sw18, closed contact K4 and close contact Sw15–2. Relay N is then locked in through contact N3 in circuit 675. The closing of contact N2 in circuit 671 energizes the pallet loading solenoid 439 to start the ram 25 in the direction to push the line of stacks onto the empty pallet positioned at the loading station 27. At the same time, the opening of contact N1 in circuit 670 prevents the energization of the pallet unloading solenoid 438 during this movement of the ram 25. It will be noted in FIG. 25 that, even though the pallet loading solenoid 439 is energized, no fluid will be directed through line 506 to valve VD unless fork lowering solenoid 395 has also been energized to shift valve VB to the position in which fluid from supply line 500 is directed to line 506. Since the fork lowering solenoid 395 is energized only when the fork carriage is being lowered or when the fork carriage is at the bottom of its stroke waiting for a case to be fed into the stacker unit, it will be evident that the ram 25 will not start its pallet loading movement until the fork carriage is in one of these two positions. It will, therefore, be seen that the stacking operation is never halted by the action of the loading ram, since it has priority on the use of the pressurized fluid in supply line 500. It will also be noted in FIG. 25 that, when pallet loading solenoid 439 is energized, fluid from line 506 is directed through passage 453 and line 510 to the pallet loading side of cylinder 266 and to the lowering side of cylinder 335. Since the parallelogram lift mechanism 26, which is controlled by cylinder 335, is already down at this time, the fluid will immediately go to the ram cylinder 266, to move it in the pallet loading direction.

When the ram 25 starts forward in its pallet loading stroke, it releases switch Sw17 permitting contact Sw17–1 in circuit 676 to open and de-energize relay D. Contact D2 in circuit 662 is opened and starting coil SC–687 is de-energized and the stack conveyor is stopped. When the ram 25 moves the first line of stacks completely onto the pallet, the ram carriage closes switch Sw14 in circuit 671 to energize relay K which is then locked in through contact K2 of circuit 672. When relay K is energized, contact K3 of circuit 671 is opened de-energizing the pallet loading solenoid 439, and contact K4 in circuit 675 is opened de-energizing relay N. When relay N is de-energized, contact N1 in circuit 670 returns to closed position to energize the pallet unloading solenoid 438 and start the ram on its return stroke. When the ram contacts switch Sw17 to close contact Sw17–1 in circuit 676, relay D is again energized whereby contact D4 in circuit 670 is opened stopping the ram, and contact D2 in circuit 662 is closed to re-energize starting coil SC–687 and start the stack conveyor once more.

When the second line of three stacks of cases is formed on the stack conveyor in front of the ram 25, switch contacts Sw11 and Sw12 in circuit 674 are closed to energize relay B through contact K1 which was closed when relay K was energized and locked in through holding circuit 672. With relay B energized, contact B3 in circuit 674 is closed, re-energizing relay N through switch Sw18. Contact B4 in circuit 672 is released, unlocking relay K. Relay N is again locked in through contact N3 in circuit 675, contact N2 in circuit 671 is closed, the pallet loading solenoid 439 is energized and the pallet loading movement of the ram 25 is again started. Relay B is also locked in through switch Sw18 and circuit 675. The ram pushes the second line of stacks against the first line of stacks already on the pallet and continues pushing both lines across the pallet until the back edge of the second line is flush with the rear edge of the pallet. At this time the ram carriage contacts and closes Sw14 in circuit 671. Since relay B is energized, contact B1 in circuit 671 is closed and, since relay D in circuit 676 was de-energized when the ram moved away from switch Sw17, contact D3 in circuit 671 is also closed. Accordingly, the solenoids 647, which control the pallet stop bar 630, are energized so that the bar may drop down to permit discharge of the loaded pallet. It will be noted that since relay B is energized, contact B4 in circuit 672 is open and, therefore, relay K is not energized this time when switch Sw14 is closed. As a result the pallet loading solenoid 439 is not de-energized and the ram continues in the pallet loading direction. The latch 272 (FIG. 1) on the ram engages the loaded pallet and shifts it onto the gravity discharge conveyor 29. The ram continues pushing until the ram carriage contacts and opens switch Sw15 in holding circuit 675 to de-energize relays N and B. When relay N is de-energized, contact N2 in circuit 671 is opened and the pallet loading solenoid 439 is de-energized to stop the movement of the ram. At the same time, contact N1 in circuit 670 is returned to closed position to energize the pallet unloading solenoid 438 and start the return movement of the ram to its position against switch Sw17.

If a second pallet is loaded and pushed onto the gravity discharge conveyor 29 before the first loaded pallet is removed from that conveyor, the second loaded pallet will come to rest in a position holding the switch Sw22 in circuit 677 to open position. Then, when the ram 25 returns to its initial position against switch Sw17, circuit 677 will be opened and relay M de-energized to stop all the motors, except the pump motor, of the machine.

*Pallet unloading cycle.*—Before the start of the pallet unloading cycle, the master disconnect switch Sw26 is open, and all switches and contacts are in the positions shown in FIG. 26. To start the cycle, the selector switch Sw23 is actuated to close switch contacts Sw23–1 and Sw23–3 and open contact Sw23–2 in circuit 656 and open contact Sw23–4 in D.C. circuit 681. The ram 25 is then moved to the unload position adjacent the discharge conveyor 29 as shown in FIG. 26 by using a jog button 690 in circuit 675. In this position, the ram carriage holds open the switch Sw15 in circuit 672. The fork carriage 67 is in its lower position to close switch Sw4 in circuit 665, and the parallelogram lift mechanism 26 is lowered to close switch Sw19 in circuit 669. Accordingly, when the master switch Sw26 is closed to energize lines L1 and L2, relay T in circuit 665 and relay F in circuit 669 are immediately energized. Also, in circuit 656 relay S is energized. Contact S15 in circuit 660 is closed, energizing relay P and closing contact P3 in circuit 651 whereby solenoid 551 is energized to unlatch the stop bar 530 permitting it to drop. When the photo cell contact Sw7–1 in circuit 677 is closed and the start switch 683 is closed, relay M is energized and pump motor starting coil SC–684 is energized and locked in through contact SC–684–1. When relay M is energized, contact M1 in circuit 650 closes to energize starting coil SC–685 of the case feeding conveyor motor 37, and contacts M3 and M4 in circuit 662 close to energize the starting coil SC–688 which rotates the stack conveyor motor 203 in a direction to cause the stack conveyor to carry stacks of cases toward the unstacker unit 22. Also, when contact M3 is closed the starting coil SC–689 of the pallet conveyor motor 295 is energized to start the pallet conveyor 28, preparatory to moving a pallet loaded with cases of empty bottles toward the unloading station 27. At this time, the solenoids 134, which control the case-supporting blades 115 and which are connected in circuit 664, are de-energized due to the opening of contact S13. When the fork lift truck runs up the ramp 344 (FIG. 1) to deposit the loaded pallet on the pallet conveyor 28, the ramp swings downwardly and opens switch Sw21 in circuit 662, causing the pallet conveyor motor starting coil SC–689 to be temporarily de-energized and stopping the conveyor while the loaded pallet is placed thereon. After the pallet is deposited on the conveyor and the fork truck is backed off the ramp, the switch Sw21 closes and the conveyor starts up and carries the loaded pallet toward the pallet unloading station 27. When the pallet reaches the unloading station 27, the pallet contacts and closes switch Sw13 in circuit 668 to energize relay E. Contact E1 in circuit 662 is opened, de-energizing the starting coil SC–689 of the pallet conveyor motor 320. Contact E3 in circuit 670 is closed, energizing the pallet unloading solenoid 438 to shift valves VC and VD and direct fluid into line 522 (FIG. 25). Also, as the loaded pallet reached the stack unloading station 27, the cases on the loaded pallet engaged and closed switch Sw16 in circuit 658, closing circuit 658 and energizing shut off valve solenoid 520 which, as seen in FIG. 25, opens the valve 519 and permits flow of fluid from line 522 to the power cylinder 335 of the lift mechanism 26 to raise the lift mechanism and elevate the loaded pallet to the level of the stack conveyor live roll section 191. As the lift mechanism 26 moves upwardly, switch Sw19 in circuit 669 is opened and relay F is de-energized. Contact F2 in circuit 662 is opened and the stack conveyor motor starting coil SC–688 is de-energized. When the lift mechanism 26 is fully raised, the internally controlled sequence valve 516 (FIG. 25) ports fluid into line 523 to be directed to the unload side of the ram power cylinder 266. This causes the ram to move toward the stack conveyor, pushing the load of cases along in front of it until the line of stacks closest to the stack conveyor is positioned on the stack conveyor in contact with and closing switches Sw11 and Sw12 in circuit 674, whereby to energize relay N through contact S10. Contact N1 in circuit 670 opens, de-energizing the pallet unload solenoid 438 and stopping the unloading movement of the ram. Contact N2 in circuit 671 closes, energizing the pallet loading solenoid 439 to cause the ram to return to its unload position adjacent the gravity discharge conveyor 29 where it contacts and opens switch Sw15 in circuit 675. However, relay N remains energized since circuit 675 is still closed through contact F4. When the ram reaches its unload position, fluid pressure builds up in lines 512 and 513 (FIG. 25) causing the externally controlled sequence valve 515 to change its setting and permit the piston in the lift cylinder 335 to travel in the down direction by pushing fluid backwardly through the sequence valve 515. The lift mechanism 26 is lowered, contacting and closing switch Sw19. When switch Sw19 in circuit 669 is closed, relay F is energized. Contact F2 in circuit 662 is closed, re-energizing the stack conveyor starting coil SC–688 and contact F4 in circuit 675 is opened, de-energizing relay N. When relay N is de-energized, contact N2 in circuit 671 opens, de-energizing the pallet loading solenoid 439.

The line of stacks on the stack conveyor is conveyed toward the unstacker, the chain section 190 traveling at a faster rate than the live roll section 191 to open a gap between successive stacks. The first stack of cases depresses the paddle 212 causing the center portion of the accelerator conveyor to be depressed and causing switch Sw5 to be actuated to open contact Sw5–1 in circuit 650 whereby to de-energize starting coil SC–685 to stop the accelerator conveyor motor 37, and to close contact Sw5–2 in circuit 667 whereby to energize relay R. Contact R1 in circuit 652 is closed, energizing relays A and X. The stack continues on into the unstacker to break the light beam of photo relay Sw7. The photo relay Sw7 is of the time delay type so arranged that the stack will continue on into position in the stacker before relay Sw7 is actuated. Actuation of Sw7 opens contacts Sw7–2 in circuit 662 whereby the stack conveyor motor coil SC–688 is de-energized. Actuation of Sw7 closes contact Sw7–3 in circuit 658 and contact Sw7–4 in circuit 655 to energize relay V, which is locked in through contact V3 and switch Sw3. Contact V4 in circuit 663 is opened, de-energizing the fork lowering solenoid 395, while contact V2 in circuit 661 is closed to energize the fork elevating solenoid 396.

As the fork starts to elevate the stack of cases, the fork carriage permits the switch Sw4 to open, and the center section of the accelerator conveyor moves upwardly permitting switch Sw5 to be actuated to open contact Sw5–2 in circuit 667, de-energizing relay R, and to close contact Sw5–1 in circuit 650, energizing the starting coil SC–685 of the accelerator conveyor motor 37 and starting the accelerator conveyor. At the top of its stroke the fork carriage opens switch Sw3 in circuit 653, thereby de-energizing relay X and relay V in circuit 655. De-energizing relay V opens contact V2 in circuit 661, de-energizing the fork elevating solenoid 396 and causing the fork to slowly descend, the fluid in line 505 (FIG. 25) being directed through the restricted opening of the needle valve 525.

In its lowering movement the fork carriage contacts and closes switch Sw8 in circuit 664, whereby the blade solenoids 134 are energized to project the blades 115 inwardly into the path of the descending stack of cases. The switch Sw8 is so located that it is actuated after the lowermost case of the stack is below the blades 115. With this arrangement, the blades 115 will arrest the downward movement of the rest of the stack while permitting the lowermost case to descend with the fork. As the fork continues downwardly switch Sw8 is released and permitted to open, de-energizing the blade solenoids. The weight of the stack of cases will hold the blades in position under the stack.

When the fork carriage reaches its lower position, it deposits the case on the accelerator conveyor and closes switch Sw4 in circuit 665, energizing relay T. Contact T1 in circuit 655 closes, energizing relay V. The accelerator conveyor removes the case from the unstacker. As the case leaves the unstacker, it actuates switch Sw9 closing contact Sw9–1 in circuit 654, to energize relay X, which locks in through contact X1 in circuit 653, and opening contact Sw9–2 in circuit 655 to temporarily de-energize relay V. When the case is clear of the unstacker, it releases switch Sw9 permitting contact Sw9–1 in circuit 654 to open and contact Sw9–2 in circuit 655 to close. Since the light beam of photo cell Sw7 is still broken by the stack of cases in the unstacker, contact Sw7–4 in circuit 655 is still closed. Accordingly, relay V is again energized when contact Sw9–2 in circuit 655 is returned to closed position. When relay V and relay X are both energized, the case releasing and discharging cycle is repeated until all the cases are one by one discharged from the unstacker.

When the last case leaves the unstacker and switch Sw9 is allowed to return to normal position, relay V is not energized because the light beam of photo relay Sw7 is no longer broken and contact Sw7–4 in circuit 655 is open. Accordingly, the fork carriage remains in its lower position. When the light beam of photo relay Sw7 is no longer broken, contact Sw7–2 in circuit 662 is closed to re-energize the stack conveyor motor starting coil SC–688 and start the stack conveyor to bring another stack into the unstacker. This unstacking operation continues as long as stacks are supplied on the stack conveyor.

When the last of the three stacks of cases of the first line of stacks has been advanced along the stacker conveyor toward the unstacker unit to a point where switch Sw11 is released and the contact Sw11–1 in circuit 670 returns to its closed position, the pallet unloading solenoid 438 is again energized. Through the same sequence of operations as before, the last line of stacks remaining on the pallet is pushed over on to the stack conveyor live roll section by the ram, and the ram is returned to its unload position near the gravity discharge conveyor 29. When the last of the three stacks of the last line of stacks is advanced along the stack conveyor to a point where it clears switch Sw11, contact Sw11–1 in circuit 670 is closed and the unload solenoid 438 is again energized causing the ram to be moved toward the stack conveyor. It does not stop this time until it arrives in the load position in contact with and opening switch Sw17. When the last three stacks were pushed over onto the stack conveyor live roll section 191, switch Sw16 in circuit 658 was allowed to open and de-energize solenoid 520 (FIG. 25) controlling the hydraulic shut-off valve 519, whereby the valve 519 closes. This valve, in closing, prevented cylinder 335 from being actuated when unload solenoid 438 was energized and pallet lift mechanism remains in down position until valve 519 is again opened by energizing solenoid 520. When the ram 25 closes contact Sw17–1 in circuit 676, relay D is energized which, through contact D4 in circuit 670, de-energizes the pallet unload solenoid 438.

If it is then desired to unload another pallet load, the jog button 690 in circuit 675 must be manually closed to energize relay N which locks in through contact N3. Contact N2 in circuit 671 is closed to energize the pallet load solenoid 439, whereby the ram is returned to its unload position to contact and open switch Sw15. During the return movement of the ram, the latch 272 engages the empty pallet and pushes it onto the gravity discharge conveyor 29. The opening of Sw15 de-energizes relay N, contact N1 in circuit 670 is opened and pallet unload solenoid is de-energized. The machine is now ready to receive another pallet load of cases of empty bottles.

*Automatic pallet loading and unloading cycle.*—The machine of FIG. 1 can be operated as a combination pallet loader and unloader. When operated in this manner, the machine operates through one complete cycle, either a loading cycle or an unloading cycle, and then shifts over to the other cycle. Thus, if the machine is set to operate first as an unloader, a pallet loaded with stacks of cases of empty bottles will be moved by the pallet conveyor 28 to station 27 where the ram shifts the stacks onto the stack conveyor 23 for movement into the stacker-unstacker unit 22. The empty pallet remains at station 27 and, as soon as the last case of empty bottles is unstacked, full cases are brought in by the accelerator conveyor 21, formed into stacks in the stacker-unstacker unit 22, and positioned on the empty pallet by the stack conveyor and the ram 25. When the pallet is loaded, it is pushed onto the gravity discharge conveyor 29 by the ram 25 which is then in position to unload the next pallet of cases of empty bottles when it is moved to station 27 by the pallet conveyor 28.

If it is desired to start the automatic operation on the unloading cycle, the selector switch Sw23 in circuit 657 (FIG. 26) is set at "automatic," moving the contacts Sw23–1 and Sw23–2 to closed position and contacts Sw23–3 and Sw23–4 to open position. Then, with the ram 25 in unload position closing switch Sw15 in circuit 672, and with the fork carriage 67 in its lowered position closing switch Sw4 in circuit 665, the master switch Sw26 is closed. Since the lift mechanism 26 is in its lowered position closing switch Sw19 in circuit 669, and the photo relay Sw7 is on, the unstacking cycle begins. As described above, the machine finishes the unloading cycle with the ram carriage in load position closing the contacts Sw17–1 of the switch Sw17 in circuit 676 causing relay D to be energized, an empty pallet at station 27 closes switch Sw13 in circuit 668, the pallet lift mechanism 26 is in lowered position closing switch Sw19 in circuit 669, and the fork carriage 67 is in its lowered position closing switch Sw4 in circuit 665. Also, at the end of the unload cycle, contacts of relay S in circuits 656, 657, 658 and 659 are de-energized because contact D1 in circuit 656 is open, switch Sw20 in circuit 657 is opened, contact Sw7–3 of photo relay Sw7 in circuit 658 is open, and contact R1 in circuit 652 is open. With all these conditions present, the machine automatically starts the loading cycle.

During the loading cycle, each stack of cases is counted when it is deposited on the stack conveyor 23 by the fork 30. The counting is carried out by a stack counter unit Sw27 in circuit 660. This stack counter is actuated in steps, one step being taken each time contact A7 in D.C. circuit 679 is closed by solenoid 687 as a result of a newly formed stack depressing the cradle 53 of the accelerator conveyor 21 to close contacts Sw5–2 in circuit 667 whereby to energize relay R, close contact R1 in circuit 652 and energize relay A. When a predetermined desired number of stacks have been deposited on the conveyor, the solenoid closes the contacts Sw27–1 in circuit 660 to stop the stacking operation. Assuming six stacks of cases are to be loaded on the pallet, when the sixth stack actuates the switch Sw5 to close contact Sw5–2 in circuit 667, solenoid 687 closes contact Sw27–1 in circuit 660 energizing relay P. Contact P1 in circuit 655 is opened, denergizing case stop solenoid 559, permitting the stop bar 552 to be locked in the up position to stop the further movement of full cases. Also, contact P4 in circuit 661 is opened to prevent energization of the fork elevating solenoid 396. The raising of the stop bar 552 and the de-activation of the fork 30 effectively prevents further operation of the unit 22 as a stacker. Then when the last stack of cases is conveyed out of the unit 22 on the stack conveyor 23 to clear switch Sw5, contact Sw5–2 in circuit 667 returns to open position de-energizing relay R, opening contact R1 in circuit 652 and de-energizing relay A. When the ram pushes the last line of stacks onto the pallet, the ram carriage contacts switch Sw15 to close contact Sw15–1 in circuit 656 and energize the relay S. As previously explained, closing relay S when relay P is energized, starts the unload cycle.

It will be noted that during the unload cycle, when the first case leaving the unstacker unit 22 trips switch Sw9, contacts Sw9–1 in circuit 654 are closed, energizing relay X, and closing contact X4 in D.C. circuit 681 to energize a solenoid 691 which is arranged upon energization, to reset the stack counter stepping switch Sw27.

MODIFIED ARRANGEMENT—NO. 1

In FIG. 27 a modified arrangement of the case handling machine of the present invention is illustrated. In this arrangement, two complete machines 700 and 701 are set up side by side. The controls of these machines may be set so that the machines operate simultaneously, with machine 700 operating as a pallet unloader, and machine 701 operating as a loader to load cases on pallets which have previously been unloaded by machine 700 and discharged therefrom. With another setting of the controls, the pallet unloading machine 700 is operated alone, using only the pallet conveyor of machine 701 to carry away empty pallets. With still another setting of the controls, the pallet loader 701 is operated alone, using only the pallet conveyor of unloader 700 to supply empty pallets to be loaded.

The pallet unloading machine 700 comprises a pallet conveyor 702 having two aligned roller sections 703 and 704. Section 703 comprises a frame 705 and a plurality of rollers 706 rotatably mounted in the frame. The rollers 706 are driven simultaneously by an interconnecting chain and sprocket mechanism 707 which is driven by a shaft 708. A chain and sprocket drive 709 connects the shaft 708 to a motor 710. The roller section 703 is arranged to receive a pallet loaded with stacks of cases of empty bottles and move the loaded pallet onto the roller section 704 which comprises a plurality of rollers 711 interconnected in driving relation by a chain and sprocket mechanism 712. The roller 711, which is nearest the conveyor section 703, is driven by a chain and sprocket mechanism 713 from the shaft 708.

As the loaded pallet is moved across the roller section 704, it contacts a switch Sw42 and is stopped by a bar 714 which is mounted at the end of the pallet conveyor and is arranged to be moved up to the pallet stopping position by a spring (not shown) and is connected to a solenoid 715 in such a manner that, when the solenoid 715 is energized, the stop bar 714 will be unlatched and lowered to allow a pallet that has been emptied in unloader 700 to pass over the bar and into the pallet loading machine 701. It will be apparent that, when the machine 700 is in operation, the stop bar 714 will remain up until the pallet is completely empty. In this raised position, the stop bar aligns the loaded pallet opposite a ram 716 which is rigidly secured on one end of a carriage 717 that is slidably mounted on stationary rods 718 of a frame 719 for movement transversely over the pallet conveyor section 704. A double-acting hydraulic power cylinder 720 is operatively connected to the ram to move the ram over the pallet conveyor to push a line of stacks off the pallet. Just before the ram 716 moves over the pallet, a parallelogram lift mechanism 721, which in its lowered position holds switch Sw43 closed and is arranged to be actuated by a power cylinder 722, raises the loaded pallet upwardly to the level of the conveying surface of a stack conveyor 723. When the line of cases is shifted onto the stack conveyor, one of the cases contacts switch Sw44. A switch Sw52 is mounted on the frame 719 in position to be actuated by carriage 717.

The stack conveyor comprises a live roll section 724 and an endless chain section 725. The live roll section 724 includes a plurality of rolls 726 suitably mounted for rotation in a frame structure 727 and interconnected by a chain 728 which is trained around a sprocket keyed to each roller and around a sprocket 729 keyed to a drive shaft 730. The shaft 730, which is driven by a motor 731, has a pair of sprockets 732 keyed thereon for driving the chains 733 of the endless chain section 725 of the stack conveyor.

The endless chains 733 are arranged to carry a stack of cases into an unstacker unit 734, which is substantially identical in structure and operation to the unit 22 described in connection with FIG. 3. In general, the unstacker comprises a fork carriage 735, a fork 736 mounted on the carriage, a power cylinder 737 for raising the fork carriage, case-supporting blades 738 controlled by solenoids 739, a paddle 740 arranged to actuate a switch Sw45, and a plurality of electrical switches Sw47, Sw48 and Sw49 which are arranged to be actuated by various operating members of the stacker. When a case is removed from a stack in the unstacker, it is deposited on a case discharge conveyor 741 which comprises a belt 742 trained around an idler drum (not shown) and around a drum 743 driven by a motor 744. A plurality of rollers 745 are rotatably mounted in a frame 746 and disposed above the belt 742 and in frictional driven engagement therewith. A photo-electric switch Sw46 has its beam projected across the path of movement of cases in the unstacker unit, and switches Sw50 and Sw51 have actuators disposed in the path of movement of cases being discharged on the case conveyor 741.

The pallet loading machine 701 comprises a stacker unit 747 which is substantially identical to the unit 22 of FIG. 3. This unit has a fork carriage 748, a fork 749 mounted on the carriage, a power cylinder 750 for raising the carriage 748, case-supporting blades 751 controlled by solenoids 752, a pivotal paddle 753 arranged to actuate a switch Sw58, and a plurality of electrical switches Sw54, Sw55, Sw56 and Sw57 (not shown). The stacker is arranged to receive cases one at a time from a full case conveyor 754 which comprises an endless chain section 755 and a live roll section 756. Both of the sections 755 and 756 are driven by a motor 757, the live roll section 756 being driven at a faster speed than the endless chain section 755. The live roll section 156 is similar to the accelerator conveyor 21 of FIG. 3 and has a plurality of rollers 758 which lie between the fingers or tines of the fork 749, the top surfaces of the rollers being above the tops of the fingers when the fork is in its lowered position. Movement of cases along the conveyor 754 is controlled by a stop bar 759, which is spring urged upwardly to a latched, case-arresting position, and is connected to a solenoid 760 so that, when the solenoid is energized, the stop bar is unlatched and permitted to drop by gravity.

After a stack of cases is formed in the stacker unit 747, it is deposited on a stack conveyor 761 comprising an endless chain section 762 and a live roll section 763, both of which are driven from a motor 764. The endless chain section 762 has an upper run that extends into the stacker 747 at a level below the top of the rollers 758 of the case conveyor section 756, but above the tops of the fingers of the fork 749 when the fork is in lowered position. Electric switches Sw60, Sw59 and Sw61 are mounted to extend into the path of movement of a stack of cases being advanced on the stack conveyor 761. A pair of fixed stops 765 stop the first stack of cases. The second and third stacks come to rest against the preceding stack. A ram 766 is rigidly mounted on one end of a carriage 767, that is slidably mounted on stationary rods 768 of a support frame 769. The ram 766 is moved by means of a power cylinder 770, from a loading position against switch Sw62, transversely over the live roll section 763 of the stack conveyor 761 to push a line of stacks of cases off the stack conveyor and onto an empty pallet P (shown in dot-dash lines) that has been positioned on a pallet discharge conveyor 771, substantially opposite the ram and against a switch Sw53. When the ram reaches the end of its stroke, the ram carriage contacts a switch Sw63 and the cases, that have been shifted onto the pallet, contact a switch Sw64. A stop bar 772 intercepts each empty pallet as it is discharged from the pallet unloading machine 700 and aligns the pallet with the ram 766. The stop bar is urged to its upper, pallet-aligning position by a spring (not shown) and is pulled down to a pallet release position by the energization of a solenoid 773 to which the stop bar is connected.

The pallet discharge conveyor 771 comprises a plurality of parallel rollers 774 rotatably mounted in a fame structure 775. The rollers are interconnected by a chain drive mechanism 776 and are driven by a motor 777 through a chain and sprocket drive 778. When the loaded pallet is discharged by conveyor 771, the pallet contacts a control switch Sw65 that is mounted adjacent the conveyor.

When both machines 700 and 701 are operated simultaneously, a pallet loaded with two lines of stacks of cases of empty bottles is deposited on the pallet conveyor section 703 by means of a fork lift truck. The pallet conveyor moves the loaded pallet onto the roller section 704 where the transversely moving ram 716 pushes the lines of stacks onto the stack conveyor 723. The conveyor 723 carries the stacks one at a time into the unstacker unit 734 where each case is removed from the stack and discharged from the machine on the case discharge conveyor 741.

After both lines of stacks of cases have been shifted onto the stack conveyor 723 by the ram 716, the stop bar 714 is lowered and the empty pallet is moved out of the pallet unloading machine 700 and into the pallet loading machine 701. As soon as an empty pallet is in position against the stop bar 772 of the pallet loading machine 701, the ram 766 will push a completed line of stacks onto the empty pallet after they have been delivered to the stack conveyor 761 by the stacker unit 747. When two lines of stacks of cases have been formed on the pallet, the stop bar 772 is released to permit the loaded pallet to be carried out of the machine by the discharge conveyor 771.

It will be apparent that, while the empty pallet is being loaded by machine 701, another pallet may be unloaded in the machine 700, and a third pallet, loaded with cases of empty bottles may be deposited on the pallet conveyor section 703. Accordingly, the machines may be so arranged that as soon as a pallet loaded with cases of full bottles is moved out of the machine 701 by discharge conveyor 771, an empty pallet is shifted from machine 700 to machine 701, and a pallet load of cases of empty bottles is shifted to unloading position on conveyor section 704.

*Hydraulic circuit—modified arrangement No. 1.*—The hydraulic circuit employed in the pallet unloader machine 700 is illustrated in FIG. 28. This circuit is substantially the same as the system shown in FIG. 25 that is used in the combination loader-unloader machine of FIG. 1. Accordingly, the parts of the hydraulic circuit of FIG. 28, that are identical to parts in FIG. 25 will be given identical reference numerals followed by a suffix A.

When the pump 107A is operating, fluid under pressure is directed through line 500A—501A to port 404A of control valve VA–A. When the fork raising solenoid 396A of pilot valve VA–A is energized fluid is directed through cross-passage 414A of valve VB–A and line 405A to power cylinder 737 to raise the fork carriage 735. When the fork lowering solenoid 395a of pilot valve VA–A is energized, the power cylinder 737 is drained through line 502A—467A and fluid is directed through passage 409A of valve VB–A and line line 506A to the control valve VD–A. When there is fluid in line 506A and the pallet unloading solenoid 438A of pilot valve VC–A is energized, the fluid is directed through passage 450A, line 522A, valve 516A, line 517A, integral check valve portion of valve 515A, and line 518A to the power cylinder 722 to elevate the lift mechanism 721. When the lift mechanism is fully raised, fluid pressure builds up in line 522A and valve 516A, causing the valve to swing to the dotted line position to port fluid through line 523A to the unload end of the ram power cylinder 720 to cause the ram to be moved in the direction to unload lines of stacks from the pallet. If the ram return solenoid 439A of pilot valve VC–A is energized when there is fluid in supply line 506A, the fluid is directed through cross-passage 453–A of valve VD–A and line 510A—511A to the return side of the power cylinder 720 to return the ram 716 to its initial unload position. When the ram reaches its unload position, pressure builds up in line 513A and valve 515A, causing valve 515A to swing to the dotted line position and to permit the lift power cylinder 722 to drain through line 518A, valve 515A, line 517A, valve 516A, line 522A, cross-passage 454A and line 507A—467A.

The hydraulic circuit employed in the pallet loading machine 701 is illustrated in FIG. 29. This circuit is substantially the same as that used in the combination loader-unloader machine of FIG. 1. Accordingly, parts in the circuit of FIG. 29, that are identical to parts in FIG. 25, will be given identical reference numerals followed by a suffix B.

When the pump 107B is operating, fluid is directed through line 500B—501B to port 404B of control valve VB–B. When the fork raising solenoid 396B of pilot valve VA–B is energized, fluid is directed through cross-passage 414B of valve VB–B and line 505B to power cylinder 750 to raise the fork carriage 748. When the fork lowering solenoid 395B of pilot valve VA–B is energized, the power cylinder 750 is drained through lines 502B—467B and fluid is directed through passage 409B of valve VB–B and line 506B to the control valve VD–B. When there is fluid in line 506B and the pallet loading solenoid 439B of pilot valve VC–B is energized, the fluid is directed through cross-passage 453B of valve VD–B and line 510B to the load end of the ram power cylinder 770 to move the ram in a direction to push stacks of cases onto the pallet. If the ram return solenoid 438B of pilot valve VC–B is energized when there is fluid in supply line 506B, the fluid is directed through passage 450B of valve VD–B and line 522B to the return end of the ram power cylinder 770 to return the ram to the load position.

*Electric control circuit—modified arrangement No. 1.*— The electric control circuit for the modified arrangement, shown in FIG. 27, is illustrated in FIG. 30. In FIG. 30, the auxiliary circuits are numbered 800 to 836 inclusive, and the switches are shown in their normal position, as they were wired by the switch manufacturer. It will be understood, however, that the paddle 740 (FIG. 27) in the unstacker unit 734 is initially adjusted so that, when the paddle is in its normal upper position, switch Sw45 is actuated to close the normally open contact Sw45–1 in circuit 800 and open the normally closed contact Sw45–2 in circuit 801. These initially adjusted positions are shown in dotted lines in FIG. 30, while the normal positions are shown in full lines. FIG. 27 shows the positions of the various elements of the machines 700 and 701 at the start of a cycle. It will be noted that, in the pallet unloading machine 700, the ram 716 is in the unload position, the pallet stop bar 714 is elevated, the lift mechanism 721 is in its down position holding switch Sw43 in circuit 809 closed, and the fork carriage 735 is in its lowered position holding switch Sw47 in circuit 809 closed. In the pallet loading machine, the ram 766 is in the load position contacting switch Sw62 to hold contact Sw62–1 in circuit 825 closed and contact Sw62–2 in circuit 826 open, the stop bar 772 is raised, and empty pallet P is positioned against the stop bar 772 holding switch Sw53 in circuit 823 closed, and the fork carriage 748 is in its lowered position holding switch Sw55 in circuit 829 closed.

To put both machines 700 and 701 into operation a master switch Sw40 (FIG. 30) is closed to energize conductors L1 and L2. The unloader start button 790 and the loader start button 791, both in circuit 817, are pushed to energize the circuit and energize relays M and H and to close the magnetic starter coil SC–67 of the motor of pump 107A (FIG. 28) and starter coil SC–71 of the motor of pump 107B (FIG. 29). Also, the photo relay Sw46 in the unstacker unit 734 is turned on so that the beam is projected across the unstacker.

Thus, at the start of the cycle, relays M and H in circuit 817, and relays T and G in circuit 809 are energized. Since M2 and G3 in circuit 813 are closed, the starter coil SC–70 of the pallet conveyor motor 710 is closed and the pallet load of cases of empty bottles onto the roller section 704 adjacent the unloader ram 716. The loaded pallet contacts and closes switch Sw42 in circuit 814 to energize relay E. Contact E1 in circuit 813 opens, de-energizing the coil SC–70 of the pallet conveyor motor 710 causing said conveyor to stop. Since relay T is energized, contact T4 in circuit 812 is closed whereby the fork lowering solenoid 395A is energized and the fluid under pressure in line 506A from pump 107A is directed to port 444A of valve VD–A (FIG. 28). Then, when the pallet closes switch Sw42 in circuit 814 to energize relay E, contact E3 in circuit 807 (FIG. 30) is closed, energizing the pallet unloading solenoid 438A, and causing the pressurized fluid at port 444A of valve VD–A (FIG. 28) to be directed through passage 450A, sequence valves 516A and 515A and line 518A to the power cylinder 722 to raise the lift mechanism 721. As the lift mechanism moves upward, switch Sw43 in circuit 809 opens and relay G is de-energized. Contact G2 in circuit 806 is opened, de-energizing motor starting coil SC–69 and stopping the stack conveyor 723. When the lift mechanism is fully raised, the sequence valve 516A ports fluid into line 523A to be directed to the unload side of the ram power cylinder 720. This causes the ram to be moved toward the stationary stack conveyor 723, pushing the line of cases in front of it until the line of stacks closest to the stack conveyor is positioned on the stack conveyor in contact with switch Sw44, opening contact Sw44–1 in circuit 807 to de-energize the pallet unloading solenoid 438A to stop the ram and closing contact Sw44–2 in circuit 810 to energize relay N, which locks in through contact N3.

When relay N is energized, contact N1 in circuit 807 is opened and contact N2 in circuit 808 is closed, energizing the carriage return solenoid 439A. The ram is then returned to the unload position and the lifting mechanism 721 is lowered, closing switch Sw43 in circuit 809 to energize relay G. Contact G2 in circuit 806 closes to energize the motor starting coil SC–69 and start stack conveyor 723 again, whereby the stacks of cases are carried one by one into the unstacker unit 734. The first stack of cases hits paddle 740 and actuates switch Sw45 to open contact Sw45–1 in circuit 800 and close contact Sw45–2 in circuit 801, whereby the case discharge conveyor motor starter coil SC–68 is de-energized and relay X is energized. As the stack enters the stacker, it breaks the beam of photo relay Sw46 to close contact Sw46–1 in circuit 804 to energize relay V which locks in through contact V3. Contact Sw46–2 in circuit 806 is opened, coil SC–69 is de-energized and the stack conveyor is stopped. When relay V is energized, contact V4 in circuit 811 is opened, de-energizing the fork lowering solenoid 395A, and contact V2 in circuit 812 is closed, energizing the fork raising solenoid 396A. As the fork is elevated, switch Sw47 in circuit 809 is allowed to open, de-energizing relay T and opening contact T1 in circuit 804. As the fork carriage reaches the top of its stroke, it opens switch Sw48 in circuit 801, de-energizing relay X and relay V in circuit 804.

When relays X and V are de-energized, contacts X2 and V2 in circuit 812 are opened and the fork raising solenoid 396A is de-energized. Since the fork lowering solenoid 395A is also de-energized, the pilot valve VA–A is in centered position and the fork is allowed to move downward slowly.

In its lowering movement, the carriage contacts and closes switch Sw49 in circuit 811, whereby the solenoids 739 are energized to project the blades 738 inwardly into the path of the descending stack of cases. The switch Sw49 is so located that the blades will permit the lowermost case to continue downwardly while arresting the downward movement of the rest of the stack. When the fork reaches its lower position, it closes switch Sw47 in circuit 809, energizing relay T and closing contact T1 in circuit 804 to energize relay V. The case is deposited on the case discharge conveyor 741, which carries it out of the machine. As the case leaves the unstacker unit, it contacts switch Sw50 to close contact Sw50–1 in circuit 803, energizing relay X and closing contact X2 in circuit 812. Since the beam of the photo relay Sw46 is still broken by the cases remaining in the unstacker, contact Sw46–1 in circuit 804 is still closed and relay V is still energized. Then, with contacts V2 and X2 in circuit 812 closed, the fork raising solenoid 396A is again energized and the fork is raised and the case unstacking operation is repeated until all the cases are discharged one by one from the unstacker. When the last case leaves the unstacker, the beam of the photo relay Sw46 is no longer broken. Accordingly, contact Sw46–1 in circuit 804 is opened, relay V is de-energized, and contact V2 in circuit 812 opened whereby the fork raising solenoid 396A is de-energized and the unstacking operation is stopped. Similarly, since the photo relay beam is no longer broken, contact Sw46–2 in circuit 806 is closed and the stack conveyor motor is energized to bring another stack of cases into the unstacker unit.

When the third stack of cases on the stack conveyor 723 clears switch Sw44, contact Sw44–1 in circuit 807 is closed and the solenoid 438A energized to raise the lift mechanism 721 and start the ram across the pallet to push the second line of stacks onto the stack conveyor. Since there is only one line of stacks on the pallet, the ram has to make an extra long stroke in order to shift the line to the stack conveyor. At the end of this stroke the line of cases contacts switch Sw44, opening contact Sw44–1 in circuit 807 to de-energize the pallet unloading solenoid 438A to stop the ram and closing contact Sw44–2 in circuit 810 to energize relay N. Contact N2 in circuit 808 is closed, energizing the carriage return solenoid 439A to return the ram to unload position and to lower the lift mechanism 721. Also, at the end of this extra long stroke, the ram carriage momentarily closes switch Sw52 in circuit 815 and energizes solenoid 715, whereby stop bar 714 is unlatched and permitted to move downwardly out of pallet arresting position. The solenoid 715 remains energized through contact W1 in circuit 815. The pallet conveyor motor starter coil SC–70 in circuit 813 is energized through contacts W2, F4, G3 and M2, contact G3 being closed when the lift mechanism 721 lowers and closes Sw43 in circuit 809. The pallet conveyor then moves the empty pallet into the pallet loading machine. It is to be noted that if a pallet is still being loaded in the pallet loading machine, switch Sw53 in circuit 823 will be held closed by the pallet being loaded and relay F will be energized. Contact F4 in circuit 813 will then be open and the pallet conveyor of the unloading machine cannot be energized until the pallet being loaded in the loading machine is moved away from switch Sw53. When switch Sw53 is cleared, the empty pallet is moved into the loading machine, releasing switch Sw42 in circuit 814. As soon as switch Sw42 is opened, relay E is de-energized, contact E4 in circuit 815 is opened and solenoid 715 is de-energized, permitting stop bar 714 to be raised again.

At this time the ram 716 is in the unload position, the lift mechanism 721 is lowered, and the stop bar 714 is in elevated position. With these conditions, the unloading machine is ready to unload another pallet as soon as it is moved to position over the lift mechanism 721 by the pallet conveyor 702.

While the pallet unloading machine 700 is unloading a loaded pallet, the loading machine 701 is loading an empty pallet which was previously delivered to the loading machine by the unloading machine. It is, of course, possible to manually place an empty pallet on the pallet discharge conveyor 771 against the stop bar 772. At the beginning of the loading operation, a selector switch Sw75 in circuit 832 is set to close either or both contacts Sw75–1 and Sw75–2. With a particular setting of the selector switch one of consecutively actuated contacts Sw76–1, Sw76–2 or Sw76–3 of counter switch Sw76 will be connected in the circuit 832. The setting shown in FIG. 30 connects contact Sw76–1 in the circuit. Since the contact Sw76–1 is the fourth contact of Sw76 to be closed and since one contact is closed each time a case is added to the stack being formed, the circuit 832 will be energized when a stack four cases high is formed. Also, at the beginning of the operation, the pallet to be loaded is disposed against the stop bar 772, closing switch Sw53 in circuit 823 and energizing relay F. The ram 766 is in the load position, contacting switch Sw62 to close contact Sw62–1 in circuit 825 and open contact Sw62–2 in circuit 826. The fork carriage 748 is in its lowered position holding closed switch Sw55 in circuit 829. The stop bar 759 is in lowered position and the full case conveyor 754 is operating to advance a case toward the stacker unit.

When the first case enters the stacker, it contacts and closes switch Sw54 in circuit 829 energizing relay D which locks in through D3. Contact D1 in circuit 829 is opened, de-energizing solenoid 760 and permitting the stop bar 759 to be raised in front of following cases on the full case conveyor 755. Contact D4 in circuit 830 is opened, de-energizing the fork lowering solenoid 395B and contact D2 in circuit 830 is closed, energizing the fork raising solenoid 396B to cause the fork to start upwardly with the first case. The opening of contact D4 also de-energized the blade solenoids 752 in circuit 831.

In its upward movement, the fork carriage closes switch Sw56 in D.C. circuit 835 to energize solenoid 794 which closes a contact of the case counter switch Sw76 to register the first case. The case is carried upwardly past the de-energized blades 751 until the fork carriage reaches the top of its stroke where it contacts and opens switch Sw57 in circuit 829, de-energizing relay D, and opening contact D2 in circuit 830 to de-energize the fork raising solenoid 396B. Contact D4 in circuit 830 is closed to energize the fork lowering solenoid 395B, permitting the fork to be lowered and switch Sw57 to close. Closing of contact D4 also energizes the solenoids 752 causing the blades to be projected into the path of the case being lowered by the fork. The case is deposited on the blades and the fork continues in its downward movement.

When the fork carriage reaches its lowermost position, it closes switch Sw55 in circuit 829, energizing solenoid 760 to pull the stop bar 759 down and permit the conveyor 754 to move the second case into the stacker unit. The second case contacts and closes switch Sw54 in circuit 829 to energize relay D and start another case elevating cycle. When the last case has been counted and contact Sw76–1 in circuit 832 has been closed, relay C is energized and locked in through contact C2. Contact C4 in circuit 830 is opened, de-energizing the fork lowering solenoid 395B and contact C1 in circuit 829 is opened, de-energizing relay D and opening contact D2 in circuit 830, whereby to de-energize the fork raising solenoid 396B. With both the fork lowering solenoid 395B and the fork raising solenoid 396B de-energized, the fork power cylinder 750 is drained to the reservoir through the needle valve 525B causing a slow descent of the fork and the stack of cases thereon. When the fork deposits the stack on the full case conveyor, the center portion of the case conveyor moves downwardly to deposit the stack on the stack conveyor 761 for removal from the stacking unit. As the stack depresses the center portion of the case conveyor 754 it closes switch Sw58 in circuit 828, energizing relay A and closing contact A1 in D.C. circuit 836 to actuate a solenoid 793 to reset the case counter Sw76. Contact A3 in circuit 832 is opened to de-energize relay C, closing contact C1 in circuit 829. As soon as the stack moves off the paddle 753 which is connected by linkage to the center portion of case conveyor 754, switch Sw58 in circuit 828 opens, de-energizing relay A. Contact A2 in circuit 829 is closed and solenoid 760 is energized to pull down stop bar 759 and permit a new case to enter the stacker unit. The new case contacts and closes switch Sw54 in circuit 829 to energize relay D and start another stack forming cycle.

As the first stack moves along the stack conveyor 761 it momentarily contacts switches Sw61, Sw59 and Sw60, all in circuit 818 and comes to rest against the stops 765. The second stack comes to rest against the first stack, holding switch Sw60 closed. The third stack closes switch Sw59 and momentarily opens switch Sw61. As soon as the third stack clears Sw61, circuit 818 is energized, energizing relay R which locks in through contact R3. Contact R1 in circuit 826 opens, de-energizing the carriage return solenoid 438B, and contact R2 in circuit 827 closes, energizing the pallet loading solenoid 439B. The ram 766 is moved forwardly to push the first line of stacks of cases onto the pallet. At the end of its stroke, the ram carriage contacts switch Sw63, opening contact Sw63–1 in circuit 818 to de-energize relay R. Contact R2 in circuit 827 is opened and contact R1 in circuit 826 is closed. The ram is returned to its loading position to contact switch Sw62, opening contact Sw62–2 in circuit 826 to de-energize the carriage return solenoid 438B and closing contact Sw62–1 in circuit 825 to energize the stack conveyor magnetic starting coil SC–74 whereby to start the stack conveyor.

When the second line of stacks has been formed in front of the ram 766, the ram is moved forwardly to push it onto the pallet, shifting the first line across the pallet to a position contacting switch Sw64 to close contact Sw64–1 in circuit 822. As before, the ram carriage closes contact Sw63–2 in circuit 822, energizing relay Y which locks in through Y3. Also, the ram carriage opens contact Sw63–1 in circuit 818 to de-energize relay R and cause the ram to be returned to its load position. As soon as the ram carriage releases switch Sw63, contact Sw63–1 in circuit 818 closes, and the pallet conveyor starter coil SC–72 is energized through contacts Y1 and H4. Since relay Y is energized, contact Y3 in circuit 821 is energized, energizing the solenoid 773 that pulls the pallet stop bar 772 downwardly out of pallet-arresting position. The loaded pallet is then carried out of the machine by the pallet conveyor 771. As the loaded pallet is moved away from the pallet loading station, it contacts and opens a switch Sw65, in circuit 817. The pallet conveyor continues to advance the loaded pallet out onto the pallet conveyor rolls 774. The pallet stop solenoid 773 in circuit 821 is kept energized until the pallet releases switch Sw53 to de-energize relay F, and open contact F2 in circuit 821. When the solenoid 773 is de-energized, the stop bar 772 will be released to the pallet-arresting position. The pallet loading machine is then ready to receive another empty pallet from the pallet unloading machine. If two pallets are allowed to accumulate on the pallet conveyor rolls 774, switch Sw65 will be held open. As the second line of stacks is pushed onto the pallet, Sw64 is contacted, openign contact Sw64–3 in circuit 817. This will de-energized SC–71 and relay H and shut off all motors on the pallet loading machine 747. The machine will not start again until the pallet, that is holding switch Sw65 depressed, is removed and the start button 791 is pushed.

In order to keep associated equipment in full operation, it may be necessary at times to operate only the pallet unloading machine 700. Under other conditions, it may be desirable to operate only the pallet loading machine. To operate the unloader 700 alone, start button 790 in circuit 817 is closed to energize relays M and S. Contact S2 in trunk line L1 is opened and contact S3 in trunk line L2 is opened, thereby cutting out the control circuit of the stacker unit 701. However, contact S1 in circuit 820 is closed to energize the magnetic starting coil SC-72 to start the pallet discharge conveyor 771 of the loading machine. With this arrangement, the unloading machine goes through its normal unloading cycle, explained hereinbefore, using the pallet discharge conveyor of the loading machine to carry away the empty pallets. To operate the loader machine 701 alone, the push button switch 791 in circuit 817 is closed to energize relays P and H. Contacts P1 and P3 in trunk lines L1 and L2, respectively, are opened to cut out the control circuit of the unloading machine. However, contact P2 in circuit 813 is closed to energize the magnetic starting coil SC-70 to start the pallet delivery conveyor 702. With this arrangement, the loader 701 goes through its normal loading cycle, described hereinbefore, using the pallet delivery conveyor of the unloading machine to bring pallets to the loader.

MODIFIED ARRANGEMENT NO. 2

In FIG. 31 a second modified arrangement of the case handling machine of the present invention is illustrated. In this arrangement, a pallet loading machine 850 is positioned in substantially parallel, spaced relation to a pallet unloading machine 851. A conveyor 852, arranged to discharge pallets loaded by the loading machine 850, is disposed between the stacker unit 853 of the pallet loader and the unstacker unit 854 of the pallet unloader. A conveyor section 857, which serves as both the pallet unloading station and the pallet loading station, is positioned between a stack conveyor 858 of the loading machine and a stack conveyor 859 of the unloading machine, while a conveyor section 860, which is arranged to deliver pallets loaded with cases of empty bottles, is located forwardly of the conveyor section 857.

In operation, a pallet, loaded with stacks of cases of empty bottles, is deposited by a fork lift truck on the pallet delivery conveyor 860. The conveyor 860 moves the pallet onto the conveyor section 857 where it engages switch Sw90 and is stopped in lateral alignment with a ram 864 of the loading machine. The pallet loading machine 850 is started and, when a line of stacks of cases of full bottles is formed on the stack conveyor 858, the ram 864 is actuated to shift the line onto the pallet, moving one line of stacks of cases of empty bottles from the pallet onto the unloader stack conveyor 859, which then delivers the stacks one by one into the unstacker unit 854. When the second line of stacks of cases of full bottles is formed by the pallet loading machine 850, the ram shifts it onto the pallet, forcing the remaining line of stacks of cases of empty bottles onto the unstacker conveyor 859. Since the pallet is then loaded with cases of full bottles, it is conveyed onto the pallet discharge conveyor 852 for delivery to a pickup station.

The pallet loader 850 comprises the stacking unit 853 which is substantially identical to the stacker-unstacker unit 22 of FIG. 3, having a fork carriage 866, a fork 867 mounted on the carriage, a power cylinder 868 for raising the fork carriage, case-supporting blades 869 controlled by solenoids 870, a pivotal paddle 871 arranged to actuate a switch Sw85, and a plurality of electric control switches Sw81, Sw82, Sw83 and Sw84 (not shown) mounted at certain locations throughout the unit. The stacker unit 853 is arranged to receive cases one at a time from a full case conveyor 875 which comprises an endless chain section 876 and a live roll section 877. Both sections of the conveyor are driven by a motor 878, the live roll section being driven at a faster speed than the endless chain section. The live roll section is similar to the accelerator conveyor 21 of FIG. 3 and has a plurality of rollers 880, which lie between the fingers of the fork 867, the top surfaces of the rollers being above the top of the fingers when the fork is in its lowered position. Movement of cases along the conveyor 875 is controlled by a stop bar 882 which is spring-urged upwardly to a latched, case-arresting position and is connected to a solenoid 883 in such a way that, when the solenoid is energized, the stop bar actuating mechanism is unlatched, permitting the bar to drop by gravity.

After a stack is formed in the stacker unit, it is deposited on the stack conveyor 858 which comprises an endless chain section 885 and a live roll section 886 both driven by motor 887. The chain section 885 has an upper run extending into the stacker unit at a level slightly below the level of the tops of the rollers of the case delivery conveyor section 877 but above the tops of the fingers of the fork when the fork is in lowered position. Electric switches Sw88, Sw86 and Sw87 are mounted to extend into the path of a stack of cases being advanced along the stack conveyor 858. A pair of fixed stops 890 stop the first stack of cases. The second and third stacks come to rest against the preceding stack. The ram 864 is moved, by means of a power screw 892, from a position contacting switch Sw89, transversely over the stack conveyor section 886 to push a line of stacks of cases off the stack conveyor and onto the pallet P (shown in dot-dash lines) that is loaded with stacks of cases of empty bottles, and has been positioned against a stop bar 893 on the conveyor section 857 by the conveyor 860. The bar 893 is arranged to be moved to and from a position in the path of the pallet by means of a solenoid 894. The power screw 892 is suitably journalled in a stationary frame 892a and is operatively connected to the ram 864 to cause movement of the ram upon rotation of the screw. A sprocket 895 is keyed to the end of the screw and is arranged to be driven through a suitable power driven chain 896 from a reversible motor 896A. A switch Sw93 is positioned to be actuated by the ram carriage, a switch Sw91 is mounted on a traversing conveyor 897 to be actuated by one of the cases that is shifted onto the conveyor, a switch Sw92 is positioned to be contacted by the traversing conveyor in the load position adjacent the pallet, and a switch Sw94 is positioned to be contacted by the traversing conveyor when it is aligned with the unstacker unit 854.

The unloading machine 851 comprises the unstacker unit 854 which is substantially identical to the stacker-unstacker unit 22 of FIG. 3. The unit 854 has a fork carriage 901, a fork 901a, a power cylinder 902 for raising the fork carriage, case-supporting blades 903 controlled by solenoids 904, a pivotable paddle 905 arranged to actuate a switch Sw95, and a plurality of other switches Sw96, Sw97, Sw98, Sw99 and Sw100 (not shown). The unstacker unit 854 is arranged to discharge cases one at a time onto a case discharge conveyor 908 which is similar to the live roll section 877 of the full case delivery conveyor. The discharge conveyor 908 has a plurality of belt-driven rollers 910 disposed between the fingers of the fork 901a at a slightly higher level than the level of the fingers when the fork is in its lowered position. The portion of the discharge conveyor that is under the fork 901a is pivotally mounted for downward movement and is operatively connected to the paddle 905 so that, when the paddle is pivoted downwardly by a stack of cases on the stack conveyor 859, the movable part of the discharge conveyor will be moved to a lower level than the level of the stack conveyor 859 to permit the stack conveyor to bring the stack into the unstacker unit.

The stack conveyor 859 of the unloading machine 851 comprises an endless chain section 914 driven by a motor 915 and the live roller traversing conveyor section 897 which is driven by a motor 918. The endless chain section 914 has an upper run extending into the unstacker unit at a level below the normal level of the rollers 910 but above the level of the rollers when they are depressed by the paddle 905. The traversing conveyor 897 comprises a plurality of spaced parallel rollers 920 journalled in a rigid frame 921 which, in turn, is mounted for lateral, sliding movement on a pair of stationary rods 923. A double acting power cylinder 925 is operatively connected to the frame 921 to move the traversing conveyor section 897 from a position in line with the endless chain section 914 to a position in contact with the switch Sw92 and closely adjacent the central conveyor section 857 to receive a line of stacks of cases therefrom.

The pallet discharge conveyor 852 comprises a pair of endless chains 927 driven by a motor 929 in a direction to carry loaded pallets away from the pallet loading and unloading station. The pallet delivery conveyor comprises the endless chain section 860 and the roller section 857. The section 860 comprises a pair of chains 933 trained around idler sprockets 934 and drive sprockets 935 that are keyed to a shaft 936 driven by a motor 937. The roller section 857 comprises a plurality of interconnected rollers 940 driven by a drive chain 942 which is trained around a pulley on the drive shaft 936.

*Hydraulic circuit—modified arrangement No. 2.*—The hydraulic circuit, employed by the pallet loading machine 850 of FIG. 31, is illustrated in FIG. 32. This circuit is identical to a portion of the hydraulic circuit which is shown in FIG. 25 and used in the combination unloader-loader of FIG. 1. Accordingly, the parts of FIG. 32 that are identical to parts of FIG. 25 will be given the same reference numeral followed by a suffix C. It will be noted immediately that the circuit in FIG. 32 does not have control valves VC and VD for raising and lowering a lift mechanism and for reciprocating a ram. Referring to FIG. 31, it will be seen that the loading machine makes use of a screw-driven ram 864, not a hydraulically operated ram.

When the pump 107C is operating, fluid under pressure is directed through line 500C—501C to port 404C of control valve VB–C. When the fork raising solenoid 396C is energized, fluid is directed through cross-passage 414C and line 505C to the fork power cylinder 868 to raise the fork carriage 866. When the fork lowering solenoid 395C is energized, the fork power cylinder 868 is drained and pressurized fluid is directed through line 502C to the reservoir, and the fork is permitted to descend.

The hydraulic circuit used by the pallet unloading machine is illustrated in FIG. 33. Again, this circuit is substantially the same as that shown in FIG. 25 and used in the machine of FIG. 1. Accordingly, the parts in the circuit of FIG. 33, that are identical to parts in FIG. 25, will be given corresponding numbers followed by a suffix D.

When the pump 107D is operating, fluid is directed through lines 500D—501D to port 404D of control valve VB–D. When the fork raising solenoid 396D of pilot valve VA–D is energized, the fluid is directed through cross-passage 414D of valve VB–D and line 505D to power cylinder 902 to raise the fork carriage 901. When the fork lowering solenoid 395D of pilot valve VA–D is energized, the power cylinder 902 is drained and pressurized fluid is directed through passage 409D and supply line 506D to the control valve VD–D. When there is fluid in supply line 506D and the solenoid 439D of pilot valve VC–D is energized, the fluid is directed through cross-passage 453D of valve VD–D and line 510D to the power cylinder 925 to move the traversing conveyor 897 into alignment with the stacker unit 854. If the solenoid 438D of pilot valve VD–D is energized when there is fluid in supply line 506D, the fluid is directed through passage 450D of valve VD–D and line 522D to the power cylinder 925 to return the traversing conveyor to a position adjacent the central unloading station of the machine.

*Electric control circuit—modified arrangement No. 2.*—
The electric control circuit, for the modified arrangement of FIG. 31, is shown in FIG. 34. The electric switches are shown in their normal position, as they were wired by the switch manufacturer. It will be understood, however, that the paddle 871 of the stacker unit 853 is initially adjusted so that, when the paddle is in its normal spring-urged upper position, the normally closed switch Sw85 in circuit 978 is opened. Similarly, the paddle 905 of the unstacker 854 is initially adjusted so that when the paddle is in its normal, spring-urged upper position, the switch Sw95 will be actuated to close the normally open contact Sw95-1 in circuit 950, and open the normally closed contact Sw95-2 in circuit 955. FIG. 31 shows the positions of the various elements of the machines 850 and 851 at the start of a cycle. It will be noted that, in the pallet loading machine 850, the ram 864 is in the load position contacting switch Sw89 to open contact Sw89-1 in circuit 973 and close contact Sw89-2 in circuit 975, the full case stop bar 882 is raised, and the fork carriage 866 is in its lowered position holding switch Sw84 in circuit 979 closed. In the unloading machine 851, the traversing conveyor 897 is disposed adjacent the central loading station contacting switch Sw92 to hold contact Sw92-1 in circuit 962 open and contact Sw92-2 in circuit 963 closed, and the fork carriage 901 is in its lowered position holding switch Sw97 in circuit 956 closed.

To put both machines into operation, a master switch Sw80 is closed to energize trunk conductors L1 and L2. The unloader start button 990 and the loader start button 991, both in circuit 972, are pushed to energize circuit 972 and energize relays P and M and to close the magnetic starting coil SC–106 of the motor of pump 107C and the starting coil SC–107 of the motor of pump 107D. Also, the photo relay Sw96 in the unstacker unit 854 is turned on.

Therefore, at the start of a cycle when a pallet loaded with cases of empty bottles is deposited on the conveyor 860, relays P and M in circuit 972 are energized, relay D in circuit 975 is energized, the magnetic starting coil SC–114 in circuit 950 is energized to start the case discharge conveyor of the unloader, the magnetic starting coil SC–105 in circuit 953 is energized to start the endless chain section of the unloader stack conveyor, the fork lowering solenoid 395D in circuit 954 is energized, the magnetic starting coil SC–109 in circuit 976 is energized to start the loaded pallet discharge conveyor 852 of the loading machine, the magnetic starting coil SC–110 in circuit 976 is energized to start the pallet conveyor 860, the magnetic starting coil SC–111 in circuit 977 is energized to start the stack conveyor 858, the magnetic starting coil SC–112 in circuit 977 is energized to start the full case conveyor 875, the solenoid 883 in circuit 979 has been energized to pull down the stop bar 882 of the full case conveyor, the fork lowering solenoid 395C in circuit 980 is energized, and the blade solenoids 870 in circuit 981 are energized.

A pallet loaded with stacks of cases of empty bottles is positioned on the pallet conveyor 860 by means of a fork lift truck which runs up a ramp 944 and temporarily opens switch Sw102 in circuit 976 to stop the conveyor 860 while the loaded pallet is positioned thereon. The pallet is carried into the machine where it engages switch Sw90 to open contacts Sw90-2 in circuit 976 to stop the conveyor 860. Cases of full bottles are now advanced by the full case conveyor 875. Since the stop bar 882 is already down, the first case is moved into the stacker unit 853 to contact and close switch Sw81 in circuit 979. Relay V is energized and locked in through contact V1. Contact V4 in circuit 980 is opened, de-energizing the fork lowering solenoid 359C, and contact V3 in circuit 980 is closed, energizing the fork raising solenoid 396C to start the upward movement of the fork 867. Contact V2 in circuit 979 is opened to de-energize the solenoid 883 and permit the stop bar to be raised in front of the line of full cases on the full case conveyor 875.

As the fork carriage is elevated, it moves away from switch Sw84 in circuit 979, permitting switch Sw84 to open. Switch Sw82 in D.C. circuit 985 is closed to energize solenoid 992 to register the first case on the counter Sw114. At the top of its stroke, the fork carriage opens switch Sw83 in circuit 979 to de-energize relay V. Contact V3 in circuit 980 is opened, de-energizing the fork raising solenoid 396C and contact V4 in circuit 980 is closed, energizing the fork lowering solenoid 395D and permitting the fork to be lowered and switch Sw83 to close. The closing of contact V4 in circuit 980 also energizes the solenoids 870 in circuit 981 whereby the blades 869 are projected inwardly under the case to support the case and permit the fork to continue downward. At the bottom of the stroke, the fork carriage closes switch Sw84 in circuit 979, energizing the full case stop bar solenoid 883 to pull down the stop bar 882 and permit the full case conveyor 875 to move the second case into the stacker. The second case contacts and closes switch Sw81 in circuit 979 to start another case elevating cycle. When the last case has been counted and contact Sw114-1 of switch Sw114 in circuit 982 has been closed, relay C is energized and locked in through contact C3. Contact C1 in circuit 979 is opened to de-energize relay V. Contact V2 in circuit 979 is opened, preventing the lowering of the stop bar 883. Contact V3 in circuit 980 is opened, de-energizing the fork raising solenoid 396C. Contact C2 in circuit 981 is opened, de-energizing the fork lowering solenoid 395C and the blade solenoids 870 in circuit 981. Since both the fork raising solenoid and the fork lowering solenoid are de-energized, the hydraulic valve VB-C assumes a centered position, permitting the fork power cylinder 868 to drain to the reservoir through the needle valve 525C, causing a slow descent of the fork and the stack of cases formed thereon.

When the fork deposits the stack on the full case conveyor 875, the center portion of this conveyor moves downwardly to deposit the stack on the endless chain section 885 of the stack conveyor 858 for removal from the stacker. As the cradle of the conveyor moves downwardly, it depresses through a mechanical linkage, the paddle 871 to close switch Sw85 in circuit 978 and energize relay A. Contact A4 in D.C. circuit 986 is closed to energize the counter reset solenoid 993 to reset case counter Sw114. Contact A3 in circuit 982 opens to de-energize relay C, closing contact C1 in circuit 979. As soon as the stack moves off the paddle 871, the switch Sw85 in circuit 978 opens, de-energizing relay A. Contact A1 in circuit 979 closes to energize stop bar solenoid 883 to pull down the bar 882 and start the formation of the second stack of cases.

As the first stack moves along the stack conveyor 858, it momentarily contacts switches Sw88, Sw86, and Sw87, all in circuit 963, and comes to rest against the fixed stops 890. The second stack comes to rest against the first stack, holding switch Sw87 closed. The third stack closes switch Sw86 and momentarily opens switch Sw88. As soon as the third stack clears switch Sw88, circuit 963 is energized, energizing relay N which locks in through contact N1. Contact N2 in circuit 973 is opened and contact N3 in circuit 974 is closed to energize a coil SC-108-1 of a magnetic starter. When energized, the coil SC-108-1 of a magnetic starter. When energized, the coil SC-108-1 causes the motor 896A of the power screw 892 to rotate the screw in a direction to move the ram 864 to load the new stacks of cases on the pallet. Coil SC-108-1 will hereinafter be referred to as the ram loading-stroke coil. Coil SC-108-2 in circuit 973 causes rotation of the power screw in a direction to retract the ram to its initial position and will be referred to as the ram retracting coil. Since the ram loading stroke coil SC-108-1 is energized by the closing of contact N3 in circuit 974, the ram moves forwardly to push the newly formed line of cases onto the pallet which, as previously mentioned, is loaded with stacks of cases of empty bottles.

The line of cases of empty bottles, which is closes the traversing section 897 of the unloading machine pallet conveyor, is pushed off the pallet and onto said traversing section. During the forward movement of the ram, the ram carriage contacts and closes switch Sw93 in circuit 967, energizing relay K which locks in through contact K1. The line of stacks of cases, that was shifted onto the traversing conveyor section 897, engages and closes switch Sw91 in circuit 960 to energize relay E. Contact E1 in circuit 961 is closed to energize the solenoid 439D that is effective to cause the traversing conveyor section to be moved to unload position in alignment with the unstacker unit. Contact E2 in circuit 962 is opened, de-energizing the solenoid 438D that is effective to return the traversing section to position adjacent the pallet. Contact E3 in circuit 963 is opened, de-energizing relay N. Contact N3 in circuit 974 is opened to de-energize the ram loading stroke coil SC-108-1, and contact N2 in circuit 973 is closed to energize the ram retracting coil SC-108-2. As the traversing conveyor section 897 moves toward unload position, switch Sw92 is released permitting contact Sw92-1 in circuit 962 to close. Contact Sw92-2 in circuit 963 is opened. When the traversing conveyor reaches unload position, it contacts and closes switch Sw94 in circuit 959 to energize relay G and to energize the magnetic starting coil SC-104 of motor 918 to rotate the rollers of the traversing section for advancing the line of stacks into the unstacker unit 854. Contact G1 in circuit 961 opens, de-energizing the traversing conveyor unload solenoid 439D.

The lines of stacks of empty cases are moved one by one into the unstacker unit 854 where they are unstacked following the previously explained unstacking operation. When the last stack leaving the traversing section clears switch Sw91 in circuit 960, the switch opens de-energizing relay E. Contact E2 in circuit 962 closes to energize the solenoid 438D whereby the traversing section is returned to the position adjacent the pallet. When the traversing conveyor reaches this initial position and contacts switch Sw92, contact Sw92-1 in circuit 962 is opened, de-energizing the return solenoid 438D. Contact Sw92-2 in circuit 963 is closed.

When the ram 864 returns to its initial position to await the formation of a new line of stacks of full cases, it contacts switch Sw89 closing contact Sw89-2 in circuit 975 to energize relay D, and to open contact Sw89-1 in circuit 973 to de-energize the ram retract coil SC-108-2. Contact D2 in circuit 969 is closed, energizing relay B which locks in through contact B3. A new line of stacks is formed by the stacker unit 853 and positioned on the stack conveyor 858 in front of the ram 864, holding switches Sw86 and Sw87 in circuit 963 closed. Since the traversing conveyor returns to position adjacent the pallet while this second line of stacks was being formed, contact Sw92-2 in circuit 963 is also closed at this time, and accordingly relay N is energized. Contact N3 in circuit 974 is closed, energizing the ram loading stroke coil SC-108-1 to start the ram forward to push the second line of stacks of cases of full bottles onto the pallet, forcing the remaining line of stacks of cases of empty bottles off the pallet and onto the traversing conveyor section 897. As the ram advances, the ram carriage again closes switch Sw93 in circuit 967. Since contact B2 in circuit 966 was closed the first time the ram carriage closed switch Sw93, relay R in circuit 966 is energized by this second advance of the ram carriage. Contact R2 in circuit 970 is closed, energizing solenoid 894 which controls the pallet holding stop 893. When the solenoid 894 is energized, the stop 893 is pulled away from the pallet, releasing the pallet for subsequent movement out of the machine on conveyor 852.

The line of stacks of cases of empty bottles, that was shifted onto the traversing conveyor section 897, engages and closes switch Sw91 in circuit 960 to energize relay E. Contact E1 in circuit 961 is closed to energize the solenoid 439D that is effective to cause the traversing conveyor to be moved to unload position. Contact E3 in circuit 963 is opened, de-energizing relay N. Contact N3 in circuit 974 is opened to de-energize the ram loading-stroke coil SC–108–1, and contact N2 in circuit 973 is closed to energize the ram retracting coil SC–108–2 and start the ram back to initial position. When the traversing conveyor 897 reaches unload position, it contacts and closes switch Sw94 in circuit 959 to energize relay G and close contact G2 in circuit 976. Then, when the ram returns to its initial position to actuate switch Sw89 and close contact Sw89–2 in circuit 975, relay D is energized. Contact D3 in circuit 976 is closed, energizing the magnetic starter coil SC–110 to start the motor 937 of the pallet conveyor 860 and cause the pallet, loaded with cases of full bottles, to be moved onto the continuously operating pallet discharge conveyor 852. If another pallet loaded with cases of empty bottles has been positioned by the fork lift truck on the entrance end of the pallet conveyor, it will be moved into the loading-unloading station while the loaded pallet is carried out of the machine on the pallet discharge conveyor 852. When the last stack leaving the traversing conveyor 897 clears the switch Sw91 in circuit 960, the switch opens de-energizing relay E and closing contact E2 in circuit 962 to energize solenoid 438D whereby the traversing conveyor is returned to the position adjacent the pallet.

At the end of the cycle, the ram 864 is in its unload position, the fork 867 of the stacker is in its lower position, and the full case stop bar 882 is lowered. Also, the traversing conveyor 897 of the pallet unloader is disposed adjacent the pallet, and the fork carriage 901 of the unstacker is in its lowered position. Thus, both the pallet loading machine 850 and the pallet unloading machine 851 are ready for the cycle to be repeated.

MODIFIED ARRANGEMENT NO. 3

In FIG. 35 a third modified arrangement of the case handling machine of the present invention is illustrated. In this arrangement, a pallet loading machine 1000 and a pallet unloading machine 1001 are set up side-by-side. Both machines are operated at the same time and they are so coordinated that machine 1000 finishes loading a pallet with cases of full bottles at substantially the same time that the machine 1001 completes the removal of cases of empty bottles from a pallet. The pallet loader 1000 discharges its loaded pallet. Then the unloader 1001 moves its empty pallet over to the loading machine and brings another pallet load of cases of empty bottles into the unloading machine. If only the pallet loader 1000 is operated, the conveyor of the unloader 1001 may be used to supply empty pallets to the loading zone. If only the unloader is used, the conveyor of the loader may be used to carry empty pallets out of the unloader.

The pallet loading machine 1000 comprises a stacker unit 1004 which is substantially identical to the unit 22 of FIG. 3. In general, the stacker unit 1004 comprises a fork carriage 1005, a fork 1006 mounted on the carriage, a power cylinder 1007 for raising the carriage 1005, case-supporting blades 1009 controlled by solenoids 1010, a pivotal paddle 1011 arranged to actuate a switch Sw115, and a plurality of electric control switches Sw111, Sw112, Sw113, Sw114 and Sw122 (not shown). The stacker unit 1004 is arranged to receive cases one at a time from a full case conveyor 1015 which comprises an endless chain section 1016 and a live roll section 1017. Both of the sections 1016 and 1017 are driven by a motor 1018, the live roll section 1017 being driven at a faster speed than the endless chain section 1016. The live roll section 1017 is similar to the accelerator conveyor 21 of FIG. 3 and has a plurality of rollers 1020 which lie between the fingers or tines of the fork 1006, the top surfaces of the rollers being above the tops of the fork fingers when the fork is in its lowered position. Movement of cases along the full case conveyor 1015 is controlled by a stop bar 1021, which is spring-urged upwardly to a latched, case-arresting position, and is connected to a solenoid 1022 so that, when the solenoid is energized, the stop bar is unlatched and permitted to drop by gravity.

After a stack of cases is formed in the stacker unit 1004, it is deposited on a stack conveyor 1023 comprising an endless chain section 1024 and a live roll section 1025, both of which are driven from a motor 1026. The endless chain section 1024 has an upper run that extends into the stacker unit 1004 at a level below the top of the rollers 1020 of the full case conveyor section 1017, but above the tops of the fingers of the fork 1006 when the fork is in lowered position. The actuators of electric switches Sw118, Sw116 and Sw117 are mounted to extend into the path of movement of a stack of cases being advanced on the stack conveyor 1023. A pair of fixed stops 1030 stop the first stack of cases. The second and third stacks come to rest against the preceding stack.

A ram 1031 is rigidly mounted on one end of a carriage 1032 that is slidably mounted on stationary rods 1033 of a support frame 1034. A power screw 1036 is mounted transversely of the conveyor section 1025 and is arranged to be driven from a reversible motor 1037. The ram 1031 is operatively connected to the screw 1036 and is arranged to be moved, from a loading position against switch Sw119, transversely over the stack conveyor 1023 to push a line of stacks of cases off the stack conveyor and onto an empty pallet P (shown in dot-dash lines) that has been positioned on a pallet discharge conveyor 1038 in alignment with the ram and in contact with a switch Sw121. When the ram reaches the end of the stroke, the ram carriage 1032 contacts a switch Sw120 and the cases, that have been shifted onto the pallet, contact a switch Sw123. A fixed stop bar 1040 intercepts each empty pallet, as it is discharged from the pallet unloading machine 1001, and aligns the pallet with the ram 1031.

The pallet discharge conveyor 1038 comprises a live roll section 1041 and an endless chain section 1042. The section 1041 consists of a plurality of parallel rollers interconnected by a sprocket and chain drive. The section 1042 comprises a pair of spaced endless chains 1046 trained around idler sprockets 1047 and drive sprockets 1048. Both conveyor sections 1041 and 1042 are driven from a motor 1050. When a loaded pallet is discharged by conveyor 1038, it contacts a control switch Sw124 that is mounted on the frame of the conveyor section 1042.

When the pallet loader 1000 is put into operation, stacks of cases are formed in the stacker unit 1004 and delivered one by one by the stack conveyor 1023 to an aligned position in front of the ram 1031. The ram is then moved forwardly by the power screw 1036 to shift the line of stacks onto the pallet P. The ram is retracted to loading position and a second line of stacks is aligned in front of it. On the next unloading stroke, the ram moves the second line into contact with the first line to shift the first line across the pallet and position both lines thereon. When the ram has been retracted, the discharge conveyor 1038 carries the loaded pallet out of the machine.

The pallet unloading machine 1001 comprises a pallet conveyor 1052 having an endless chain section 1053 and a live roll section 1054. The conveyor sections 1053 and 1054 are substantially identical to the previously described conveyor sections 1041 and 1042 and are driven by a motor 1055. The endless chain section 1053 is adapted to receive a pallet loaded with stacks of cases of empty bottles and move the loaded pallet onto the roller section 1054 against a fixed stop bar 1058 and in contact with a switch Sw136. The stop bar 1058 aligns the loaded pallet opposite a ram 1060 which is rigidly secured on one end of a ram carriage 1061 that is mounted on stationary rods 1062 for sliding movement transversely over the pallet conveyor section 1054. The ram carriage 1061 is mounted on a power screw 1063 which is driven by a reversible motor 1064. When the screw is rotated, the ram 1060 moves into contact with the cases on the pallet and shifts the cases relative to the pallet to push a line of stacks onto a stack conveyor 1065. Just before the ram 1060 moves across the pallet, a parallelogram lift mechanism 1066 raises the loaded pallet upwardly to the level of the conveying surface of the stack conveyor 1065. The lift mechanism 1066 is substantially identical to the lift mechanism 26 of FIG. 3 and is raised and lowered by a power cylinder 1067. In its lowered position, one of the arms of the mechanism holds a switch Sw135 closed. The line of stacks of cases, that is shifted onto the stack conveyor 1065, comes to rest against a switch Sw125 which has an actuator bar substantially as long as the line of stacks.

The stack conveyor 1065 comprises a live roll section 1070 and an endless chain section 1071. The live roll section 1070 includes a plurality of rolls 1072 suitably mounted for rotation in a support structure 1073 and interconnected by a chain and sprocket drive 1074. The endless chain section 1071 consists of a pair of spaced chains 1075 trained around sprockets 1076 which are driven by a motor 1077. The motor 1077 also drives the rollers 1072 through a drive chain 1078. The stack conveyor 1065 is arranged to carry a stack of cases into an unstacker unit 1080 which is substantially identical in structure and operation to the unit 22, described in connection with FIG. 3. In general, the unstacker unit 1080 comprises a fork carriage 1082, a fork 1083 mounted on the carriage, a power cylinder 1084 for raising the fork carriage, case-supporting blades 1085 controlled by solenoids 1086, a paddle 1087 arranged to actuate a switch Sw126, and a plurality of switches Sw128, Sw129 and Sw132 (not shown) which are arranged to be actuated by various members of the unstacker. When a case is removed from a stack in the unstacker, it is deposited on a case discharge conveyor 1090 which comprises a belt 1091 trained around an idler drum (not shown) and around a drum 1092 driven by a motor 1093. A plurality of rollers 1094 are rotatably mounted in a frame 1095 and disposed above the belt 1091 and in frictional, driven engagement therewith. A photo-electric switch Sw127 has its beam projected across the path of movement of cases in the unstacker unit, and switches Sw130 and Sw131 (not shown) have actuators disposed in the path of movement of cases being discharged on the case conveyor 1090.

When the pallet unloading machine 1001 is put into operation, a pallet loaded with stacks of cases of empty bottles is deposited on the pallet conveyor 1052 which conveys the loaded pallet into the unloading zone against the stop bar 1058 and in alignment with the ram 1060. The lift mechanism 1066 is raised to elevate the pallet and then, when the power screw 1062 is rotated, the ram 1060 moves into contact with the stacks of cases on the pallet and shifts the line of stocks, that is closest to the stack conveyor 1065, onto the stack conveyor. The ram is retracted and the lift mechanism is lowered. The stacks of the displaced line of stacks are moved one by one into the unstacker unit 1080 where they are unstacked. As soon as the last stack of the displaced line clears switch Sw125, the lift mechanism 1066 is raised again and the ram 1060 moves forwardly to push the second line of stacks off the pallet and onto the stack conveyor 1065. On its return stroke a pusher member 1096 engages the empty pallet and shifts it to the loading zone of the pallet loading machine 1000.

*Hydraulic circuit—modified arrangement No. 3.*—The hydraulic circuit employed in the pallet loading machine 1000 is shown diagrammatically in FIG. 36. Since this circuit is substantially the same as a portion of the hydraulic circuit of FIG. 25, parts in the circuit of FIG. 36 that are identical to parts shown in FIG. 25, will be given the same reference numerals followed by a suffix E.

When the pump 107E is operating, fluid under pressure is directed through line 500E—501E to port 404E of control valve VB–E. When the fork raising solenoid 396E of pilot valve VA–E is energized, the pressurized fluid is directed through cross-passage 414E of valve VB–E and line 505E to the fork power cylinder 1007 to raise the fork carriage 1005. When the fork lowering solenoid 395E of pilot valve VA–E is energized, the fork power cylinder 1007 is drained and pressurized fluid is directed through passage 410 of valve VB–E and line 502E to the reservoir, and the fork is permitted to descend.

The hydraulic circuit used by the pallet unloading machine 1001 is illustrated in Fig. 37. Again, this circuit is substantially the same as that shown in FIG. 25 and, accordingly, the parts in the circuit of FIG. 37 that are identical to parts in FIG. 25 will be given corresponding numbers followed by a suffix F.

When the pump 107F is operating, fluid under pressure is directed through lines 500F—501F to port 404F of control valve VB–F. When the fork raising solenoid 396F of pilot valve VA–F is energized, the pressurized fluid is directed through cross-passage 414F of valve VB–F and line 505F to power cylinder 1084 to raise the fork carriage 1082. Then, when the fork lowering solenoid 395F of pilot valve VA–F is energized, the power cylinder 1084 is drained and pressurized fluid is directed through passage 409F and supply line 506F to the control valve VD–F. When there is pressurized fluid in supply line 506F and the solenoid 439F of pilot valve VC–F is energized, the fluid is directed through cross-passage 453F of valve VD–F and line 510F to the power cylinder 1067 to raise the lift mechanism 1066. If the solenoid 438F of pilot valve VC–F is energized when there is fluid in supply line 506F, the fluid is directed through passage 450F of valve VD–F and line 522F to power cylinder 1067 to lower the lift mechanism 1066.

*Electric control circuit—modified arrangement No. 3.*— The electric control circuit, for the modified arrangement of FIG 35, is shown in FIG. 38. The electric switches are shown in their normal position, as they were wired by the switch manufacturer. It will be understood, however, that the paddle 1011 of the stacker unit 1004 is initially adjusted so that, when the paddle is in its normal, spring-urged upper position, the normally closed switch Sw115 in circuit 1127 is held open. Similarly, the paddle 1087 of the unstacker 1080 is initially adjusted so that, when the paddle is in its normal, spring-urged upper position, the switch Sw126 will be actuated to close the normally open contact Sw126–1 in circuit 1103, and open the normally closed contact Sw126–2 in circuit 1104.

FIG. 35 shows the positions of the various members of the machines 1000 and 1001 at the start of a cycle. It will be noted that, in the pallet loading machine 1000, the ram 1031 is in the load position contacting switch Sw119 to open contact Sw119–1 in circuit 1124 and close contact Sw119–2 in circuit 1126, the full case stop bar 1021 is raised, an empty pallet P is positioned in the loading zone against stop bar 1040 holding switch Sw121 in circuit 1123 closed, and the fork carriage 1005 is in its lowered position holding switch Sw114 in circuit 1128 closed. In the unloading machine 1001, the lift mechanism 1066 is in lowered position holding switch Sw135 in circuit 1110 closed, the ram 1060 is in the unload position contacting and closing switch Sw134 in circuit 1117, and the fork carriage 1082 is in its lowered position holding switch Sw132 in circuit 1100 closed.

To put both machines 1000 and 1001 into operation, a master switch Sw140 (FIG. 38) is closed to energize conductors L1 and L2. The unloader start button 1092 and the loader start button 1091, both in circuit 1119, are pushed to energize the circuit and energize relays M and P, and to energize the magnetic starter coil SC–142 of the motor of pump 107F and starter coil SC–143 of the motor of pump 107E. Coil SC–142 locks in through contact SC–142–1 and coil SC–143 locks in through contact SC–143–1. The photo relay Sw127 in the unstacker unit 1080 is turned on so that the beam is projected across the unstacker.

Thus, at the start of the cycle, relays M and P in circuit 1119, relay T in circuit 1100, and relay G in circuit 1110 are energized. Also, the starter coil SC–144 in circuit 1103 is energized to start the case discharge conveyor 1090 of the unstacker, the starting coils SC–152 and SC–153 in circuit 1126 are energized to start the stack conveyor 1023 and the full case conveyor 1015 of the loader, and the starting coil SC–146 in circuit 1111 is energized to start the pallet conveyor 1052.

Before the pallet loader 1000 starts operating to load the empty pallet positioned at the loading zone, the contact Sw138–1 of a selector switch Sw138 in circuit 1131 is closed so that, when the contact Sw139–1 of counter switch Sw139 is closed by the fourth case that is elevated in the stacker, relay C will be energized. When the first case enters the stacker, it contacts and closes switch Sw111 in circuit 1128, energizing relay V which locks in through contact V1. Contact V4 in circuit 1129 is opened, de-energizing the fork lowering solenoid 395E, and contact V3 in circuit 1129 is closed, energizing the fork raising solenoid 396E to cause the fork 1006 of the pallet loader to start upwardly with the first case. In its upward movement, the fork carriage closes switch Sw112 in D.C. circuit 1134 to energize solenoid 1151 which closes a contact of the case counter switch Sw139 in circuit 1131. The case is carried upwardly past the de-energized case-supporting blades 1009 until the fork carriage reaches the top of its stroke where it contacts and opens switch Sw113 in circuit 1128, deenergizing relay V and opening contact V3 in circuit 1129 to deenergize the fork raising solenoid 396E. Contact V4 in circuit 1129 is closed to energize the fork lowering solenoid 395E, permitting the fork to be lowered and switch Sw113 to close. Closing of contact V4 also energizes the solenoids 1010 in circuit 1130 causing the case-supporting blades to be projected into the path of the case being lowered by the fork. The case is deposited on the blades and the fork continues its downward movement.

When the fork carriage reaches its lowermost position, it closes switch Sw114 in circuit 1128, energizing solenoid 1022 to pull the stop bar 1021 down and permit the conveyor 1015 to move the second case into the stacker 1004. The second case contacts and closes switch Sw111 in circuit 1128 to energize relay V and start another case elevating cycle. When the fourth case has been counted and contact Sw139–1 in circuit 1131 has been closed, relay C is energized and locked in through contact C3. Contact C2 in circuit 1129 is opened, de-energizing the fork lowering solenoid 395E and contact C1 in circuit 1128 is opened, de-energizing relay V and opening contact V3 in circuit 1129, whereby to de-energize the fork raising solenoid 396E. With both the fork lowering solenoid 395E and the fork raising solenoid 396E de-energized, the fork power cylinder 1007 is drained to the reservoir through the needle valve 525E (FIG. 36) causing a slow descent of the fork and the stack of cases thereon. When the fork deposits the stack on the full case conveyor 1015, the center portion of the case conveyor moves downwardly to deposit the stack on the stack conveyor 1023 for removal from the stacker unit 1004. As the center portion of the case conveyor moves downwardly, it depresses through a mechanical linkage paddle 1011 to close Sw115 in circuit 1127, energizing relay A and closing contact A4 in D.C. circuit 1135 to actuate a solenoid 1152 to reset the case counter Sw139. Contact A3 in circuit 1131 is opened to de-energize relay C, closing contact C1 in circuit 1128. As soon as the stack moves off the paddle 1011, switch Sw115 in circuit 1127 opens, de-energizing relay A. Contact A1 in circuit 1128 is closed, energizing solenoid 1022 to pull down stop bar 1021 and permit a new case to enter the stacker unit. The new case contacts and closes Sw111 in circuit 1128 to energize relay V and start another stack forming cycle.

As the first stack moves along the stack conveyor 1023, it momentarily contacts switches Sw118, Sw116 and Sw117, all in circuit 1123, and comes to rest against the stops 1030. The second stack comes to rest against the first stack, holding switch Sw117 closed. The third stack closes switch Sw116 and momentarily opens normally closed switch Sw118. As soon as the third stack clears switch Sw118, circuit 1123 is energized, energizing relay N which locks in through contact N1. Contact N3 in circuit 1125 is closed, energizing the ram loading stroke coil SC–151 that drives the reversible motor 1037 in the direction to rotate the power screw 1036 so that the ram 1031 moves forward to shift the line of stacks onto the pallet. At the end of the loading stroke, the carriage contacts and opens switch Sw120 in circuit 1123, de-energizing relay N. Contact N3 in circuit 1125 is opened to de-energize the ram loading-stroke coil SC–151, and contact N2 in circuit 1124 is closed to energize the ram retracting coil SC–150.

When the ram 1031 returns to its initial position to await formation of a second line of stacks of cases, the ram carriage contacts switch Sw119 to open contact Sw119–1 in circuit 1124 to de-energize the ram retracting coil SC–150 and to close contact Sw119–2 in circuit 1126 to start the stack conveyor 1023 once more. When the second line of stacks has been formed in front of the ram 1031, the ram is moved forwardly to push the second line onto the pallet, pushing the first line across the pallet to a position contacting and closing switch Sw123 in circuit 1121. When circuit 1121 is energized, the starting coil SC–149 of the motor 1050 of the pallet discharge conveyor is energized to start the pallet discharge conveyor to remove the loaded pallet from the machine. When the loaded pallet reaches a predetermined position, it contacts and opens switch Sw124 in circuit 1121 to de-energize the coil SC–149 and stop the pallet discharge conveyor.

While the pallet loader 1000 is loading an empty pallet at the loading zone, the pallet unloader 1001 is removing stacks of cases from a pallet at the pallet unloading zone. As previously mentioned, at the beginning of a cycle, the starting coil SC–144 in circuit 1103 is energized to start the case discharge conveyor 1090 of the unstacker, and the starting coil SC–146 in circuit 1111 is energized to start the pallet conveyor 1052. The pallet unloading cycle is begun when a fork lift truck, carrying a pallet loaded with cases of empty bottles, is run up on a ramp 1098 (FIG. 35) to open switch Sw133 in circuit 1111 (FIG. 38) and de-energize the starting coil SC–146 to temporarily stop the pallet conveyor 1052. When the loaded pallet is in place on the conveyor, the fork lift truck is backed off the ramp, permitting the switch Sw133 to close to re-energize the circuit 1111 and start the pallet conveyor. The loaded pallet is carried into the unloading zone and into contact with switch Sw136 in circuit 1112 to close said switch and energize relay E. Contact E1 in circuit 1111 is opened, de-energizing the coil SC–146 and stopping the pallet conveyor 1052. Contact E2 in circuit 1113 is closed to energize relay B. Contact B3 in circuit 1116 is closed to energize the pallet raising solenoid 439F to raise the lift mechanism, and to energize the ram unloading-stroke coil SC–148. As the pallet is raised, switch Sw135 in circuit 1110 opens and de-energizes relay G. Contact G2 in circuit 1109 is opened and the stack conveyor 1065 is stopped. When the pallet has been raised, the ram 1060 contacts the stacks of cases and shifts the line of stacks, that is closest to the stack conveyor 1065, onto the stack conveyor and into contact with switch Sw125 in circuit 1113. When switch Sw125 is opened, relay B is de-energized, contact B3 in circuit 1116 is opened, the pallet raising solenoid 439F is de-energized, and the ram unloading-stroke coil SC–148 is de-energized.

Contact B2 in circuit 1115 is closed to energize the ram retract coil SC–147 to return the ram carriage to the unload end where it contacts and closes switch Sw134 in circuit 1117. Since contacts G4 and B4 in circuit 1117 are also closed, circuit 1117 is energized and the pallet lowering solenoid 438F is energized.

When the pallet lift mechanism 1066 reaches the lowered position, switch Sw135 in circuit 1110 is closed and relay G is energized again. Contact G2 in circuit 1109 is closed to start the stack conveyor 1065 again whereby the stacks are carried one by one into the unstacker 1080. The first stack hits paddle 1087 to depress the center section of the case conveyor 1090 and actuate switch Sw126 to open contact Sw126–1 in circuit 1103 and close contact Sw126–2 in circuit 1104 whereby the coil SC–144 is de-energized to temporarily stop the case discharge conveyor 1090 and relay X is energized. As the stack enters the stacker, it breaks the beam of the photo relay Sw127 to close contact Sw127–1 in circuit 1107 to energize relay W which locks in through contact W3. Contact Sw127–2 in circuit 1109 is opened, de-energizing the motor coil SC–145 to stop the stack conveyor 1065. When relays W and X are energized, contact W1 in circuit 1102 is opened to de-energize the fork lowering solenoid 395F, and contacts W2 and X1 in circuit 1102 are closed to energize the fork raising solenoid 396F. As the fork is elevated, switch Sw132 in circuit 1100 is allowed to open, de-energizing relay T and opening contact T1 in circuit 1102. As the fork carriage reaches the top of its stroke, it opens switch Sw128 in circuit 1104, de-energizing relay X and relay W in circuit 1107.

When relays X and W are de-energized, contacts X1 and W2 in circuit 1102 are opened and the fork raising solenoid 396F is de-energized. Since the fork lowering solenoid 395F is also de-energized, the pilot valve VA–F is in centered position and the fork is allowed to move downward slowly.

In its lowering movement, the fork carriage contacts and closes switch Sw129 in circuit 1101, whereby the solenoids 1086 are energized to project the case-supporting blades inwardly into the path of the descending stack of cases. The switch Sw129 is so located that the blades will permit the lowermost case to continue downwardly while arresting the downward movement of the rest of the stack. When the fork reaches its lower position, it closes switch Sw132 in circuit 1100, energizing relay T and closing contact T2 in circuit 1107 to energize relay W. The case is deposited on the case discharge conveyor 1090 which carries it out of the unstacker unit. As the case leaves the unit, it contacts switch Sw130 to close contact Sw130–1 in circuit 1106 and open contact Sw130–2 in circuit 1107. Relay X is energized and contact X1 in circuit 1102 is closed. Since the beam of the photo relay Sw127 is still broken by cases in the unstacker, contact Sw127–1 in circuit 1107 is still closed and relay W is still energized. With contacts W2 and X1 in circuit 1102 closed, the fork raising solenoid 396F is again energized and the fork is raised and the case unstacking operation is repeated until all of the cases are discharged from the unstacker. When the last case leaves the unstacker, the beam of the photo relay Sw127 is no longer broken. Accordingly, contact Sw127–1 in circuit 1107 is opened, relay W is de-energized, and contact W2 in circuit 1102 is opened, whereby the fork raising solenoid 396F is de-energized and the unstacking operation is stopped. Similarly, since the photo relay beam is no longer broken, contact Sw127–2 in circuit 1109 is closed and the motor coil SC–145 is energized to bring another stack of cases into the unstacker unit.

When the third stack of cases on the stacker conveyor 1065 clears switch Sw125, switch Sw125 in circuit 1113 closes, energizing relay B. Contact B3 in circuit 1116 is closed, energizing the pallet lift solenoid 439F and the motor coil SC–148 that starts the ram 1060 across the pallet to push the remaining line of stacks of cases onto the stack conveyor 1065, which was stopped when the lift mechanism 1066 permitted the switch Sw135 in circuit 1110 to open. Since there is only one line of stacks remaining on the pallet, the ram must take an extra long stroke in order to shift the line onto the stack conveyor. At the end of this stroke, the latch mechanism 1096 hooks over the edge of the empty pallet. The load of cases, that is deposited on the stack conveyor, contacts switch Sw125 in circuit 1113 to de-energize relay B and open contact B3 in circuit 1116 to de-energize the pallet lift solenoid 439F and de-energize the motor coil SC–148 to stop the movement of the ram. Contact B2 in circuit 1115 closes, energizing the ram retracting coil SC–147. When the ram reaches the unload position, it closes switch Sw134 in circuit 1117 and energizes the pallet lowering solenoid 438F. During its return movement, the latch 1096 causes the empty pallet to be shifted toward the left (FIG. 35) and to be moved into the loading zone of the pallet loading machine. It is to be noted that, as soon as the pallet starts its movement toward the left, it releases switch Sw136 in circuit 1112 permitting the switch to open and de-energize relay E. Therefore, contact E3 in circuit 1115 is opened and the ram retract coil SC–147 is de-energized if there is a pallet in the loading zone of the loading machine 1000 holding switch Sw121 in circuit 1114 open. However, if there is no pallet in the loading zone, switch Sw121 will be closed and the ram retracting coil SC–147 will be energized through circuit 1114 causing the ram to complete its return movement and deliver the empty pallet to the pallet loader 1000.

When the pallet lift mechanism 1066 reaches its lowered position, it again closes switch Sw135 in circuit 1111 to ready the circuit so that, as soon as a pallet load of empty cases is deposited by a fork lift truck on the pallet conveyor 1052 and contact E1 is returned to closed position by the de-energization of relay E, the motor coil SC–146 in circuit 1111 will be energized to start the pallet conveyor again.

At times it may be necessary to operate either the pallet loader 1000 or the pallet unloader 1001 alone. To operate the loader 1000 alone, the push button switch 1091 in circuit 1119 is closed to energize relays M and S. Contacts S1 and S2 in trunk lines L1 and L2, respectively, are opened to cut out part of the control circuit of the unloading machine. However, the pallet conveyor 1052 will be used to deliver empty pallets to a position in front of the ram 1060 which will move from a position adjacent the stack conveyor 1065 to its unload position. A switch Sw137 in circuit 1113 is opened by the ram carriage 1061 when the ram is disposed adjacent the stack conveyor 1065. This switch Sw137 is thus substituted for Sw125 which normally controls the reversal of the movement of the ram. With this arrangement, the loader 1000 goes through its normal loading cycle using the pallet conveyor 1052 and the ram 1060 of the unloader to supply empty pallets.

When the unloader 1001 is used alone, start button 1092 in circuit 119 is first closed to energize relays H and P in circuit 1119. Contacts H4 in trunk line L1 and H1 in line L2 are opened, thereby cutting out part of the control circuit of the loading machine. However, contact H3 in circuit 1121 is closed to energize motor coil SC–149 to keep the pallet conveyor 1038 of the loader in operation to discharge the empty pallets after they have been moved into the loader by the unloader ram 1060. With this arrangement, the unloading machine goes through its normal unloading cycle, explained hereinbefore, using the pallet discharge conveyor of the loading machine to carry away the empty pallets.

From the foregoing description it will be seen that the present invention provides an apparatus for rapidly and efficiently loading cases on a pallet or removing cases from a pallet. The speed of operation is attained through the unitary movement of an entire line of stacks of cases from a pallet to a conveyor and vice versa, and by the inter-related automatic control arrangements which start each step in the loading and unloading operation immediately after the preceding step has been completed. In the unloading operation, each line of stacks is shifted from the pallet to the stack conveyor as soon as the previously delivered line has been shifted along the stack conveyor a distance sufficient to permit the positioning of the new line on the stack conveyor. Also, each stack is moved into the unstacking unit as soon as the last case of the preceding stack leaves the unstacking unit. Similarly, in the pallet loading machine, the formation of the second stack of cases is begun immediately after the first stack leaves the stacker unit. Also, a new line of stacks is formed in front of the ram, as soon as the preceding line of stacks has been shifted on to the pallet. The use of an accelerator conveyor to form gaps between adjacent cases and stacks of cases, and the use of a power driven ram to move the stacks between the pallet and the stack conveyor assure a rapid and efficient loading and unloading operation.

Having thus described our invention, what we claim as new and desire to protect by Letters Patent is:

1. Apparatus for handling cases or the like comprising a conveyor having a flat, horizontal conveying surface movable in a predetermined direction, means for supporting a plurality of parallel lines of stacks of cases on a surface close to said conveying surface and at a level substantially the same as the level of said conveying surface and with each line of stacks being substantially parallel to the direction of movement of said conveying surface, pusher means movable across the top of said support surface toward said conveying surface in a direction substantially normal to said lines of stacks to contact the line of stacks remote from said conveying surface, and power means for moving said pusher means in predetermined successive increments to shift said lines as a unit across said support surface and move the line of stacks closest said conveying surface onto said conveying surface during the first increment of movement of said pusher means and move a succeeding line of stacks onto said conveying surface during each succeeding increment of movement of said pusher means.

2. Apparatus for handling cases or the like comprising a stationary member having a surface adapted to support a plurality of cases, a movable carrier mounted for reciprocating movement relative to said stationary member, means providing a support surface on said carrier disposed substantially at the level of the surface of said stationary member, means mounting said carrier support surface for movement in a direction transverse to the direction of said reciprocating movement, means mounting said carrier and the support surface thereon for movement from a receiving position close to said stationary member to a discharge position spaced from said stationary member, pusher means disposed on the opposite side of said stationary member from said movable member and arranged for movement over said stationary member and toward said movable member to contact cases on the support surface of said stationary member and move the cases onto said movable member at said receiving position, and means for moving said carrier support surface in said transverse direction when said carrier is at said discharge position.

3. Apparatus for handling cases or the like comprising a stationary support member adapted to support a pallet having a plurality of cases thereon, a conveyor having a conveying surface disposed substantially at the level of the surface of the pallet on said stationary member, means mounting said conveyor for movement as a unit from a receiving position close to said stationary member to a discharge position spaced from said stationary member, means carried by said movable conveyor for activating the conveying surface of said conveyor when said conveyor is in said discharged position, a ram mounted on the opposite side of said stationary member from said conveyor and arranged for movement over the pallet on said stationary member and toward said conveyor to contact cases on the pallet and shift them onto said conveyor in receiving position.

4. Apparatus for handling cases or the like comprising a first support member having a support surface arranged to support a pallet with a plurality of cases thereon, a second support member disposed alongside said first member and having a support surface substantially at the level of the support surface of said first member, a pusher member, means mounting said pusher member for reciprocating movement over the pallet on said first member, said pusher member being arranged to contact cases on the pallet when moved in a direction away from said first support member to move the cases off the pallet, and means carried by said pusher member and arranged to engage the pallet during the return stroke of said pusher member and move the pallet from said first support member to said second support member.

5. Apparatus for handling cases or the like comprising a first support member, a second support member positioned adjacent said first support member at a lower level than the level of said first support member and arranged to support a pallet loaded with cases, lifting means disposed below the surface of said second support member, means mounting said lifting means for movement upwardly to lift the pallet from said second support member and raise it to a position wherein the cases are above the level of the surface of said first support member, and pusher means movable over the top of the pallet and toward said first support member to engage the cases on the pallet and move them toward said first support member.

6. Apparatus for handling cases or the like comprising a support member, a roller conveyor arranged to deliver a pallet loaded with cases to an unloading station adjacent said support member but at a lower level than the level of the support surface of said member, a pair of spaced lifting bars disposed between rollers of said conveyor at said unloading station, means mounting said lifting bars for movement upwardly to lift the loaded pallet from said bars and raise it a distance sufficient to position the cases on the pallet above the level of the surface of said support member, and pusher means movable over the pallet on said conveyor and toward said support member to engage the cases on the pallet and shift them toward said support member.

7. Apparatus for handling cases or the like comprising a support member, a roller conveyor arranged to deliver a pallet loaded with cases to an unloading station adjacent to but spaced from said support member and at a lower level than the level of the support surface of said member, a parallelogram lifting mechanism having spaced arms disposed between rollers of said conveyor at said unloading station, means mounting the arms of said parallelogram lifting mechanism for movement upwardly toward the pallet and laterally toward said support member to lift the pallet, raise it a distance sufficient to position the cases above the level of the support surface of said member, and shift the pallet laterally to a position closely adjacent said support member, and pusher means movable over the pallet toward said support member to engage cases on the pallet and shift them toward said support member.

8. Apparatus for handling cases or the like comprising means providing a first support surface adapted to hold a plurality of cases, a plurality of spaced elongated members adjacent said first support surface providing a pallet support surface adjacent to but at a lower level than said first support surface, a plurality of spaced lifter arms disposed between certain of said elongated members, means mounting said lifter arms for movement from a position below said pallet support surface upwardly to lift a pallet from said pallet support surface and raise it to a position wherein the top surface of the pallet is substantially at the level of said first support surface, a discharge conveyor on the opposite side of said elongated members from said first support surface, pusher means disposed on the opposite side of said first support surface from said lifter arms and arranged for movement over said first support surface toward said lifter arms and said discharge conveyor to contact the cases on said first support surface and shift the cases onto the elevated pallet on said lifter arms, and means on said pusher means arranged to engage said pallet after the cases are positioned thereon and push the pallet onto said discharge conveyor.

9. Apparatus for handling cases or the like comprising means providing a first support surface adapted to hold a plurality of cases, a plurality of spaced elongated members providing a pallet support surface spaced a short distance from said first support surface and at a lower level than the level of said first support surface, a parallelogram lifting mechanism having spaced lifter arms disposed between certain of said elongated members, means mounting said lifter arms for movement upwardly toward a pallet on said pallet support surface and laterally toward said first support surface to lift the pallet, raise it a distance sufficient to position the top surface of the pallet substantially at the level of said first support surface, and shift the pallet laterally to a position closely adjacent said first support surface, a discharge conveyor on the opposite side of said elongated members from said first support surface, pusher means disposed on the opposite side of said first support surface from said lifter arms and arranged for movement over said first support surface toward said lifter arms and said discharge conveyor to contact cases on said first support surface and shift them onto the elevated pallet on said lifter arms, and means on said pusher means arranged to engage the pallet after the cases are positioned thereon and push the pallet onto said discharge conveyor.

10. Apparatus for handling cases or the like comprising a support member, a conveyor having a plurality of rollers providing a conveying section adjacent to and below the surface of said support member, means for delivering a pallet having a plurality of cases thereon to said roller conveying section, a plurality of lifter arms disposed between said rollers at said roller conveying section, first power means operatively connected to said lifter arms and arranged upon activation to elevate said lifter arms to raise the pallet off said roller conveying section and elevate it a distance sufficient to position the cases at a level above the level of the surface of said support member, a ram disposed on the opposite side of said roller conveying section from said support member and arranged to be moved over the pallet toward said support member to contact cases on the pallet and shift them onto said support member, second power means operatively connected to said ram and arranged upon activation to move the ram into contact with the cases on the pallet, and control means operatively connected to said first and second power means and responsive to the arrival of a loaded pallet at said roller conveying section for successively activating said first and second power means to elevate said lifter arms to raise the pallet and to move the ram over the pallet.

11. Apparatus for handling cases or the like comprising a first conveyor having a support portion arranged to receive a pallet to be loaded, a second conveyor adjacent said first conveyor and arranged to deliver empty pallets to said support portion, stop means disposed between said first and second conveyors, means mounting said stop means for movement from a position obstructing the passage of a pallet between said second conveyor and the support portion of said first conveyor to a position removed from said obstructing position, a latch arranged to hold said stop means in pallet obstructing position, electric power means arranged upon being energized to release said latch permitting said stop means to drop by gravity from said pallet obstructing position, a control circuit for said power means, means for actuating said first conveyor to discharge a loaded pallet from the support portion of said first conveyor, and a switch in said circuit and disposed in the path of a pallet being discharged from said first conveyor to be actuated thereby to close said circuit and energize said power means whereby to release said latch.

12. Apparatus for handling cases or the like comprising a conveyor for receiving a pallet load of cases at a receiving station, power means for actuating said conveyor to move the load away from the receiving station, a depressible ramp adjacent said conveyor providing an inclined way for carriers advancing loaded pallets to the receiving station for facilitating the positioning of a loaded pallet on said conveyor, a control circuit for said conveyor power means, and a switch in said circuit arranged to be actuated by the downward movement of said ramp to deenergize said power means.

13. Apparatus for handling cases or the like comprising a support member adapted to slidably support an empty pallet to be loaded, a pusher mounted for reciprocating movement over said pallet, control means associated with said pusher for consecutively moving said pusher through a relatively short movement from an initial position toward a position over the pallet to push a case onto the pallet, then return the pusher in an opposite direction to the initial position, and then move the pusher through a relatively long forward movement to move a second case onto said pallet and bring the pusher to a position above said pallet support member, said pusher having a contact surface adapted to engage the pallet on said support member and move it off said member during said relatively long forward movement.

14. A pallet loading and unloading machine comprising a support member arranged to support a pallet; a reversible conveyor having an accumulating section positioned alongside said support member and adapted to selectively advance cases away from said accumulating section or toward said section; a reversible case handling mechanism arranged to selectively receive cases from said conveyor and move them to a processing station or position cases on said conveyor; a pusher mounted for reciprocating movement over said support member and over a pallet thereon, movement of said pusher in one direction being effective to cause said pusher to move cases off said reversible conveyor and onto said pallet, and movement of said pusher in an opposite direction being effective to cause said pusher to move cases off said pallet and onto said reversible conveyor; power means operatively connected to said reversible conveyor, said reversible case handling mechanism and said pusher for actuating the same; and control means associated with said power means and arranged to sequentially move said pusher in said opposite direction over a loaded pallet on said support member to engage cases on the pallet and move them onto said reversible conveyor, actuate said conveyor in a direction to move cases into said case handling mechanism, actuate said case handling mechanism to move the cases to a processing station, actuate said mechanism to position cases on said conveyor, actuate said conveyor to move cases toward said accumulating section, and then actuate said pusher in said one direction to move cases off said reversible conveyor and position them on said pallet.

15. Apparatus for loading and unloading cases or the like from pallets comprising a support member having a surface arranged to support a pallet, a conveyor positioned alongside said support surface and adapted to alternately advance cases to the pallet or from the pallet, a pusher mounted for reciprocating movement above said support member and above said conveyor from a position on one side of said support member to a position on the opposite side of said support member, means defining two case-contacting pushing surfaces on said pusher, and means for selectively moving said pusher in either direction over said support member to push cases on a pallet on said support member onto said conveyor during movement of the pusher from said one side of said support member to said opposite side or, alternatively, to push cases on said conveyor onto said pallet during movement of the pusher in the opposite direction from said opposite side toward said one side.

References Cited in the file of this patent

UNITED STATES PATENTS

| | | |
|---|---|---|
| 1,152,997 | Wild | Sept. 7, 1915 |
| 1,467,019 | Tzibides | Sept. 4, 1923 |
| 1,496,714 | Kyler | June 3, 1924 |
| 1,950,370 | Mudd | Mar. 6, 1934 |
| 2,051,190 | Van Buren | Aug. 18, 1936 |
| 2,061,495 | Woodruff | Nov. 17, 1936 |
| 2,324,930 | Joa | July 20, 1943 |
| 2,394,692 | Isler | Feb. 12, 1946 |
| 2,528,114 | Cerruti | Oct. 31, 1950 |
| 2,609,111 | Daves et al. | Sept. 2, 1952 |
| 2,633,251 | Bruce | Mar. 31, 1953 |
| 2,681,130 | Atwood | June 15, 1954 |
| 2,684,799 | Holstein | July 27, 1954 |
| 2,687,813 | Verrinder et al. | Aug. 31, 1954 |
| 2,701,650 | Stevenson | Feb. 8, 1955 |
| 2,785,785 | Macaluso | Mar. 19, 1957 |
| 2,796,179 | Van Vleck | June 18, 1957 |
| 2,815,623 | Holstebroe et al. | Dec. 10, 1957 |